United States Patent
Kamata

(10) Patent No.: US 10,914,597 B2
(45) Date of Patent: Feb. 9, 2021

(54) INFORMATION PROCESSING SYSTEM, INFORMATION PROCESSING METHOD, INFORMATION PROCESSING DEVICE, AND INFORMATION PROCESSING PROGRAM

(71) Applicant: Hiroshi Kamata, Tokyo (JP)

(72) Inventor: Hiroshi Kamata, Tokyo (JP)

( * ) Notice: Subject to any disclaimer, the term of this patent is extended or adjusted under 35 U.S.C. 154(b) by 281 days.

(21) Appl. No.: 15/869,937

(22) Filed: Jan. 12, 2018

(65) Prior Publication Data
US 2018/0135992 A1    May 17, 2018

Related U.S. Application Data

(63) Continuation of application No. 15/304,709, filed as application No. PCT/JP2015/052708 on Jan. 30, 2015.

(30) Foreign Application Priority Data

Jun. 19, 2014   (JP) .................................. 2014-126242

(51) Int. Cl.
G01C 21/34       (2006.01)
G06F 16/29       (2019.01)
(Continued)

(52) U.S. Cl.
CPC ..... G01C 21/3415 (2013.01); G01C 21/3682 (2013.01); G01C 21/3694 (2013.01);
(Continued)

(58) Field of Classification Search
CPC ............ G01C 21/3682; G01C 21/3694; G06F 17/30241; G06Q 30/02; G06Q 30/0281; G06Q 50/10
(Continued)

(56) References Cited

U.S. PATENT DOCUMENTS

2006/0082472 A1*  4/2006  Adachi ............ G08G 1/096716
                                                340/995.13
2007/0293958 A1* 12/2007  Stehle ..................... G06Q 10/04
                                                700/30
2012/0212353 A1   8/2012  Fung et al.

FOREIGN PATENT DOCUMENTS

CN          1748123 A      3/2006
JP      2003-288459 A     10/2003
(Continued)

OTHER PUBLICATIONS

International Search Report dated Apr. 28, 2015 in corresponding Application No. PCT/JP2015/052708; 2 pgs.
(Continued)

*Primary Examiner* — Maceeh Anwari
(74) *Attorney, Agent, or Firm* — Maier & Maier, PLLC

(57) ABSTRACT

Provided is an information processing device that generates a visitor traffic line without having to collect information about the traffic of visitors. An information processing device includes a map information acquisition unit that acquires map information, a destination acquisition unit that acquires a destination, a route retrieval unit that retrieves a shortest route from a location on a road to the destination on a basis of road information included in the map information, and a visitor traffic line generation unit that generates a visitor traffic line from the shortest route retrieved by the route retrieval unit. The location of each road is a location remote from the destination by predetermined distance. In particular, the location is a location on at least one circle around the destination.

20 Claims, 45 Drawing Sheets

(51) Int. Cl.
  *G06Q 30/02* (2012.01)
  *G01C 21/36* (2006.01)
  *G01C 21/26* (2006.01)
  *G07F 17/00* (2006.01)

(52) U.S. Cl.
  CPC ......... *G06F 16/29* (2019.01); *G06Q 30/0202* (2013.01); *G06Q 30/0281* (2013.01); *G01C 21/26* (2013.01); *G07F 17/0014* (2013.01)

(58) Field of Classification Search
  USPC ........................................................ 701/414
  See application file for complete search history.

(56) References Cited

FOREIGN PATENT DOCUMENTS

| JP | 2003-295758 A | 10/2003 |
|---|---|---|
| JP | 4407295 B2 | 8/2005 |

OTHER PUBLICATIONS

Hiroshi Adachi, "Practical Use of Spatial Data in the Marketing Area", The Journal of the Institute of Electronics, Information and Communication Engineers Heisei 10 Nen 7 Gatsu, Jul. 25, 1998 (Jul. 25, 1998), vol. 81, No. 7, pp. 694 to 703, 13 pgs.

Takashi Kirimura, Toshikazu Seto, Tomoki Nakaya, "Development of a WebGIS-based hazard map for the protection of people and cultural resources: using an open-source WebGIS engine", Information Processing Society of Japan Symposium Jinmonkon Symposium 2006 [online], Dec. 14, 2006 (Dec. 14, 2006), pp. 355 to 362, 8 pgs.

Office Action dated Aug. 13, 2014 in corresponding Application No. JP2014-126242; 6 pgs.

Office Action dated Oct. 29, 2015 in corresponding Application No. JP2015-526824; 7 pgs.

Office Action dated Mar. 27, 2020, in corresponding Chinese Application No. 201580043967.0 including partial machine-generated English language translation, 21 pages.

* cited by examiner

FIG. 1E

| CONCENTRIC CIRCLE ID (181) | DISTANCE FROM DESTINATION (182) | INTERSECTION ID WITH ROAD (183) | POPULATION (184) | SHORTEST ROUTE TO DESTINATION (185) | VISITOR TRAFFIC LINE (186) | RELATED INFORMATION (187) | | | |
|---|---|---|---|---|---|---|---|---|---|
| | | | | | | WALKING DISTANCE | WALKING TIME | TRAFFIC VOLUME | ... |
| 6 | | 61 | | 61-51-41-32-22-11 | 61-51⎤ | | | | |
| | | 62 | | 62-53-41 | 62-53⎦⎤41⎤ | | | | |
| | | 63 | | 63-55-42-32 | 63-55-42⎦ ⎦32-22-11 | | | | |
| | | ⋮ | | | | | | | |
| | | 6n | | 6n-5X-4X-3X-2X-1X | | | | | |
| 5 | | 51 | | | | | | | |
| | | 52 | | 52-41 | | | | | |
| | | 53 | | | | | | | |
| | | ⋮ | | | | | | | |
| | | 5m | | 5m-4Y-3Y-2Y-1Y | | | | | |
| ⋮ | | | | | | | | | |
| 1 | | | | | | | | | |

FIG. 1F

| | 191 | | | 192 | | | 193 | | | 194 | | | |
|---|---|---|---|---|---|---|---|---|---|---|---|---|---|
| POPULATION INFORMATION | | | STORE INFORMATION | | | VENDING MACHINE INFORMATION | | | BASE STATION INFORMATION | | | ... |
| ADDRESS UNIT ID | MAP LOCATION | POPULATION | STORE ID | MAP LOCATION | COMMODITY | VENDING MACHINE ID | MAP LOCATION | COMMODITY | BASE STATION ID | MAP LOCATION | CARRIER ID | |
| | | | | | | | | | | | | |
| | | | | | | | | | | | | |
| | | | | | | | | | | | | |
| ⋮ | | | | | | | | | | | | |

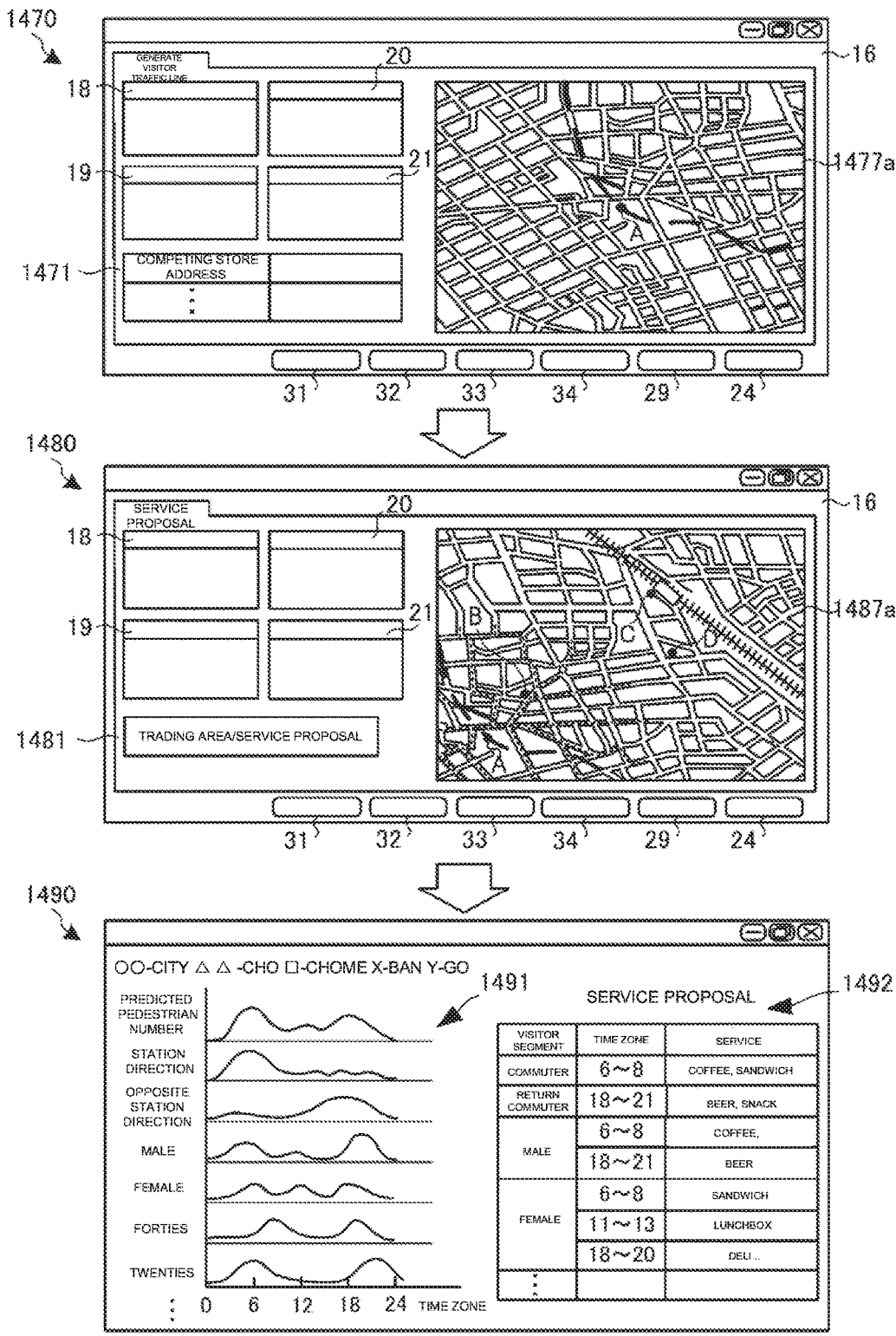

FIG. 17A

| TIME ZONE (WEEKDAY) | PREDICTED PEDESTRIAN NUMBER | | | | | | SALES HISTORY | | | ... |
|---|---|---|---|---|---|---|---|---|---|---|
| | TOTAL | STATION A DIRECTION | OPPOSITE DIRECTION | MALE | FEMALE | By AGE GROUP | ... | TOTAL | BY COMMODITY | ... |
| 0:00~1:00 | | | | | | | | | | |
| 1:00~2:00 | | | | | | | | | | |
| ⋮ | | | | | | | | | | |
| 6:00~6:30 | | | | | | | | | | |
| 6:30~7:00 | | | | | | | | | | |
| ⋮ | | | | | | | | | | |
| 18:00~18:30 | | | | | | | | | | |
| 18:30~19:00 | | | | | | | | | | |
| ⋮ | | | | | | | | | | |
| 22:00~23:00 | | | | | | | | | | |
| 23:00~24:00 | | | | | | | | | | |

1711 — (TIME ZONE column)
1712 — PREDICTED PEDESTRIAN NUMBER
1713 — SALES HISTORY

FIG. 22A

| LOCATION ID | ADDRESS | LOCATION CONDITION | PEDESTRIAN PREDICTION | PREDICTED SALES | | | ... |
|---|---|---|---|---|---|---|---|
| | | | | TOTAL | BY COMMODITY | ... | |
| | | CROSSROADS | | | | | |
| | | THREE-WAY INTERSECTION | | | | | |
| | | BETWEEN CROSSROADS | | | | | |
| ⋮ | | | | | | | |
| | | | | | | | |

| 2221 | 2222 | 2223 INSTALLATION PROPOSAL INFORMATION | | | | | | ... | 2224 NEW STORE INSTALLATION EVALUATION | ... |
|---|---|---|---|---|---|---|---|---|---|---|
| LOCATION ID | ADDRESS | COMMODITY | PREDICTED SALES | EVALUATION VALUE | COMMODITY | PREDICTED SALES | EVALUATION VALUE | ... | | |
| | | | | 2/10 | | | 1/10 | | POOR | |
| | | | | 9/10 | | | 8/10 | | EXCELLENT (COMMODITY) | |
| ⋮ | | | | | | | | | | |
| | | | | | | | | | | |

FIG. 26

| 2601 | 2602 | 2603 | 2604 | 2605 | 2606 |
|---|---|---|---|---|---|
| YET-TO-BE-CORRECTED VISITOR TRAFFIC LINE DATA | CORRECTION DATE/TIME | SHOP-AROUND BEHAVIOR COLLECTION DATA | VISITOR TRAFFIC LINE DATA BASED ON SHOP-AROUND BEHAVIORS | DIFFERENCE | CORRECTED VISITOR TRAFFIC LINE DATA |
|  |  |  |  |  |  |
|  |  |  |  |  |  |
|  |  |  |  |  |  |
| ⋮ |  |  |  |  |  |
|  |  |  |  |  |  |

FIG. 31

| GENERATED VISITOR TRAFFIC LINE (3101) | BUSINESS CATEGORY (VISITOR SEGMENT) (3102) | GENERATED VISITOR SEGMENT TRAFFIC LINE (3103) | TARGET FACILITY (3104) | COMPETING FACILITY (3105) | COMMODITY TYPE (3106) | ... |
|---|---|---|---|---|---|---|
| | FEMALE | | | | | |
| | MALE | | | | | |
| | TWENTIES | | | | | |
| | SUPERMARKET | | | | | |
| | STATION | | | | | |
| | ⋮ | | | | | |
| ⋮ | | | | | | |

INFORMATION PROCESSING SYSTEM, INFORMATION PROCESSING METHOD, INFORMATION PROCESSING DEVICE, AND INFORMATION PROCESSING PROGRAM

CROSS-REFERENCE TO RELATED APPLICATIONS

This application is a continuation of U.S. patent application Ser. No. 15/304,709, filed Oct. 17, 2016, which is a national stage application of International Patent Application No. PCT/JP2015/052708, filed Jan. 30, 2015, which claims priority to Japanese Patent Application No. 2014-126242, filed Jun. 19, 2014, the entire contents of which are incorporated herein by reference.

TECHNICAL FIELD

The present invention relates to the technology of a visitor traffic line indicating the traffic of visitors.

BACKGROUND ART

In the above technical field, Patent Literature 1 discloses a technology that when a visitor removes a commodity from a shelf, stores the time of the removal of the commodity and the ID of the commodity and, when the visitor makes a payment, calculates a visitor traffic line indicating that the visitor has moved in the order of the times at which the visitor has removed commodities. Patent Literature 2 discloses a technology that categorizes peripheral areas into multiple concentric distance zones around a predetermined location on map data and investigates a trading area using statistical population data. Patent Literature 3 discloses a technology that estimates the demand of a trading area using "cho-chome" address units.

CITATION LIST

Patent Literature

Patent Literature 1: Japanese Patent No. 4407295
Patent Literature 2: Japanese Unexamined Patent Application Publication No. 2003-295758
Patent Literature 3: Japanese Unexamined Patent Application Publication No. 2003-288459

SUMMARY OF INVENTION

Technical Problem

However, the technologies disclosed in Patent Literatures described above cannot generate a visitor traffic line without collecting information about the traffic of visitors. Nor can these technologies propose a service using a visitor traffic line.

An object of the present invention is to provide a technology that solves the above problems.

Solution to Problem

To achieve the above object, an information processing device of the present invention includes map information acquisition means configured to acquire map information, destination acquisition means configured to acquire a destination, route retrieval means configured to retrieve a shortest route from a location on a road to the destination on a basis of road information included in the map information, and visitor traffic line generation means configured to generate a visitor traffic line from the shortest route retrieved by the route retrieval means.

To achieve the above object, an information processing program causes a computer to perform a map information acquisition step of acquiring map information, a destination acquisition step of acquiring a destination, a route retrieval step of retrieving a shortest route from a location on a road to the destination on a basis of road information included in the map information, and a visitor traffic line generation step of generating a visitor traffic line from the shortest route.

To achieve the above object, an information processing device includes visitor traffic line generation means configured to retrieve a shortest route from a location on a road to a destination on a basis of road information included in map information and to generate a visitor traffic line from the shortest route, predicted traffic volume calculation means configured to calculate predicted traffic volumes of visitors on the visitor traffic line, and service proposal means configured to propose a service to be provided at a specified location on the visitor traffic line on a basis of the predicted traffic volumes.

To achieve the above object, an information processing device includes visitor traffic line generation means configured to retrieve a shortest route from a location on a road to a destination on a basis of road information included in map information and to generate a visitor traffic line from the shortest route, predicted traffic volume calculation means configured to calculate predicted traffic volumes of visitors on the visitor traffic line, and location proposal means configured to propose a location on the visitor traffic line on a basis of the predicted traffic volumes, the location being a location at which a predetermined service is to be provided.

To achieve the above object, an information processing program causes a computer to perform a visitor traffic line generation step of retrieving a shortest route from a location on a road to a destination on a basis of road information included in map information and generating a visitor traffic line from the shortest route, a predicted traffic volume calculation step of calculating predicted traffic volumes of visitors on the visitor traffic line, and a service proposal step of proposing a service to be provided at a specified location on the visitor traffic line on a basis of the predicted traffic volumes.

To achieve the above object, an information processing program causes a computer to perform a visitor traffic line generation step of retrieving a shortest route from a location on a road to a destination on a basis of road information included in map information and generating a visitor traffic line from the shortest route, a predicted traffic volume calculation step of calculating predicted traffic volumes of visitors on the visitor traffic line, and a service proposal step of proposing a location on the visitor traffic line on a basis of the predicted traffic volumes, the location being a location at which a predetermined service is to be provided.

To achieve the above object, an information processing system includes storage that stores map information, destination acquisition means configured to acquire a destination, route retrieval means configured to retrieve a shortest route from a location on a road to the destination on a basis of road information included in the map information, visitor traffic line generation means configured to generate a visitor traffic line from the shortest route retrieved by the route retrieval means, and display that displays at least the visitor traffic line generated by the visitor traffic line generation means on a map in a superimposed manner.

To achieve the above object, an information processing method includes a destination acquisition step of acquiring a destination, a route retrieval step of retrieving a shortest route from a location on a road to the destination on a basis of road information included in map information, a visitor traffic line generation step of generating a visitor traffic line from the shortest route retrieved by the route retrieval step, and a display step of displaying at least the visitor traffic line generated by the visitor traffic line generation step on a map in a superimposed manner.

Advantageous Effects of Invention

According to the present invention, a visitor traffic line can be generated without having to collect information about the traffic of visitors. Further, services can be proposed using a visitor traffic line.

BRIEF DESCRIPTION OF THE DRAWINGS

FIG. 1E is a diagram showing the configuration of data used by the information processing device of the first embodiment of the present invention.

FIG. 1F is a diagram showing the configuration of data used by the information processing device of the first embodiment of the present invention.

FIG. 14C is a diagram showing yet another set of display transitions of the second embodiment of the present invention.

FIG. 17A is a diagram showing the configuration of data used by the information processing device of the second embodiment of the present invention.

FIG. 22A is a diagram showing the configuration of data used by the information processing device of the third embodiment of the present invention.

FIG. 22B is a diagram showing the configuration of data used by the information processing device of the third embodiment of the present invention.

FIG. 26 is a diagram showing the configuration of data used by the information processing device of the fourth embodiment of the present invention.

FIG. 31 is a diagram showing the configuration of data used by the information processing device of the fifth embodiment of the present invention.

DESCRIPTION OF EMBODIMENTS

Now, embodiments of the present invention will be described in detail with reference to the drawings. However, elements described in the embodiments are illustrative only, and the technical scope of the present invention is not intended to be limited to only the elements.

First Embodiment

An information processing device of a first embodiment of the present invention will be described. The information processing device of the present embodiment generates a visitor traffic line from a predetermined location to a destination without collecting information about the traffic of visitors.

Visitor Traffic Line

Figure 1A:
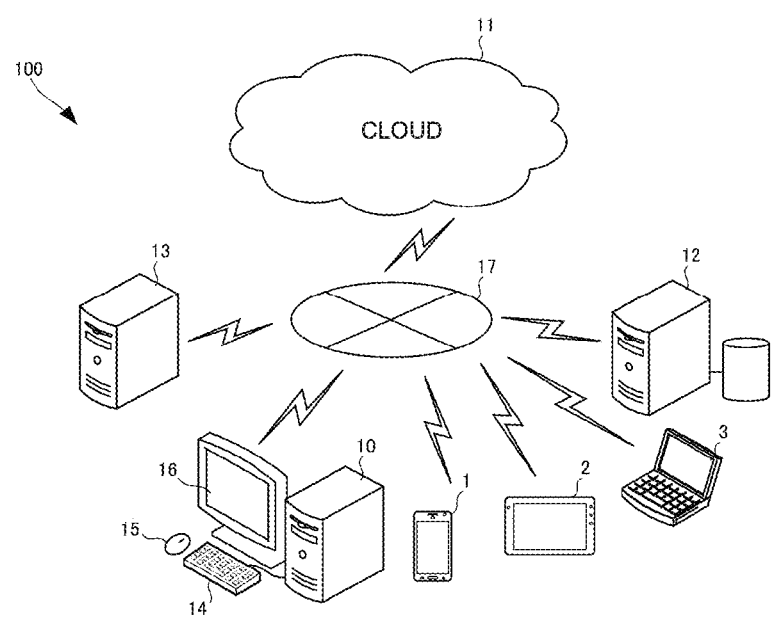
FIG. 1A is a block diagram showing the configuration of an information processing device of a first embodiment of the present invention.
Figure 1B:
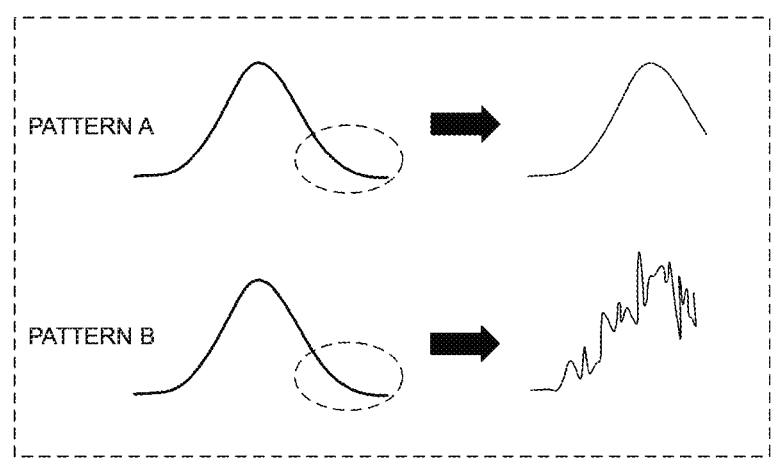
FIG. 1B is a diagram showing marketing using a visitor traffic line of the present invention.

Referring to FIG. 1B, marketing using a visitor traffic line will be described.

An upper part of FIG. 1B shows the sampling distribution of a pattern A, which is a pattern in which samples do not interface with each other (e.g., the distribution of test scores in a class; the horizontal axis represents the test score, and the vertical axis represents the number of students). Even if students corresponding to a portion surrounded by a broken line, of this sampling distribution are removed and then the same test is conducted again, the waveform of the other portion of the sampling distribution remains the same, and the scores of the other students are not influenced.

On the other hand, a lower part of FIG. 1B shows the sampling distribution of a pattern B, which is a pattern in which samples interfere with each other (e.g., the distribution of the sales quantity of a particular commodity at stores on the same visitor traffic line; the horizontal axis represents the sales quantity, and the vertical axis represents the number of stores). If stores corresponding to a portion surrounded by a broken line, of this sampling distribution stop the sale of the commodity and if the other stores continue the sale of the commodity, the waveform of the other portion of the sampling distribution is disturbed, and the amounts of sales of the competing stores on the same visitor traffic line are influenced.

As seen in the pattern A, the influence of the transfer of a sales location can be ignored in the marketing of a wide area. Accordingly, the area can be stratified as in a sales distribution in mesh. On the other hand, as seen in the pattern B, the influence of the transfer of a sales location cannot be ignored in the marketing of a narrow area. Accordingly, the visitor traffic line, which is influenced, needs to be stratified.

The present embodiment supports marketing by quickly generating such a visitor traffic line using a simple method.

Configuration of Information Processing Device

FIG. 1A is a block diagram showing the configuration of a visitor traffic line generation system 100, which is an information processing system including an information processing device of the present embodiment. The visitor traffic line generation system 100 of the present embodiment will be described in detail with reference to the accompanying drawings, such as FIG. 1A, which is a conceptual configuration diagram of the visitor traffic line generation system 100 described as an example. The visitor traffic line generation system 100 generates (derives) a visitor traffic line from predetermined locations to a destination using a server 10 (a computer resource), which is an information processing device of the present embodiment. Not only the server 10, but also communication terminals, such as a personal computer (PC; not shown), a mobile smartphone 1, a tablet 2, and a note PC 3, can generate (derive) and display a visitor traffic line by executing a visitor traffic line generation application. A server-communication terminal interactive configuration may be used as follows: the server 10 generates (derives) a visitor traffic line; and a communication terminal, such as the PC, smartphone 1, tablet 2, or note PC 3, displays a map and the visitor traffic line.

The server 10 is a computer including a central processing unit (a CPU or an MPU), memories (a main memory and a cache memory), and a large-capacity hard disk. While the server 10 is a logical physical computer that is run by an independent operating system (OS), it may be a virtual computer. The visitor traffic line generation application for implementing the visitor traffic line system is stored in the memory of the server 10. Note that the visitor traffic line generation application may be stored in cloud 11 or another server (computer) 12 or 13.

Input devices, such as a keyboard 14 and a mouse 15, and output devices, such as a display 16 and a printer (not shown), are connected to the server 10 through an (wired or wireless) interface. Although not shown, a security router (including a virtual security router) and a firewall (including a virtual firewall) are also connected to the server 10.

The server 10 has various types of functions, including a DNS server function of associating host names and IP addresses assigned to the host names with each other, a Web server function necessary to publish a Web site, a database server function of receiving a request from the cloud 11 or another server 12 or 13 and providing a function of reading and writing various types of information, a mail server function of sending and receiving emails, and a document server function of storing generated all data, such as text and images, and allowing the data to be retrieved.

The server 10 can be connected to the Internet 17 and can access and log into the cloud 11 or another server 12 or 13 through the Internet 17. Stored in the hard disk of the server 10 are housing map data or population distribution data, store installation location data, provider installation location data, vending machine installation location data, and base station installation location data. These types of data can be retrieved as necessary by using retrieval functions. These types of data may be stored in the cloud 11 or another server 12 or 13 and acquired therefrom as necessary. The server 10 may provide various types of data generated by the visitor traffic line generation system to the cloud 11 or another server 12 or 13 through the Internet 17.

The server 10 starts the visitor traffic line generation application stored in the memory or stored in the cloud 11 or another server 12 or 13 under the control of the operating system (OS) and performs the following processes in accordance with the application. The server 10 performs a first to n-th concentric circle display process of displaying first to n-th concentric circles around a destination on the housing map data and a first to n-th location display process of displaying first to n-th locations at the intersections of roads on the housing map data and the first to n-th concentric circles (on the concentric circles).

The server 10 then performs a shortest route retrieval process of sequentially retrieving the shortest route from respective locations to the destination, starting with those from the n-th locations to the destination and ending with those from the first locations to the destination and a shortest route display process of displaying the shortest route to the destination on the housing map data. The server 10 then performs a visitor traffic line display process of displaying a visitor traffic line on the housing map data and an address unit division process of dividing the map from the n-th concentric circle to the destination into "cho" units or "cho-chome" units in the Japanese addressing system.

The server 10 also perform a walking time calculation process of calculating the walking times from the n-th-to-first locations to the destination and a walking time display process of displaying the walking times to walk from the n-th-to-first locations to the destination. The server 10 also perform a walking distance calculation process of calculating the walking distances from the n-th-to-first locations to the destination and a walking distance display process of displaying the walking distances from the n-th-to-first locations to the destination.

The server 10 also performs a population retrieval process of retrieving populations and a population addition process of adding up the populations from the n-th locations toward the first locations. The server 10 also performs a traffic volume display process of displaying the traffic volumes at the first to n-th locations. The server 10 also performs a housing map data storage process of storing the housing map data in the hard disk and a various types of data storage process of storing various types of data in the hard disk.

The server 10 also performs a store display process of displaying multiple stores selling commodities in the same field or multiple providers providing services in the same field existing between the n-th concentric circle and the destination and a vending machine display process of displaying multiple vending machines selling commodities in the same field existing between the n-th concentric circle and the destination. The server 10 also performs a base station display process of displaying multiple base stations existing between the n-th concentric circle and the destination.

According to the present embodiment, there can be provided a visitor traffic line generation system that can generate a visitor traffic line from predetermined location to a destination without requiring the transfer of articles. Further, according to the present embodiment, there can be provide a visitor traffic line generation system that can cheaply and quickly generate a visitor traffic line from predetermined location to a destination while saving time, effort, and cost to generate a visitor traffic line.

Functional Elements of Information Processing Device

Figure 1C:
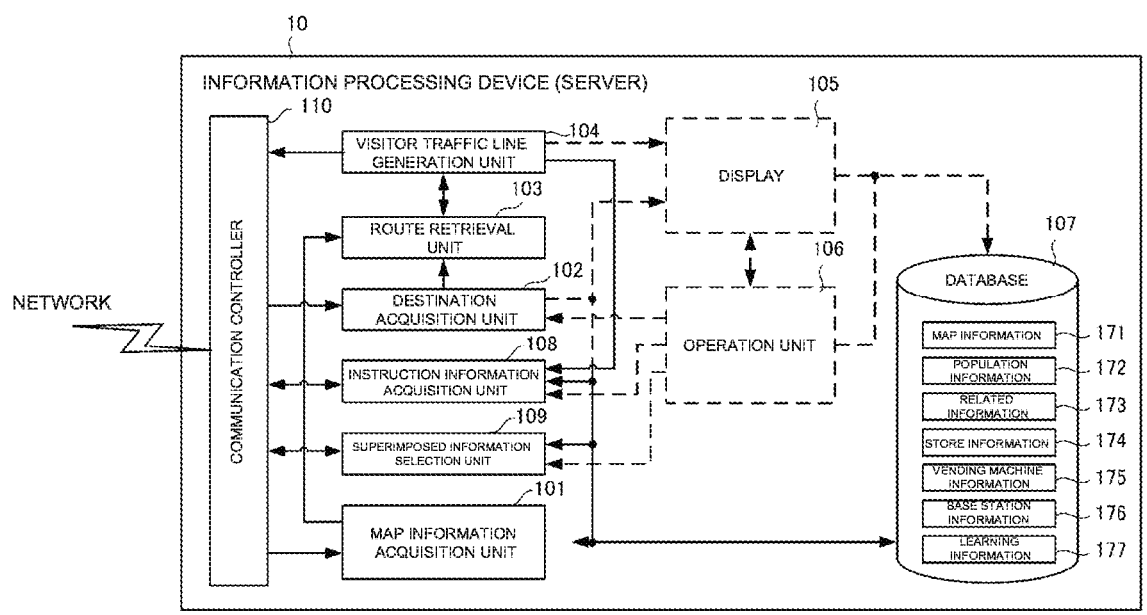
FIG. 1C is a block diagram showing the functional elements of the information processing device of the first embodiment of the present invention.

FIG. 1C is a block diagram showing the functional elements of an information processing device 10 according to the present embodiment.

The information processing device (server) 10 includes a communication controller 110, a map information acquisition unit 101, a destination acquisition unit 102, a route retrieval unit 103, a visitor traffic line generation unit 104, a display 105, an operation unit 106, and a database 107. Note that the database 107 may be disposed outside the information processing device (server) 10. If the system is configured as follows: the information processing device 10 generates a visitor traffic line and various types of information and transmits them to a communication terminal; and the communication terminal displays them, the information processing device 10 need not include the display 105 or operation unit 106, as shown by broken lines. In this case, the communication terminal includes a display and an operation unit, and the information processing device 10 receives operation information from the communication terminal through the communication controller 110 and transmits a generated visitor traffic line and other information to be displayed to the communication terminal through the communication controller 110.

The communication controller 110 controls the communication between the information processing device 10 and the cloud 11, other servers 12 and 13, mobile terminals 1 to 3, and the like through a network. The map information acquisition unit 101 acquires map information that is stored in the database 107 and that includes information about roads in a desired region, or acquires map information of the desired region from the cloud 11 or another server 12 or 13 through the communication controller 110. The destination acquisition unit 102 acquires a destination serving as the center of visitor traffic lines in the map information of the desired region acquired by the map information acquisition unit 101, on the basis of a user operation on the operation unit 106 or communication terminal.

The route retrieval unit 103 retrieves the shortest routes from locations on the roads in the desired region through the roads to the destination. Here, it is assumed that locations are the intersections of the concentric circles around the destination and the roads. Note that the concentric circles need not be used and that shapes corresponding to the house distribution in the region, such as ovals or rectangles, may be selected. The user may set the distances between from the shapes to the destination or the distances between the shapes, to appropriate distances considering the density of visitor traffic lines, the number or density of the start points of the visitor traffic lines, or the like. The visitor traffic line generation unit 104 generates visitor traffic lines from the shortest routes from the locations on the roads to the destination retrieved by the route retrieval unit 103. The display 105 is a liquid crystal display or the like and displays the map of the desired region, the generated visitor traffic lines, an instruction screen or instruction button for a user operation or input, the status of the information processing device 10, and the like. The operation unit 106 includes a keyboard and mouse (a pointing device), a touchscreen, or the like and acquires a user operation.

The database 107 stores or accumulates data used by the information processing device 10 of the present embodiment. Stored in the database 107 are map information 171, population information 172, related information 173, store information 174, vending machine information 175, base station information 176, learning information 177, and the like. The population information 172 includes the populations of the address units in the map. The related information 173 includes various types of related information at specified locations on the generated and displayed visitor traffic line. The related information 173 also includes the walking distances and walking times from the specified locations to the destination, the traffic volumes at the specified locations, and the like. The store information 174 includes store locations and store attributes that can be retrieved by a desired region. The vending machine information 175 includes vending machine locations and vending machine attributes that can be retrieved by a desired region. The base station information 176 includes base station locations and base station attributes that can be retrieved by a desired region. The learning information 177 includes processing results of the information processing device 10, including the generated visitor traffic line, and is used to obtain improved processing results.

The information processing device (server) 10 further includes an instruction information acquisition unit 108 and a superimposed information selection unit 109. The instruction information acquisition unit 108 acquires an instruction made by the user using the operation unit 106 or communication terminal and issues an instruction to display information stored in the database 107 on a visitor traffic line in a superimposed manner. For example, the instruction information acquisition unit 108 generates or acquires related information 173 and issues an instruction to display the generated related information on a visitor traffic line in a superimposed manner. The superimposed information selection unit 109 acquires a selection made by the user using the operation unit 106 or communication terminal, acquires information from the database 107 on the basis of the selection, and issues an instruction to display the information on a visitor traffic line in a superimposed manner. For example, the superimposed information selection unit 109 acquires the store information 174, vending machine information 175, or base station information 176 and issues an instruction to display the acquired information on a visitor traffic line in a superimposed manner.

Hardware Configuration of Information Processing Device

Figure 1D:
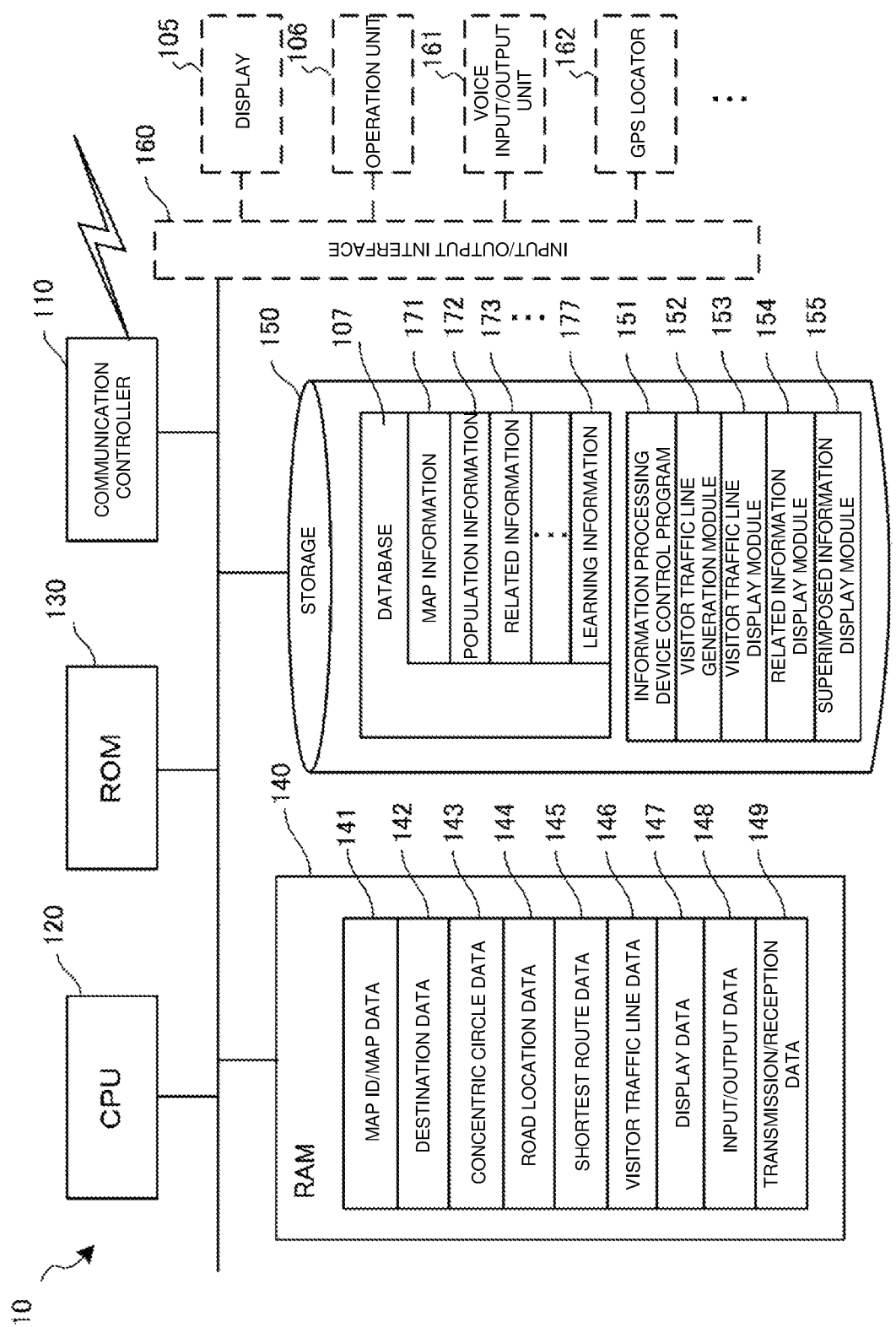
FIG. 1D is a block diagram showing the hardware configuration of the information processing device of the first embodiment of the present invention.

FIG. 1D is a block diagram showing the hardware configuration of the information processing device 10 according to the present embodiment.

In FIG. 1D, a central processing unit (CPU) 120 is a processor for controlling arithmetic operations and implements the functional elements of the information processing device 10 in FIG. 1C by executing a program. A read only memory (ROM) 130 stores fixed data and programs, such as initial data and program. The communication controller 110 communicates with communication terminals 1 to 3 and the like through a network. The CPU 120 need not be a single CPU and may include multiple CPUs or may include a graphics processing unit (GPU) for image processing. Preferably, the communication controller 110 includes a CPU independent of the CPU 120 and writes or reads transmission/reception data to or from a region of a random access memory (RAM) 140. Also, it is preferred to dispose a direct memory access unit (DMAC; not shown) that transfers data between the RAM 140 and a storage 150. Also, preferably, an input/output interface 160 includes a CPU independent of the CPU 120 and writes or reads input/output data to or from a region of the RAM 140. Accordingly, when it recognizes that data has been received or transferred by or to the RAM 140, the CPU 120 processes the data. The CPU 120 leaves the processing result in the RAM 140 so that the communication controller 110, DMAC, or input/output interface 160 can transmit or transfer the processing result later.

The RAM 140 is a random access memory used by the CPU 120 as a work area for temporary storage. The RAM 140 reserves a region for storing data necessary to implement the present embodiment. Map ID/map data 141 is data about a target map on which a visitor traffic line is to be generated, and is acquired from the database 107, external server, or the like. Destination data 142 is data about a destination around which visitor traffic lines are to be generated. Concentric circle data 143 is data about concentric circles that are to be superimposed on the target map around the destination. Road location data 144 is data indicating the locations of the intersections of the concentric circles and roads in the map. Shortest route data 145 is data about the shortest routes from the intersections through the roads to the destination. Visitor traffic line data 146 is data about visitor traffic lines generated from the shortest routes from the intersection to the destination. Display data 147 is data generated to display on the display 105. Input/output data 148 is data inputted or outputted by input/output devices through the input/output interface 160. Transmission/reception data 149 is data transmitted or received through the communication controller 110.

The storage 150 is storing the database, parameters, and the following data and programs necessary to implement the present embodiment. As described with reference to FIG. 1C, the database 107 is storing the information 171 to 177. The storage 150 is storing the following programs. The information processing device control program 151 is a program that controls the entire information processing device. A visitor traffic line generation module 152 is a module that generates a visitor traffic line to a destination from a desired map and information about the destination. A visitor traffic line display module 153 is a module that displays the generated visitor traffic line on the map in a superimposed manner. A related information display module 154 is a module that displays various types of related information at specified locations on the visitor traffic line in a superimposed manner. A superimposed information display module 155 is a module that displays selected information on the map in a superimposed manner. The modules 152 to 155 are included in the visitor traffic line generation application.

The input/output interface 160 interfaces input/output data with input/output devices. Connected to the input/output interface 160 are the display 105, the operation unit 106, a voice input/output unit 161, including a microphone and a speaker, a GPS locator 162, and the like. If the system is configured as follows: the information processing device 10 generates a visitor traffic line and various types of information and transmits them to a communication terminal; and the communication terminal displays them, the information processing device 10 need not include the input/output interface 160, a display 105, or operation unit 106, as shown by broken lines. In this case, the communication terminal includes a display, an operation unit, and the like, and the information processing device 10 receives operation information from the communication terminal through the communication controller 110 and transmits a generated visitor traffic line and the like to the communication terminal through the communication controller 110.

Note that programs or data related to the general-purpose functions or other executable functions of the information processing device 10 are not shown in the RAM 140 or storage 150 in FIG. 1D.

Data Used by Information Processing Device

FIGS. 1E and 1F are diagrams showing the configuration of data used by the information processing device 10 according to the present embodiment.

FIG. 1E relates to generating a visitor traffic line and displaying related information on the basis of the visitor traffic line. FIG. 1E is storing concentric circle IDs 181, the distances 182 from concentric circles to a destination, the IDs 183 of the intersections of the concentric circles and roads, and populations 184 related to the intersection locations.

FIG. 1E is also storing the shortest routes 185 from the intersection locations to the destination and generated visitor traffic lines 186. As seen in the shortest routes 185, once the shortest route passing through, for example, intersection locations "41" and "32" is retrieved, when another shortest route from the outermost concentric circle reaches the intersection location "41" or "32," the further route need not be retrieved, since the further route has been already retrieved.

In FIG. 1E, related information 187, including calculated walking distances, walking times, and traffic volumes, are also stored.

FIG. 1F relates to storing information to be superimposed on a visitor traffic line. In FIG. 1F, population information 191, store information 192, vending machine information 193, base station information 194, and the like in a desired map region are stored. Each piece of population information 191 includes a district ID, a map location, and a population. Each piece of store information 192 includes a store ID, a map location, and commodities. Each piece of vending machine information 193 includes a vending machine ID, a map location, and commodities. Each piece of base station information 194 includes a base station ID, a map location, and a carrier ID.

Process Steps by Information Processing Device

Figure 1G:
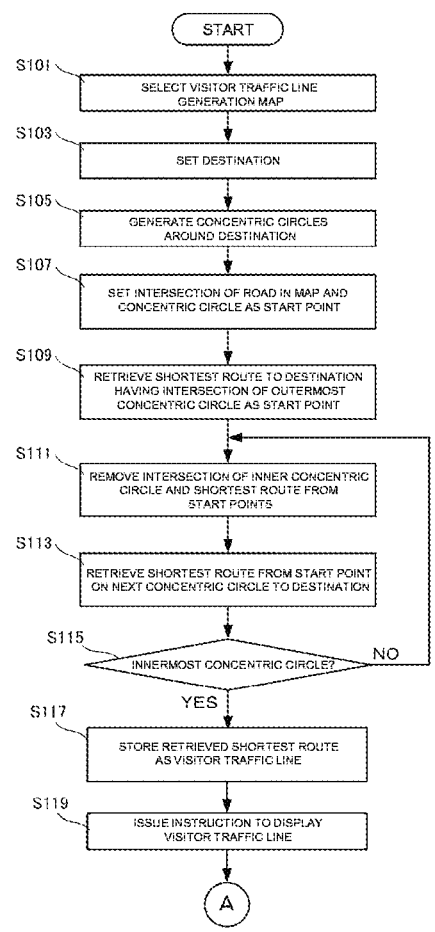
FIG. 1G is a flowchart showing process steps performed by the information processing device of the first embodiment of the present invention.
Figure 1H:
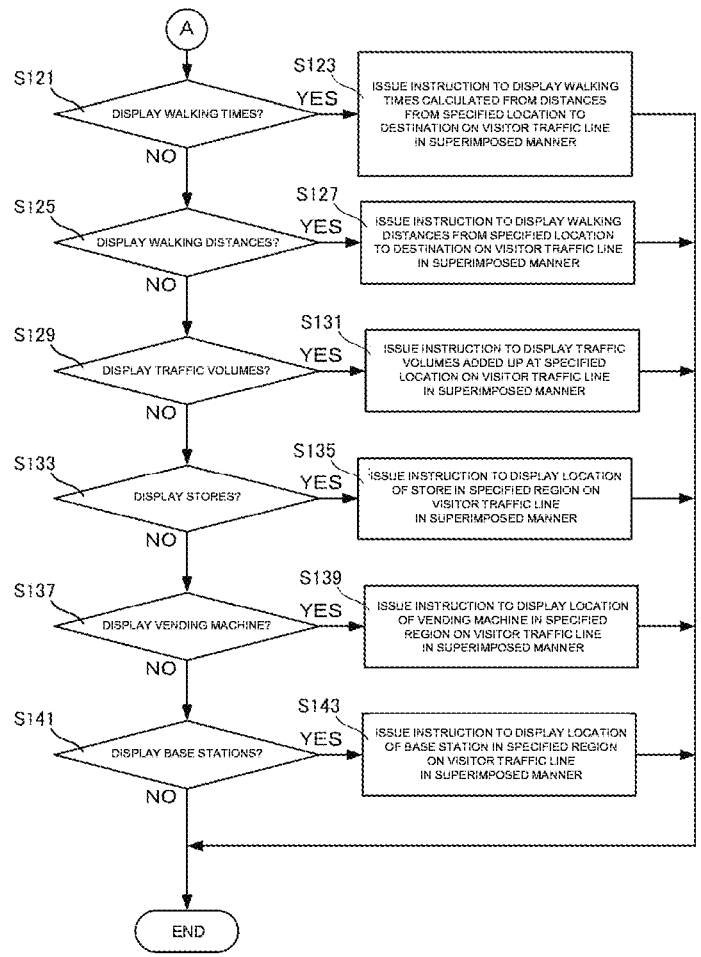
FIG. 1H is a flowchart showing process steps performed by the information processing device of the first embodiment of the present invention.

FIGS. 1G and 1H are flowcharts showing process steps performed by the information processing device 10 according to the present embodiment. The CPU 120 in FIG. 1D performs the steps in these flowcharts using the RAM 140 and thus implements the functional elements in FIG. 1C.

In step S101 of FIG. 1G, the information processing device 10 selects a desired map on which a visitor traffic line is to be generated. In step S103, the server 10 sets a destination around which visitor traffic lines are to be generated. In step S105, the information processing device 10 generates concentric circles spaced by a predetermined distance around the destination. In step S107, the information processing device 10 sets the intersections of roads in the desired map and the concentric circles, as the start points of the shortest routes to the destination.

In step S109, the information processing device 10 retrieves the shortest route to the destination having the intersection of the outermost (most distant from the destination) concentric circle and the road as the start point. In step S111, the information processing device 10 removes the intersections of the inner concentric circles and the shortest route retrieved in step S109 from the start point for retrieving the shortest route to the destination. In step S113, the information processing device 10 retrieves the shortest route from the next concentric circle (the second outermost concentric circle) to the destination. In step S115, the information processing device 10 determines whether the current concentric circle is the innermost (closest to the destination) concentric circle.

If the current concentric circle is not the innermost concentric circle, the server 10 returns to step S111 and repeatedly retrieves the shortest route from the start point to the destination. If the current concentric circle is the innermost concentric circle, the information processing device 10, in step S117, stores a group of the retrieved shortest routes as visitor traffic lines to the destination. In step S119, the server 10 issues an instruction to display the generated visitor traffic lines on the map.

In step S121 of FIG. 1H, the server 10 determines whether an instruction to display walking times on the visitor traffic line has been issued. If an instruction to display walking times has been issued, the information processing device 10, in step S123, issues an instruction to display walking times calculated from the distances from specified locations on the visitor traffic line to the destination, on the visitor traffic line in a superimposed manner.

If an instruction to display walking times has not been issued, the information processing device 10, in step S125, determines whether an instruction to display walking distances on the visitor traffic line has been issued. If an instruction to display walking distances has been issued, the information processing device 10, in step S127, issues an instruction to display the distances from the specified location on the visitor traffic line to the destination, on the visitor traffic line in a superimposed manner.

If an instruction to display walking distances has not been issued, the information processing device 10, in step S129, determines whether an instruction to display predicted traffic volumes on the visitor traffic line has been issued. If an instruction to display predicted traffic volumes has been issued, the information processing device 10, in step S131, calculates predicted traffic volumes at the specified locations on the visitor traffic line while adding up the traffic volumes on the corresponding visitor traffic line. It then issues an instruction to display the calculated predicted traffic volumes on the visitor traffic line in a superimposed manner.

If an instruction to display predicted traffic volumes has not been issued, the information processing device 10, in step S133, determines whether an instruction to display stores in a specified region (a display map region) has been issued. If an instruction to display stores in the specified region has been issued, the information processing device 10, in step S135, issues an instruction to distinguishably display the locations of the stores in the specified region on the visitor traffic line in a superimposed manner using marks, colors, or the like. If an instruction to display the stores in the specified region has not been issued, the information processing device 10, in step S137, determines whether an instruction to display vending machines in the specified region has been issued. If an instruction to display vending machines in the specified region has been issued, the information processing device 10, in step S139, issues an instruction to distinguishably display the locations of the vending machines in the specified region on the visitor traffic line in a superimposed manner using marks, colors, or the like. If an instruction to display the vending machines in the specified region has not been issued, the information processing device 10, in step S141, determines whether an instruction to display base stations in the specified region has been issued. If an instruction to display the base stations in the specified region has been issued, the information processing device 10, in step S143, issues an instruction to distinguishably display the locations of the base stations in the specified region on the visitor traffic line in a superimposed manner using marks, colors, or the like.

Display Transitions

Figure 2A:
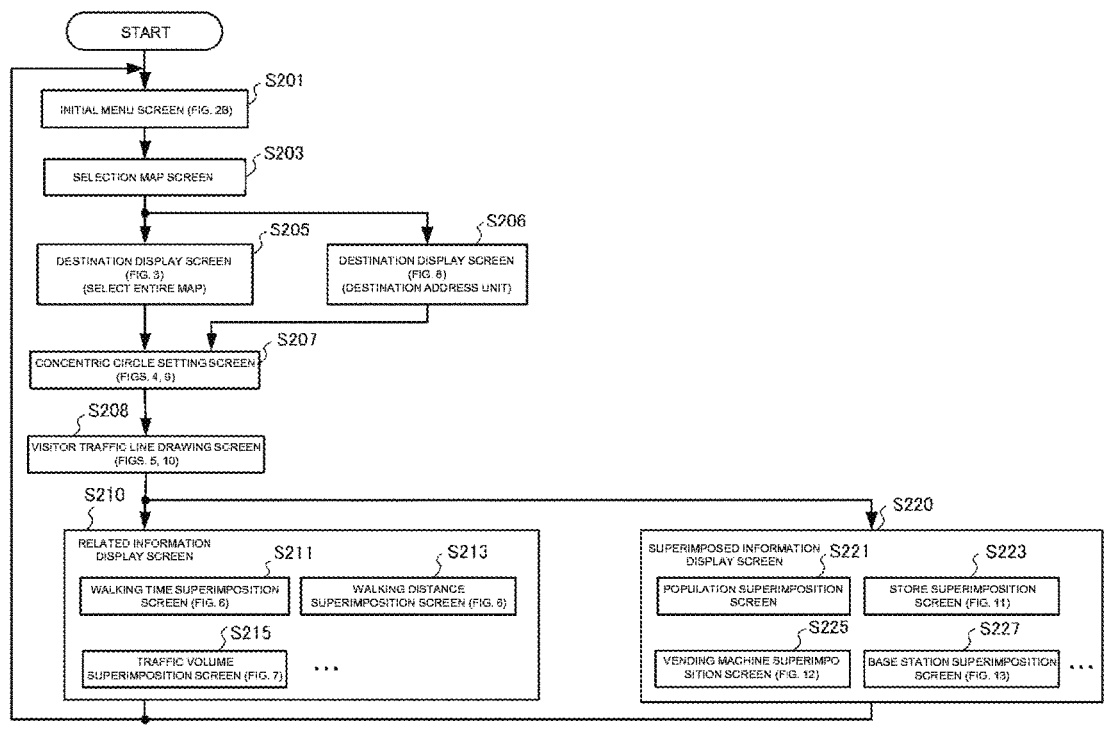
FIG. 2A is a diagram showing display transitions of the first embodiment of the present invention.

FIG. 2A is a diagram showing display transitions of the present embodiment. The process of generating a visitor traffic line in accordance with a user instruction are visualized through the following display transitions. However, if the server 10 automatically performs this process within itself, there is no need to display the states (e.g., the intersections of concentric circles and roads) in the middle of generating a visitor traffic line. If the system is configured as follows: the information processing device 10 generates a visitor traffic line and various types of information and transmits them to a communication terminal; and the communication terminal displays them, the display transitions represent the operations of the communication terminal.

When the visitor traffic line generation application is started, the information processing device 10, in step S201, displays an initial menu screen (FIG. 2B) on the display. When a map is selected and specified on the initial menu screen (FIG. 2B), the information processing device 10, in step S203, displays the selected and specified map on the display. Then, when a destination is set and an instruction to generate visitor traffic lines to the destination over the entire map is issued, the information processing device 10, in step S205, displays a destination display screen (FIG. 3) on the display. On the other hand, when a destination is set and an instruction to generate visitor traffic lines to the destination in an address unit is issued, the information processing device 10, in step S206, displays a destination display screen (FIG. 8) on the display.

Figure 4:
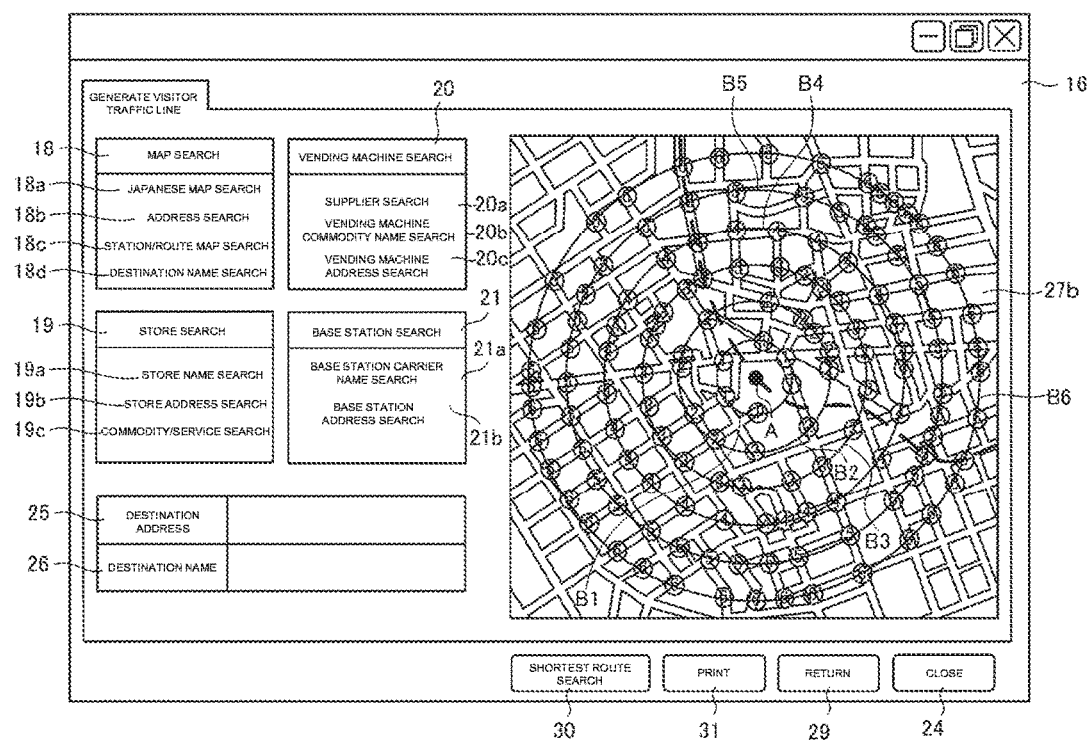
FIG. 4 is a diagram showing an example of a concentric circle display screen displayed on the display.
Figure 5:
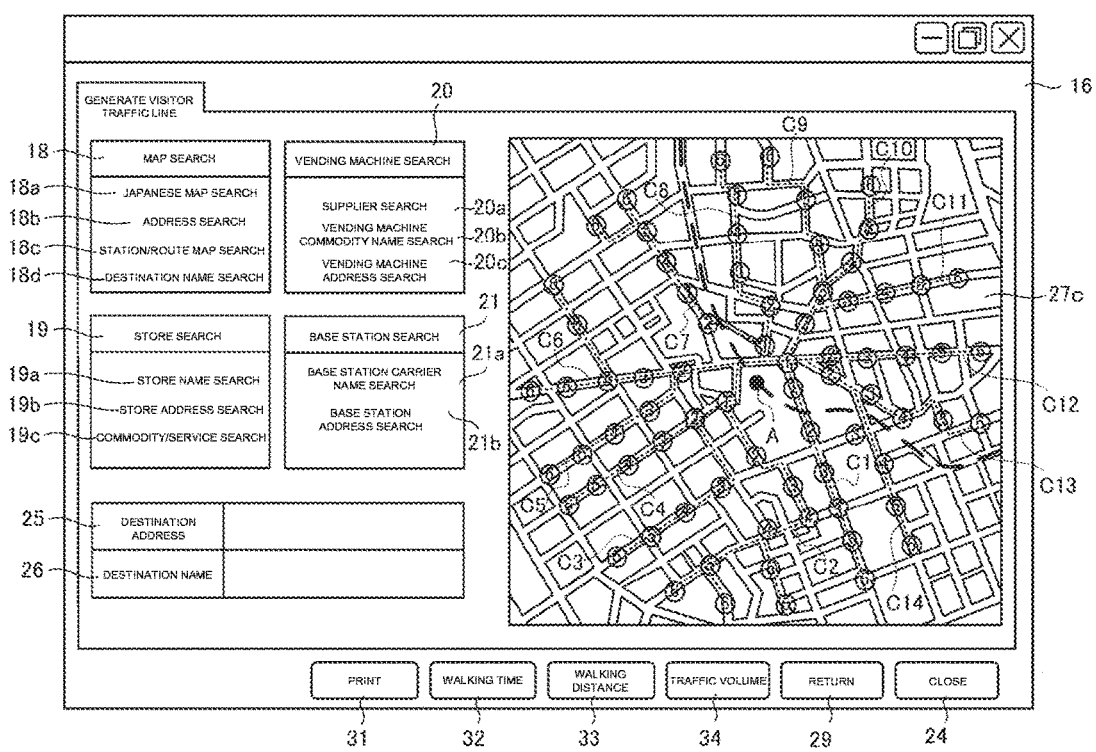
FIG. 5 is a diagram showing an example of a visitor traffic line display screen displayed on the display.
Figure 9:
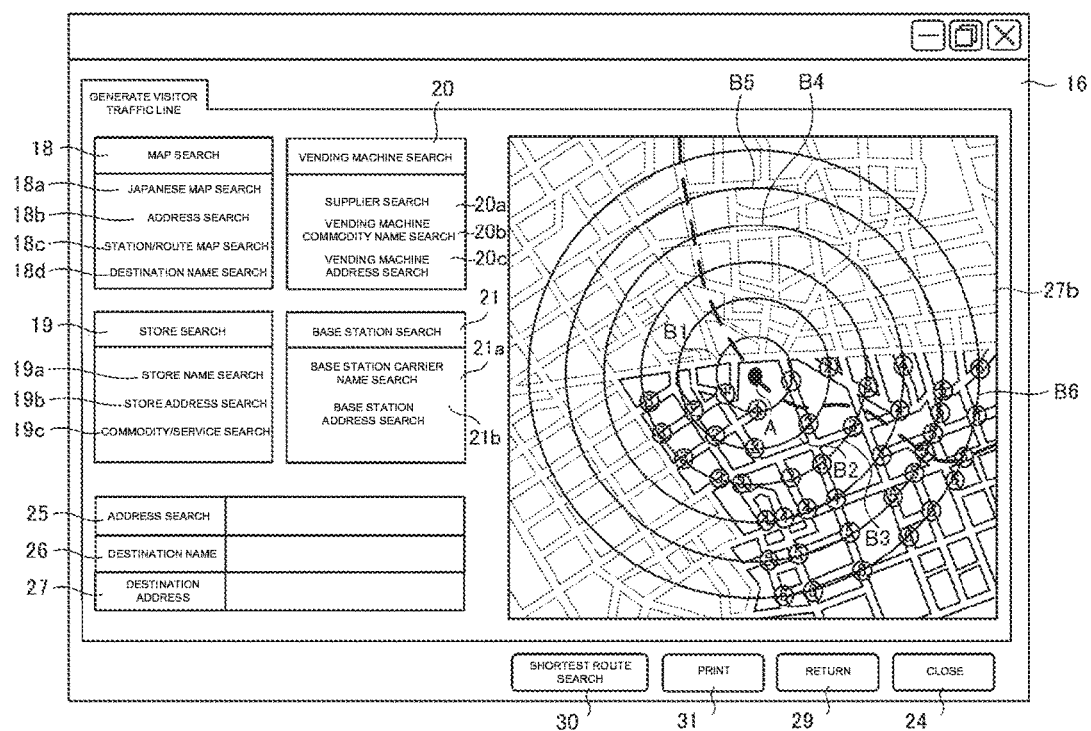
FIG. 9 is a diagram showing another example of a concentric circle display screen displayed on the display.
Figure 10:
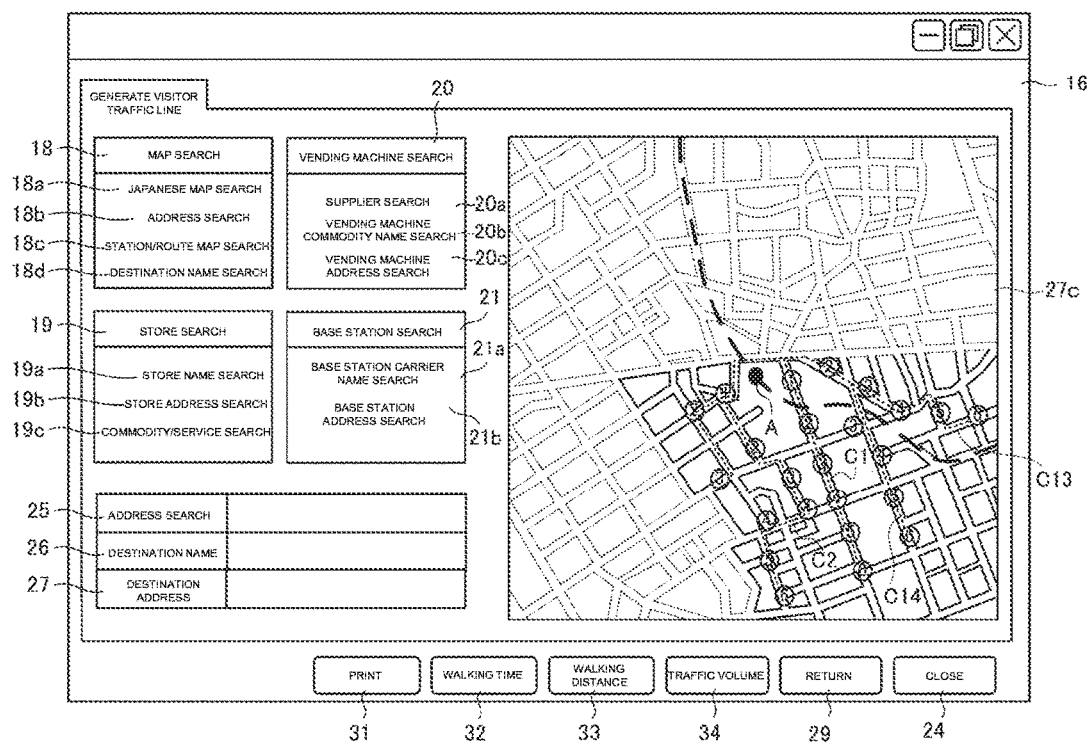
FIG. 10 is a diagram showing another example of a visitor traffic line display screen displayed on the display.

Then, in step S207, the information processing device 10 displays a concentric circle setting screen (FIG. 4 or 9) on the display. When visitor traffic lines are generated, the information processing device 10, in step S208, displays a visitor traffic line drawing screen (FIG. 5 or 10).

Figure 6:
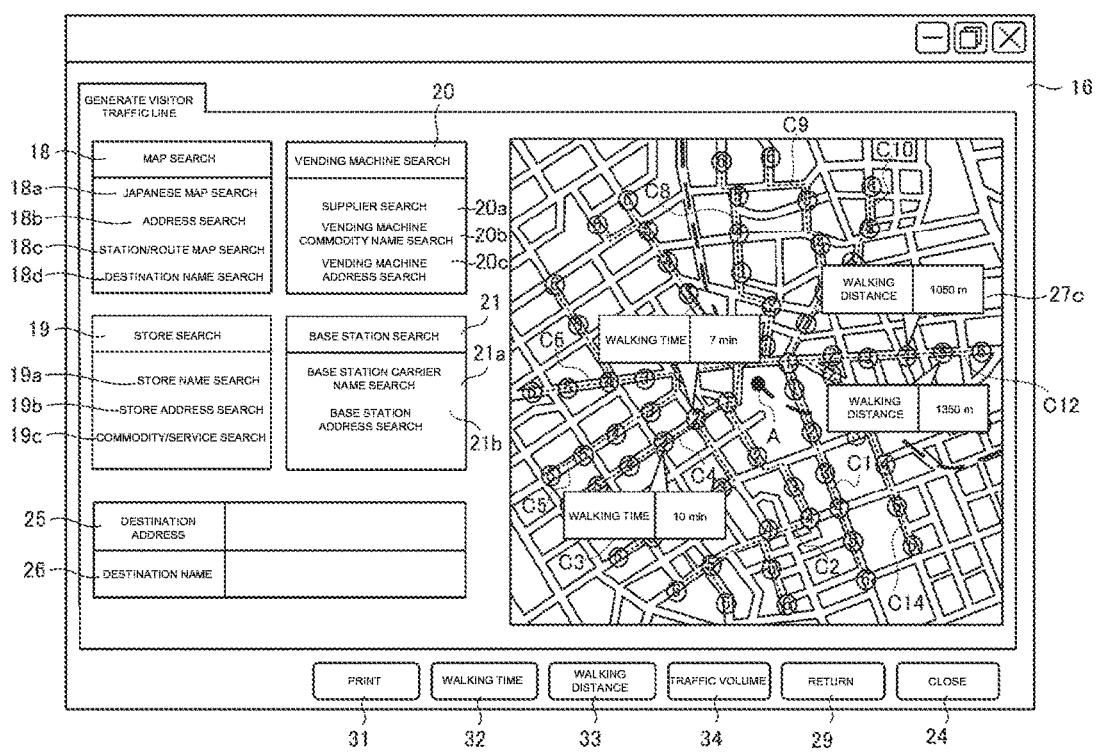
FIG. 6 is a diagram showing an example of a visitor traffic line/walking time/walking distance display screen displayed on the display.
Figure 7:
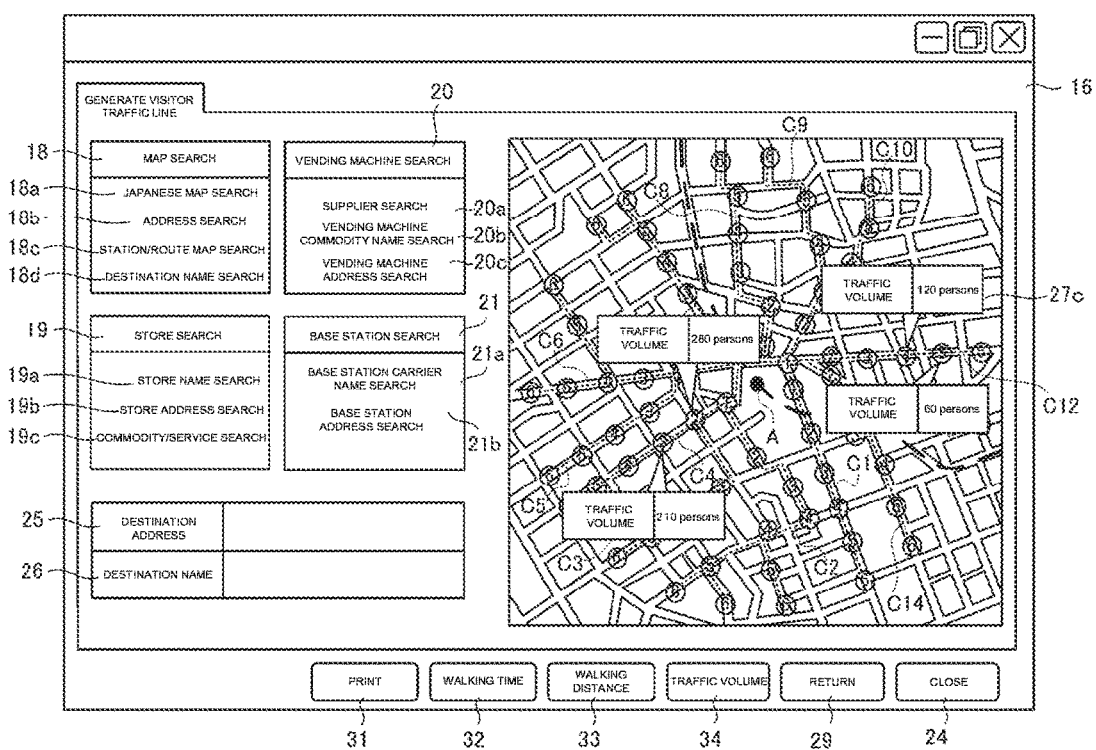
FIG. 7 is a diagram showing an example of a visitor traffic line/traffic volume display screen displayed on the display.

When an instruction to display related information at specified locations on the visitor traffic line is issued, the information processing device 10, in step S210, displays a related information display screen on the display. The related information display screen includes a walking times superimposition screen (S211: FIG. 6), a walking distance superimposition screen (S213: FIG. 6), and a traffic volume superimposition screen (S215: FIG. 7).

Figure 11:
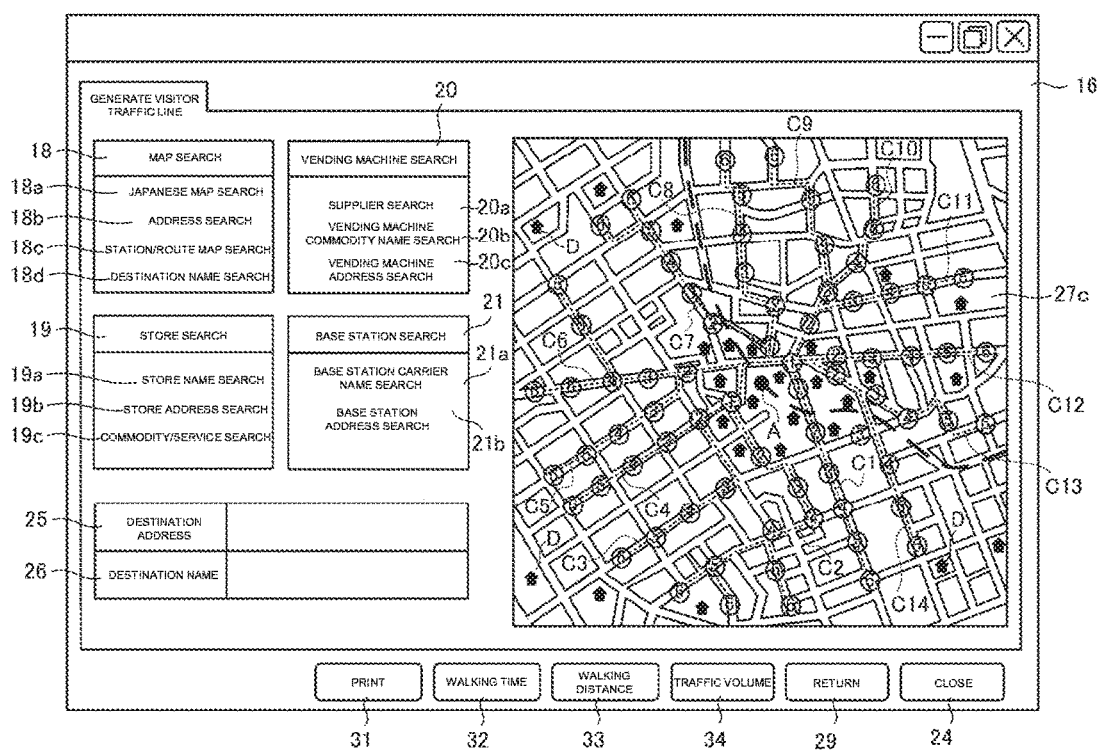
FIG. 11 is a diagram showing an example of a visitor traffic line/store display screen displayed on the display.
Figure 12:
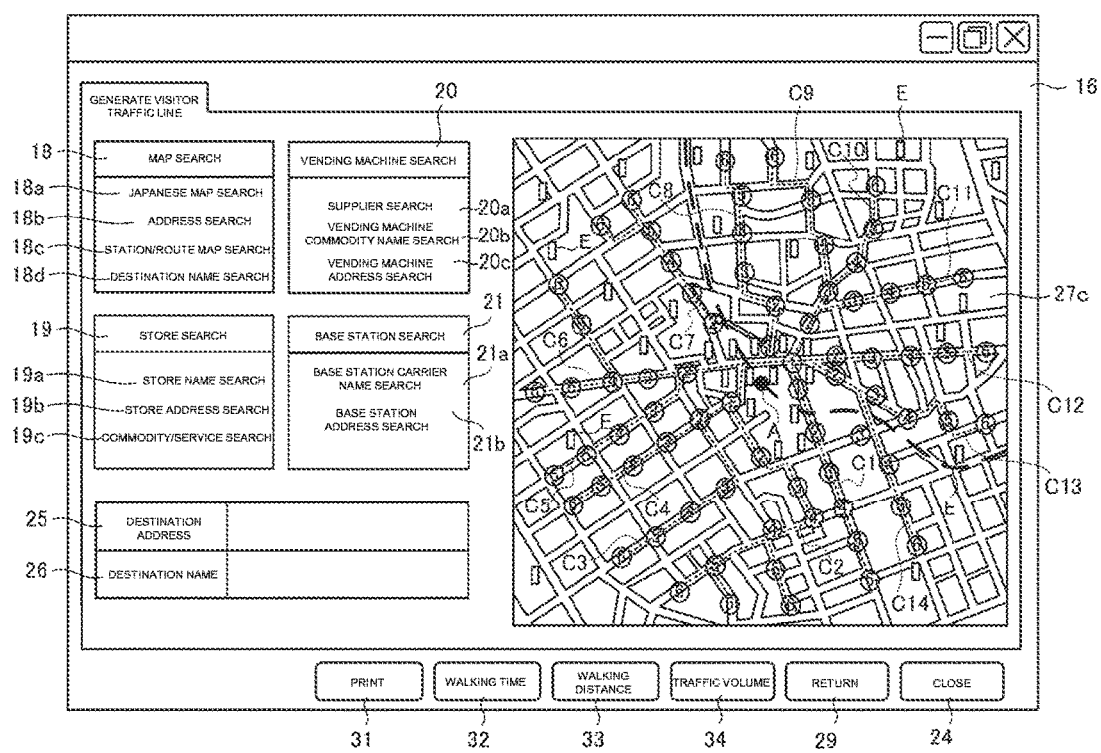
FIG. 12 is a diagram showing an example of a visitor traffic line/vending machine display screen displayed on the display.
Figure 13:
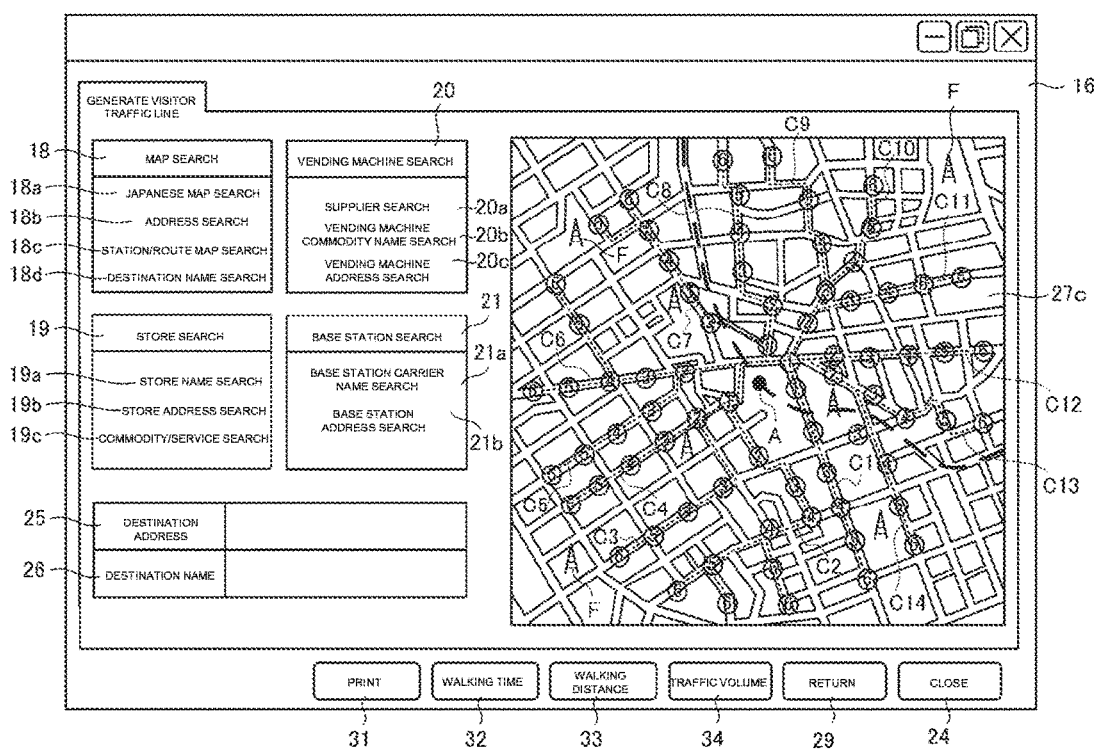
FIG. 13 is a diagram showing an example of a visitor traffic line/base station display screen displayed on the display.

When an instruction to display superimposed information is issued, the information processing device 10, in step S220, displays a superimposed information display screen on the display. The superimposed information display screen includes a population superimposition screen (S221: not shown), a store superimposition screen (S223: FIG. 11), a vending machine superimposition screen (S225: FIG. 12), and a base station superimposition screen (S227: FIG. 13).

Hereafter, the display screens will be sequentially described in detail.

Initial Screen

Figure 2B:
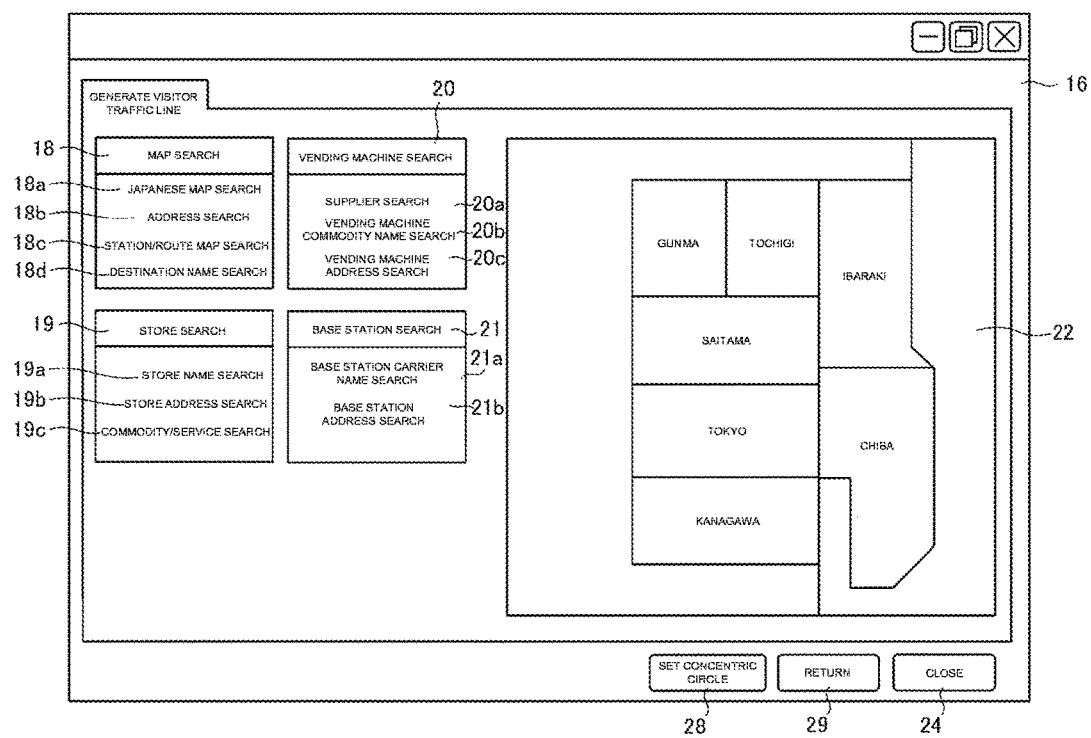
FIG. 2B is a diagram showing an example of an initial screen displayed on a display.

FIG. 2B is a diagram showing an example of the initial screen displayed on the display 16 of the server 10. Note that FIG. 2B does not show addresses or multiple names, such as building names, condominium names, station names, route names, road names, store names, and public facility names, present in a map display area 22. When the server 10 is started, an icon (not shown) of the visitor traffic line generation system appears on the display 16 connected to the server 10. When the icon of the visitor traffic line generation system is clicked, a log-in screen (not shown) appears on the display 16. The log-in screen includes an ID input area, a password input area, and a log-in button. After inputting ID to the ID input area and inputting a password to the password input area, the log-in button is clicked.

When the log-in button is clicked, the initial screen shown in FIG. 2B appears on the display 16. The initial screen includes a map search area 18, a store search area 19, a vending machine search area 20, a base station search area 21, a map display area 22, a data display button 23, and a close button 24. Although not shown, the map display area 22 includes multiple names, such as addresses, building names, station names, route names, road names, and store names. Housing map data of a predetermined region (e.g., the Kanto area, Tokyo Metropolis, Chiba Prefecture) can be retrieved from a map shown in the map display area 22. When the close button 24 is clicked, the server 10 logs out of the system.

The map search area 18 includes a Japanese map search button 18a, an address search button 18b, a station/route map search button 18c, and a destination name search button 18d. By clicking the Japanese map search button 18a, a Japanese map appears. Housing map data of a predetermined region (e.g., the Kanto area, Tokyo Metropolis, Chiba Prefecture) can be retrieved on the basis of the Japanese map. Alternatively, by logging into the cloud 11 or another server 12 or 13 using the Internet 17, housing map data of a predetermined region can be acquired from the cloud 11 or server 12 or 13 using Japanese map data stored in the cloud 11 or server 12 or 13.

By clicking the address search button 18b to display an address input area and then inputting a predetermined address to the address input area, housing map data of a predetermined region corresponding to that address can be retrieved. Alternatively, by logging into the cloud 11 or server 12 or 13 using the Internet 17 and inputting a predetermined address to an address search screen using address data stored in the cloud 11 or server 12 or 13, housing map data of a predetermined region corresponding to that address can be acquired from the cloud 11 or server 12 or 13.

By clicking the station/route map search button 18c to display a station input area or route input area and then inputting a predetermined station name or route name to the station input area or route input area, housing map data of a predetermined region corresponding to that station name or route name can be retrieved. Alternatively, by logging into the cloud 11 or server 12 or 13 using the Internet 17 and then inputting a predetermined station name or route name to a station name search screen or route name search screen using station/route data stored in the cloud 11 or server 12 or 13, housing map data of a predetermined region corresponding to that station name or route name can be acquired from the cloud 11 or server 12 or 13.

By clicking the destination name search button 18d to display a destination name input area and then inputting a predetermined destination name in the destination name input area, housing map data of a predetermined region corresponding to that destination name can be retrieved. Alternatively, by logging into the cloud 11 or server 12 or 13 using the Internet 17 and then inputting a predetermined destination name to a destination name search screen using destination name data stored in the cloud 11 or server 12 or 13, housing map data of a predetermined region corresponding to that destination name can be acquired from the cloud 11 or server 12 or 13. Examples of the destination name include building names, condominium names, station names, route names, road names, store names (including mass retailer names and department store names), and public facility names.

The store search area 19 includes a store name search button 19a, a store address search button 19b, and a commodity/service search button 19c. By clicking the store name search button 19a to display a store name input area and then inputting a predetermined store name to the store name input area, a store or service provider having that store name present in the housing map data can be displayed on the housing map data. Alternatively, by logging into the cloud 11 or server 12 or 13 using the Internet 17 and then inputting a predetermined store name to a store name search screen using store name data stored in the cloud 11 or server 12 or 13, a store or service provider having that store name can be acquired from the cloud 11 or server 12 or 13, and the store or service provider having that store name present in the housing map data can be displayed on the housing map data.

By clicking the store address search button 19b to display a store address input area and then inputting a predetermined address to the store address input area, a store having that store address (as well as stores selling the same kinds of commodities as those of that store) or a service provider having that store address (as well as providers providing the same kinds of services as those of that provider) present in the housing map data can be displayed on the housing map data. Alternatively, by logging into the cloud 11 or server 12 or 13 using the Internet 17 and then inputting a predetermined store address to a store address search screen using store address data stored in the cloud 11 or server 12 or 13, a store or service provider having that store address can be acquired from the cloud 11 or server 12 or 13, and a store having the store address (as well as stores selling the same kinds of commodities as those of that store) or a service provider having the store address having the store address (as well as providers providing the same kinds of services as those of that provider) present in the housing map data can be displayed on the housing map data.

By clicking the commodity/service search button 19c to display a commodity name input area and a service name input area and then inputting a predetermined commodity name to the commodity name input area or inputting a predetermined service name to the service name input area, stores selling a commodity having that commodity name or service providers providing a service having that service name present in the housing map data can be displayed on the housing map data. Alternatively, by logging into the cloud 11 or server 12 or 13 using the Internet 17 and then inputting a predetermined commodity name or service name to a commodity/service search screen using commodity/service data stored in the cloud 11 or server 12 or 13, stores selling a commodity having that commodity name or service providers providing a service having that service name can be acquired from the cloud 11 or server 12 or 13, and the stores selling the commodity having that commodity name or the service providers providing the service having that service name present in the housing map data can be displayed on the housing map data.

The vending machine search area 20 includes a supplier search button 20a, a vending machine commodity name search button 20b, and a vending machine installation address search button 20c. By clicking the supplier search button 20a to display a supplier name input area and then inputting a predetermined supplier name to the supplier name input area, vending machines for commodities supplied by that supplier present in the housing map data can be displayed on the housing map data. Alternatively, by logging into the cloud 11 or server 12 or 13 using the Internet 17, vending machines for commodities supplied by that supplier present in the housing map data can be displayed on the housing map data using supplier data stored in the cloud 11 or server 12 or 13.

By clicking the vending machine commodity name search button 20b to display a vending machine commodity name input area and then inputting a predetermined vending machine commodity name to the vending machine commodity name input area, vending machines for a commodity having that vending machine commodity name present in the housing map data can be displayed on the housing map data. Alternatively, by logging into the cloud 11 or server 12 or 13 using the Internet 17 and then inputting a predetermined vending machine commodity name to a vending machine commodity name search screen using vending machine commodity data stored in the cloud 11 or server 12 or 13, vending machines supplying a commodity having the vending machine commodity name can be acquired from the cloud 11 or server 12 or 13, and the vending machines supplying the commodity having the vending machine commodity name present in the housing map data can be displayed on the housing map data.

By clicking the vending machine installation address search button 20c to display a vending machine installation address input area and then inputting a predetermined address to the vending machine installation address input area, a vending machine corresponding to that vending machine address (as well as vending machines supplying the same kinds of commodities as those of that vending machine) present in the housing map data can be displayed on the housing map data. Alternatively, by logging into the cloud 11 or server 12 or 13 using the Internet 17 and then inputting a predetermined vending machine address to a vending machine installation address search screen using vending machine address data stored in the cloud 11 or server 12 or 13, a vending machine corresponding to that vending machine address can be acquired from the cloud 11 or server 12 or 13, and the vending machine corresponding to that vending machine address (as well as vending machines supplying the same kinds of commodities as those of that vending machine) present in the housing map data can be displayed on the housing map data.

The base station search area 21 includes a base station carrier name search button 21a and a base station address search button 21b. By clicking the base station carrier name search button 21a to display a base station carrier name input area and then inputting a predetermined carrier name to the base station carrier name input area, base stations installed by a carrier having that carrier name present in the housing map data can be displayed on the housing map data. Alternatively, by logging into the cloud 11 or server 12 or 13 using the Internet 17 and then inputting a predetermined base station carrier name to the base station carrier search screen using base station carrier data stored in the cloud 11 or server 12 or 13, base stations installed by a carrier having that carrier name can be acquired from the cloud 11 or server 12 or 13, and the base stations installed by the carrier having that carrier name present in the housing map data can be displayed on the housing map data.

By clicking the base station address search button 21b to display a base station installation address input area and then inputting a predetermined base station installation address to the base station installation address input area, a base station installed at that base station address (as well as base stations installed by a carrier that has installed that base station) present in the housing map data can be displayed on the housing map data. Alternatively, by logging into the cloud 11 or server 12 or 13 using the Internet 17 and then inputting a predetermined base station installation address to a base station installation address search screen using base station installation address data stored in the cloud 11 or server 12 or 13, a base station corresponding to that base station address can be acquired from the cloud 11 or server 12 or 13, and the base station corresponding to that base station address (as well as base stations installed by a carrier that has installed that base station) present in the housing map data can be displayed on the housing map data.

Visitor Traffic Line Generation Screen

Figure 3:
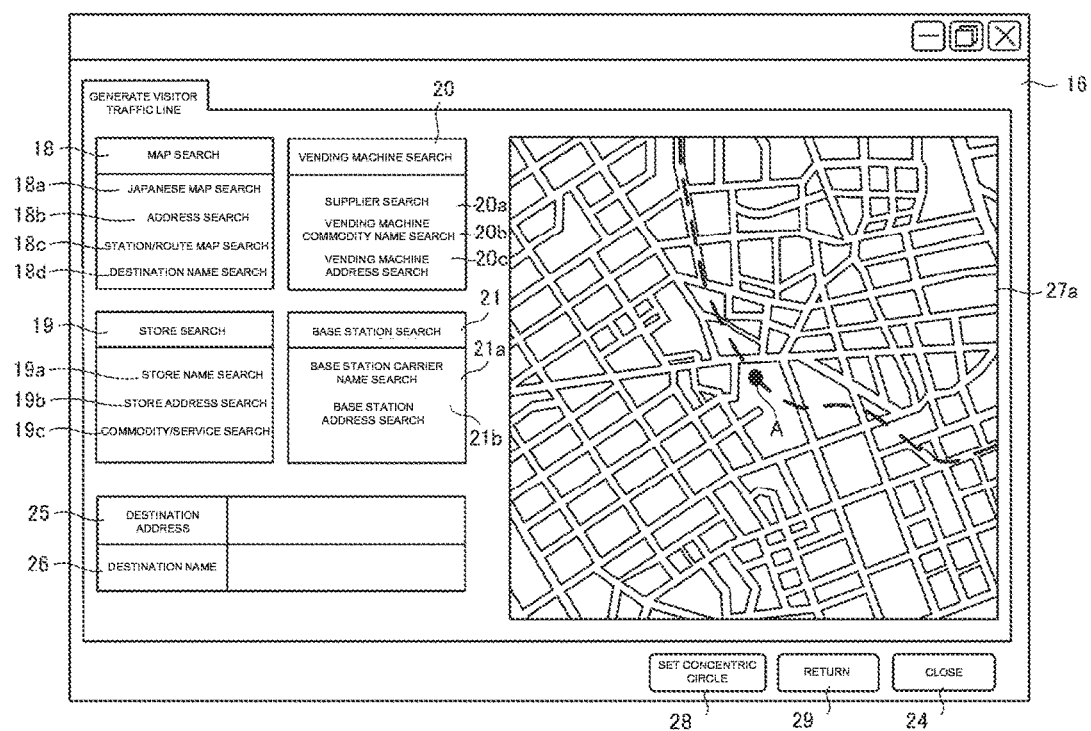
FIG. 3 is a diagram showing an example of a housing map data display screen displayed on the display.

FIG. 3 is a diagram showing an example of a housing map data display screen displayed on the display 16. FIG. 4 is a diagram showing an example of a concentric circle display screen displayed on the display 16. FIG. 5 is a diagram showing an example of a visitor traffic line display screen displayed on the display 16. Note that FIGS. 3 to 5 does not show data present in respective display areas, or addresses or multiple names, such as, building names, condominium names, station names, route names, road names, store names, and public facility names, present in housing map data display areas 27a to 27c. In FIG. 3, it is assumed that address search is performed in the map search area 18 and a subway station (a destination A) is retrieved.

By clicking the address search button 18b on the initial screen in FIG. 2B, then inputting a predetermined address to the address input area, and clicking the search button, housing map data of a predetermined region corresponding to that address is retrieved. Thus, a destination input screen (not shown) indicating the retrieved housing map data appears on the display 16. The destination input screen includes a housing map data display area, a destination address input area, a destination name input area, an address unit specification input area, an OK button, a clear button, a return button, and a close button. When the clear button is clicked, data inputted to the respective input areas is cleared. In this case, data is inputted to the input areas again. When the return button is clicked, the screen returns to the immediately preceding screen (the initial screen in FIG. 2B).

A destination (a subway station) is specified on the destination input screen in the following manners: a destination mark is placed at a predetermined location in the housing map data display area using the mouse 15; a destination address is inputted to the destination address input area and then the set button is clicked; a destination name is inputted to the destination name input area and then the set button is clicked; and a destination address is inputted to the destination address input area, a destination name is inputted to the destination name input area, and then the set button is clicked. Here, it is assumed that on the destination input screen, a destination mark is placed at a predetermined location in the housing map data display area using the mouse 15 to specify a subway station and then the OK button is clicked.

When the destination (subway station) is confirmed by the click of the OK button, the housing map data display screen in FIG. 3 indicating the housing map data appears on the display 16. As with the initial screen in FIG. 2B, the housing map data display screen in FIG. 3 includes a map search area 18, a store search area 19, a vending machine search area 20, and a base station search area 21. The house map data display screen also includes a destination address display area 25, a destination name display area 26, and a housing map data display area 27a, as well as a concentric circle setting button 28, a return button 29, and a close button 24.

The destination address inputted to the destination address input area of the destination input screen appears in the destination address display area 25. The name of a destination (the name of a subway station) present at the address in the search address display area 25 appears in the destination name display area 26. Examples of the destination name include building names, condominium names, route names, road names, store names (including mass retailer names and department store names), and public facility names.

The housing map data display area 27a of the housing map data display screen in FIG. 3 includes a predetermined region including the destination A, as well as a mark indicating the location of the confirmed destination A. While the confirmed destination A is shown by a black circle in FIG. 3, the destination A may be shown by any other mark, such as □, ○, star-shaped logo or the like in place of the black circle.

When the concentric circle setting button 28 is clicked in the housing map data display screen in FIG. 3, a walking time/walking distance/concentric circle number input screen (not shown) appears on the display 16. The walking time/walking distance/concentric circle number input screen includes a walking time input area for inputting the walking time from the destination A, a walking distance input area for inputting the walking distance from the destination A, a concentric circle number input area for inputting the number of concentric circles, an OK button, a clear button, a return button, and a close button. When the clear button is clicked, numbers inputted to the walking distance input area, walking time input area, and concentric circle number input area are cleared. In this case, numbers are inputted to the input areas again.

When a walking distance (e.g., 1500 m) is inputted to the walking distance input area; a walking time (e.g., 20 minutes) is inputted to the walking time input area; a concentric circle number (e.g., 6) is inputted to the concentric circle number input area; and then the OK button is clicked, the server 10 displays first to sixth concentric circles B1 to B6 (first to n-th concentric circles) around the arbitrarily selected destination A in the housing map data display area 27a (a first to n-th concentric circle display process). The server 10 also displays first to sixth locations (1) to (6) (first to n-th locations) at the intersections of roads displayed on the housing map data display area 27b and the first to sixth concentric circles B1 to B6 (a first to n-th location display process).

The concentric circle display screen shown in FIG. 4 appears on the display 16. As with the housing map data display screen in FIG. 3, the concentric circle display screen in FIG. 4 includes a map search area 18, a store search area 19, a vending machine search area 20, a base station search area 21, a destination address display area 25, a destination name display area 26, a housing map data display area 27b, a return button 29, and a close button 24. The concentric circle display screen also includes a shortest route search button 30 and a print button 31. When the print button 31 is clicked, housing map data displayed in the housing map data display area 27b is printed.

The first concentric circle B1 is shown in the housing map data display area 27b so as to be closest to the center (the destination A). Also, the second to sixth concentric circles B2 to B6 (the second to n-th concentric circles) which are spaced from each other by the same size from the first concentric circle B1 radially outward are shown radially outward around the destination A in the predetermined region. While the six concentric circles, B1 to B6, are shown in FIG. 4, any number of concentric circles may be shown. Five or less or seven or more concentric circles may be shown.

On the housing map data display area 27b, marks (6) are shown at the intersections of the sixth concentric circle (B6) and roads; marks (5) are shown at the intersections of the fifth concentric circle (B5) and roads; marks (4) are shown at the intersections of the fourth concentric circle (B4) and roads; marks (3) are shown at the intersections of the third concentric circle (B3) and roads; marks (2) are shown at the intersections of the second concentric circle (B2) and roads; and marks (1) are shown at the intersections of the first concentric circle (B1) and roads.

When the shortest route search button 30 is clicked on the concentric circle display screen in FIG. 4, the server 10 retrieves the shortest walking routes from the sixth locations (6) (the n-th locations) to the destination A. Then, the server 10 retrieve the shortest walking routes from the fifth locations (5) [the (n−1)-th locations] on the concentric circles B5, which are each more inside than the corresponding sixth locations (6) (the n-th locations) by one location, to the destination A. In this way, the server 10 sequentially retrieve the shortest routes from the respective locations to the destination A, starting with those from the sixth locations (6) (the n-th locations) to the destination A and ending with those from to the first locations (1) to the destination A (a shortest route retrieval process).

The server 10 then displays the shortest routes from the sixth to first locations (the n-th to first locations) to the destination A retrieved by the shortest route retrieval process on the housing map data (a shortest route display process). The server 10 then deletes the first to sixth concentric circles (the first to n-th concentric circles) and displays, as visitor traffic lines, the shortest routes from the sixth (the n-th) to first locations to the destination A displayed by the shortest route display process in the housing map data (a visitor traffic line display process). At this time, the visitor traffic line display screen shown in FIG. 5 appears on the display 16. The server 10 also calculates the walking times taken to walk from the sixth to first locations to the destination A on the shortest route (a walking time calculation process) and calculates the walking distances from the sixth to first locations to the destination A on the shortest route (a walking distance calculation process).

The server 10 also retrieves the population of a "chome" unit, a "chome-ban" unit, or a "chome-ban-go" unit (in the Japanese addressing system) in which each of the first to sixth locations (the first to n-th locations) is located (a population retrieval process). The server 10 also retrieves populations with reference to the household number and population information by "cho-chome" of each municipality and the population information by "cho-chome" and age of each municipality. The server 10 then sequentially adds up the retrieved populations from the sixth locations (6) (the n-th locations) toward the first locations (1) on visitor traffic lines C1 to C14 (a population addition process).

In the population addition process, the server 10 adds the population of a fifth location to the population of a sixth location, adds the population of a fourth location to the population of the sixth and fifth locations, adds the population of a third location to the population of the sixth to fourth locations, adds the population of a second location to the population of the sixth to third locations, and adds the population of a first location to the population of the sixth to second locations.

The server 10 also retrieves the population by sex of a "chome" unit, a "chome-ban" unit, or a "chome-ban-go" unit (in the Japanese addressing system) in which each of the first to sixth locations (the first to n-th locations) is located (a population retrieval process). The server 10 then sequentially adds up the retrieved populations by sex from the sixth locations (6) (the n-th locations) toward the first locations (1) on the visitor traffic lines C1 to C14 (a population addition process). The server 10 also retrieves the population by age or by age group of a "chome" unit, a "chome-ban" unit, or a "chome-ban-go" unit (in the Japanese addressing system) in which each of the first to sixth locations (the first to n-th locations) is located (a population retrieval process). The server 10 then sequentially adds up the retrieved populations by age or by age group from the sixth locations (6) (the n-th locations) toward the first locations (1) on the visitor traffic lines C1 to C14 (a population addition process).

Note that if the shortest route from a sixth location (6) (an n-th location) to the destination A retrieved in the shortest route retrieval process passes through a particular fifth location (5) [a (n−1)th location], which is more inside than the sixth location by one location, and then a particular first location (1), this means that the route from the particular fifth location (5) [the (n−1)th location] through the particular first location (1) to the destination included in the shortest route has already been determined as the shortest route from the particular fifth location through the particular first location to the destination. For this reason, the shortest route from the particular fifth location (5) [the (n−1)th location] through the particular first location (1) to the destination A is no longer retrieved.

As with the concentric circle display screen in FIG. 4, the visitor traffic line display screen in FIG. 5 includes a map search area 18, a store search area 19, a vending machine search area 20, a base station search area 21, a destination address display area 25, a destination name display area 26, a housing map data display area 27*c*, a print button 31, a return button 29, and a close button 24, as well as a walking time button 32, a walking distance button 33, and a traffic volume button 34. When the print button 31 is clicked, housing map data displayed in the housing map data display area 27*c* is printed. The visitor traffic lines C1 to C14 from the sixth locations (6) to the center (the destination A) are displayed on the housing map data display area 27*c*.

When a file button (not shown) of a menu bar on the display 16 is clicked and then a button for saving a file (not shown) is clicked, the server 10 stores housing map data displayed in the housing map data display area 27*b* or 27*c* in the hard disk so as to be associated with a file name and the creation date and time (a housing map data storage process).

The server 10 stores, in the hard disk, the housing map data, as well as the destination address displayed in the destination address display area 25, the destination name displayed in the destination name display area 26, the destination A, the first to sixth concentric circles (B1) to (B6), the first to sixth locations (1) to (6), the visitor traffic lines C1 to C14 (the shortest route), the walking times from the respective locations to the destination A, the walking distances from the respective locations to the destination A, the retrieved populations of the "chome" unit, "chome-ban" unit, or "chome-ban-go" unit (in the Japanese addressing system) in which each of the sixth (n-th) to first locations is located, the retrieved populations by sex of the "chome" unit, "chome-ban" unit, or "chome-ban-go" unit (in the Japanese addressing system) in which each of the sixth (the n-th) to first locations is located, and the retrieved populations by age or by age group of the "chome" unit, "chome-ban" unit, or "chome-ban-go" unit (in the Japanese addressing system) in which each of the sixth (the n-th) to first locations is located so as to be associated with the file name and the creation date and time (a data storage process).

When a data display button 23 on the initial screen in FIG. 2B is clicked, a file display screen (not shown) appears on the display 16. The file display screen includes a file name display area indicating a list of file names, an open button, a return button, and a close button. When a predetermined file name in the file name display area is specified (reversed; multiple files can be specified) and then the open button is clicked, housing map data having the specified file name appears on the display 16 along with the creation date and time. The housing map data here includes the destination address displayed in the destination address display area 25, the destination name displayed in the destination name display area 26, the destination A, the first to sixth concentric circles (B1) to (B6), the first to sixth locations (1) to (6), the visitor traffic lines C1 to C14 (the shortest route)

The visitor traffic line generation system of the present embodiment displays the shortest routes to the destination A (the subway station) on the housing map data display area 27*c* as the visitor traffic lines C1 to C14. That is, it can easily generate the visitor traffic lines C1 to C14 from the predetermined locations to the destination A by using the housing map data display area 27*c*, without requiring the movement of articles.

Further, the visitor traffic line generation system does not require that wireless tags be attached to articles, unlike the conventional art, nor requires that the transfer of articles be monitored for a long time. Thus, it can generate the visitor traffic lines C1 to C14 from the predetermined locations to the destination A cheaply and quickly without having to take time, effort, or cost to generate the visitor traffic lines C1 to C14. Since the visitor traffic line generation system uses a human habit of traveling the shortest route when walking from a predetermined location toward the destination A (the subway station), it can derive accurate a visitor traffic line from the predetermined location to the destination A.

Further, if the shortest route from a sixth location (6) (an n-th location) to the destination A retrieved by the visitor traffic line generation system passes through a particular fifth location (5) [a (n−1)th location], which is more inside than the sixth location by one location, and then a particular first location (1), it no longer needs to retrieve the shortest route from the particular fifth location (5) [the (n−1)th location] through the first location (1) to the destination A. Thus, it can save the time and effort to retrieve the shortest route and can quickly generate visitor traffic lines C1 to C14.

Display of Walking Times and Walking Distances

FIG. 6 is a diagram showing an example of the visitor traffic line/walking time/walking distance display screen displayed on the display 16. The walking times and walking distances from the respective locations to the destination A are displayed in a housing map data display area 27c on the visitor traffic line/walking time/walking distance display screen in FIG. 6. Note that FIG. 6 does not show data present in the respective display areas, or addresses or multiple names, such as building names, condominium names, station names, route names, road names, store names, and public facility names, present in the housing map data display area.

When the walking time button 32 and walking distance button 33 on the visitor traffic line display screen in FIG. 5 are clicked; then the cursor is moved to any location in the housing map data display area 27b; and then a predetermined location is clicked, the server 10 displays the walking times calculated by the walking time calculation process, at the first to sixth locations (the first to n-th locations) on the visitor traffic lines C1 to C14 (a walking time display process) and displays the walking distances calculated by the walking distance calculation process, at the first to sixth locations (the first to n-th locations) on the visitor traffic lines C1 to C14 (a walking distance display process). The visitor traffic line/walking time/walking distance display screen shown in FIG. 6 appears on the display 16.

The items on the visitor traffic line display screen in FIG. 5, as well as the walking times (10 min, 7 min) from the third location (3) and second location (2) on the visitor traffic line C4 to the destination A (the subway station) appear in the housing map data display area 27c on the visitor traffic line/walking time/walking distance display screen in FIG. 6. Further, the walking distances (1350 m, 1050 m) from the fifth location (5) and fourth location (4) on the visitor traffic line C12 to the destination A (the subway station) appear in the housing map data display area 27c. While the walking times and walking distances are shown using numbers in FIG. 6, they may be distinguishably shown using the thickness, color, density, or the like of the visitor traffic lines.

Note that by clicking only the walking time button 32, only the walking times from the respective locations to the destination A can be displayed on the housing map data display area 27c; by clicking only the walking distance button 33, only the walking distances from the respective locations to the destination A can be displayed on the housing map data display area 27c. Further, the traffic volumes, stores and providers, vending machines, and base stations (to be discussed later) at the respective locations may be displayed in the housing map data display area 27c on the visitor traffic line/walking time/walking distance display screen in FIG. 6.

The visitor traffic line generation system displays the walking times required to travel the shortest routes (the visitor traffic lines C1 to C14) from the predetermined locations to the destination A. Thus, it is possible to check the reliability of the shortest route, as well as to grasp the times required to walk from the predetermined locations to the destination A. If the displayed walking times exceed the walking time limit within which a human can walk, the visitor traffic line generation system can reduce the walking times from the predetermined locations to the destination A by reducing the number of outer concentric circles and thus can generate visitor traffic lines C1 to C14 according to the walking time of an ordinary person.

The visitor traffic line generation system displays the walking distances of the shortest routes from the predetermined locations to the destination A (the visitor traffic lines C1 to C14). Thus, it is possible to check the reliability of the shortest route, as well as to grasp the walking distances from the predetermined locations to the destination A. If the displayed walking distances exceed the walking distance limit within which a human can walk, the visitor traffic line generation system can reduce the walking distances from the predetermined locations to the destination A by reducing the number of outer concentric circles and thus can generate visitor traffic lines C1 to C14 according to the walking distance of an ordinary person.

Displaying Traffic Volumes

FIG. 7 is a diagram showing an example of a visitor traffic line/traffic volume display screen displayed on the display 16. The traffic volumes (populations) at respective locations are displayed in a housing map data display area 27c on the visitor traffic line/traffic volume display screen in FIG. 7. Note that FIG. 7 does not show data present in the respective display areas, or addresses or multiple names, such as building names, condominium names, station names, route names, road names, store names, and public facility names, present in the housing map data display area.

When the traffic volume button 34 on the visitor traffic line display screen in FIG. 5 is clicked; then the cursor is moved to any location displayed in the housing map data display area 27c; and a predetermined location is clicked, a condition input screen (not shown) appears on the display 16. The condition input screen includes a sex input area, an age input area, an age group input area, an OK button, a clear button, a return button, and a close button.

When the OK button is clicked without inputting any information in those input areas, the server 10 displays the populations added up by the population addition process, at the first to sixth locations (the first to n-th locations) on the visitor traffic lines C1 to C14 as the traffic volumes at the first to sixth locations (1) to (6) (a traffic volume display process). The visitor traffic line/traffic volume display screen shown in FIG. 7 appears on the display 16.

The items on the visitor traffic line display screen in FIG. 5, as well as the traffic volumes (e.g., 210 persons, 280 persons) at the third location (3) and second location (2) on the visitor traffic line C5 and the traffic volumes (e.g., 60 persons, 120 persons) at the fifth location (5) and fourth location (4) on the visitor traffic line C12 appear on the housing map data display area 27c in FIG. 7.

By inputting sex (male or female) to the sex input area on the condition input screen, the populations by sex added by the population addition process can be displayed at the first to sixth locations (1) to (6) (the first to n-th locations) on the visitor traffic lines C1 to C14 as the traffic volumes at the first to sixth locations (1) to (6). Also, by inputting an age to the age input area, the populations by age added by the population addition process can be displayed at the first to sixth locations (1) to (6) (the first to n-th locations) on the visitor traffic lines C1 to C14 as the traffic volumes at the first to sixth locations (1) to (6). Also, by inputting an age group to the age group input area, the populations by age group added by the population addition process can be displayed at the first to sixth locations (1) to (6) (the first to n-th locations) on the visitor traffic lines C1 to C14 as the traffic volumes at the first to sixth locations (1) to (6). Further, the walking times and walking distances from respective locations to the destination A, stores and providers, vending machines, and base stations can be displayed in the housing map data display area 27c on the visitor traffic line/traffic volume display screen in FIG. 7. While the traffic volumes at the locations are shown using numbers in FIG. 7, they may be distinguishably shown using the thickness, color, density, or the like of the visitor traffic lines. Also, sex or ages may be distinguishably shown using the thickness, color, density, or the like of the visitor traffic lines.

The visitor traffic line generation system of the present embodiment displays the numbers of persons traveling the visitor traffic lines C1 to C14 (including the numbers of persons by sex, the numbers of persons by age, and the numbers of persons by age group) at the locations (1) to (6) on the visitor traffic lines C1 to C14. Thus, it is possible to grasp the traffic volumes at the locations (1) to (6) and to check whether the traffic volumes on the visitor traffic lines C1 to C14 are large or small. Since the visitor traffic line generation system can display the traffic volumes on the visitor traffic lines C1 to C14, it is possible to select a predetermined location on a visitor traffic line having a large traffic volume and high advertising effects by using the visitor traffic lines C1 to C14 and the traffic volumes thereon.

That is, the visitor traffic line generation system can derive a visitor traffic line from predetermined location to a destination, as well as can display the traffic volumes on the visitor traffic line. Thus, it is possible to select an optimum location on a visitor traffic line having a large traffic volume and high advertizing effects by using the visitor traffic line and the traffic volumes thereon and to accurately determine the location of a new store, the installation location of a vending machine, the installation location of a base station, or the like.

The visitor traffic line generation system can derive a visitor traffic line from predetermined location to a destination, as well as can display the traffic volumes by sex on the visitor traffic line. Thus, it is possible to select an optimum location on a visitor traffic line having a large traffic volume and high advertizing effects by using the visitor traffic line and the traffic volumes by sex thereon and to accurately determine the location of a new store, the installation location of a vending machine, the installation location of a base station, or the like.

The visitor traffic line generation system can derive a visitor traffic line from predetermined location to the destination, as well as can display the traffic volumes by age or by age group on the visitor traffic line. Thus, it is possible to select an optimum location on a visitor traffic line having a large traffic volumes and high advertising effects by using the visitor traffic line and the traffic volumes by age or by age group thereon and to accurately determine the location of a new store, the installation location of a vending machine, the installation location of a base station, or the like.

Other Visitor Traffic Line Generation Screen

Figure 8:
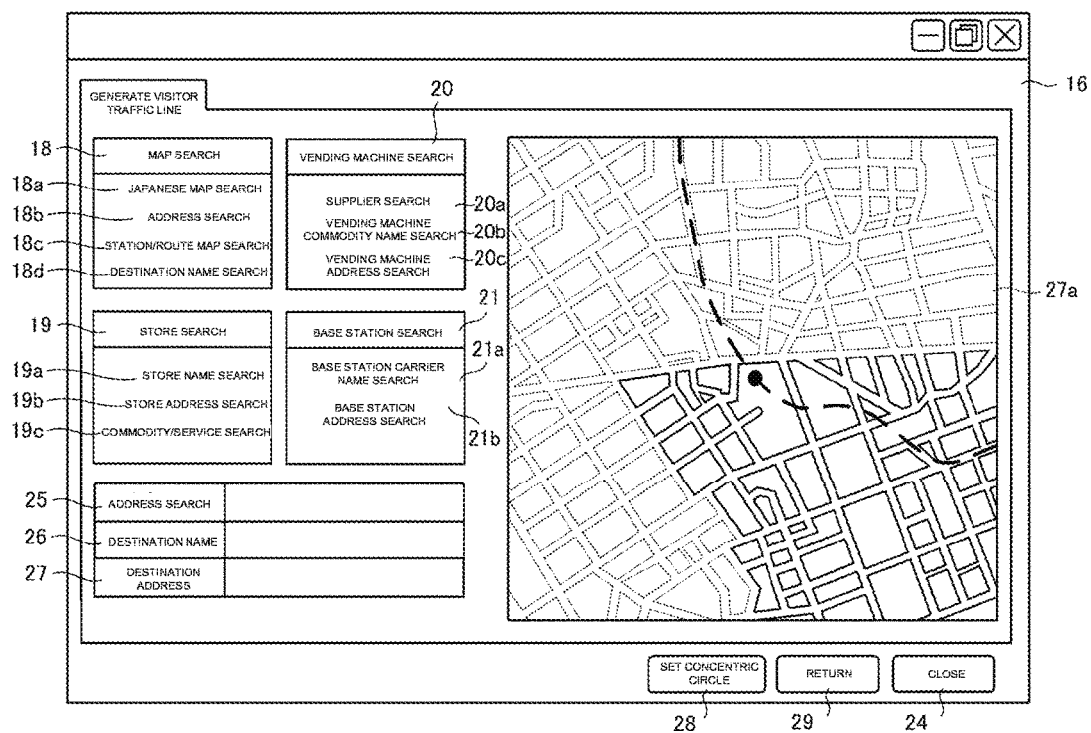
FIG. 8 is a diagram showing another example of a housing map data display screen displayed on the display.

FIG. 8 is a diagram showing another example of a housing map data display screen displayed on the display 16. FIG. 9 is a diagram showing another example of a concentric circle display screen displayed on the display 16. FIG. 10 is a diagram showing another example of a visitor traffic line display screen displayed on the display 16. Note that FIGS. 8 to 10 does not show data present in respective data display areas, or addresses or multiple names, such as building names, condominium names, station names, route names, road names, store names, and public facility names, present in housing map data display areas 27a to 27c. In FIG. 8, it is assumed that a subway station (a destination A) is retrieved by performing an address search in a map search area 18; a map from a sixth concentric circle (B6) to the destination A is divided into "cho" units in the Japanese addressing system.

By clicking the address search button 18b on the initial screen in FIG. 2B, then inputting a predetermined address to the address input area, and clicking the search button, housing map data of a predetermined region corresponding to that address is retrieved, and a destination input screen (not shown) indicating that housing map data appears on the display 16. The destination input screen includes a housing map data display area, a destination address input area, a destination name input area, an address unit specification input area, an OK button, a clear button, a return button, and a close button.

It is assumed that on the destination input screen, a subway station is specified by placing a destination mark at a predetermined location in the housing map data display area using the mouse 15; a predetermined "cho" is inputted to the address unit specification input area; and the OK button is clicked. When the click of the OK button confirms the destination (the subway station) and specifies the address unit, the server 10 divides a map from the outermost sixth concentric circle B6 to the destination A into "cho" units in the Japanese addressing system (an address unit division process). Note that when a predetermined "chome" is inputted to the address unit specification input area, the server 10 divides from the map from the sixth concentric circle B6 to the destination A into "chome" units in the Japanese addressing system (an address unit division process).

The housing map data display screen in FIG. 8 indicating a predetermined region consisting of "cho" address units and including the destination A appears on the display 16. On the housing map data display screen in FIG. 8, the region consisting of "cho" address units and including the destination A is shown using solid lines in the housing map data display area 27a, and the other region is shown using dotted lines in the housing map data display area 27a.

It is assumed that by clicking the concentric circle setting button 28 on the housing map data display screen in FIG. 3, a walking time/walking distance/concentric circle number input screen (not shown) appears on the display 16; then a walking distance is inputted to the walking distance input area; a walking time is inputted to the walking time input area; a concentric circle number is inputted to the concentric circle number input area; and then the OK button is clicked.

When the OK button is clicked, the server 10 displays first to sixth concentric circles B1 to B6 (first to n-th concentric circles) around the arbitrarily selected destination A in a housing map data display area 27a (a first to n-th concentric circle display process). The server 10 also displays first to sixth locations (1) to (6) (first to n-th locations) at the intersections of roads and the first to sixth concentric circles B1 to B6 in a house map data display area 27b (a first to n-th location display process). Thus, a concentric circle display screen shown in FIG. 9 appears on the display 16. When a shortest route search button 30 is clicked on the concentric circle display screen in FIG. 9, the server 10 sequentially retrieves the shortest routes from respective locations to the destination A, starting with those from the sixth locations (6) (the n-th locations) to the destination A and ending with those from to the first locations (1) to the destination A (a shortest route retrieval process).

The server 10 then displays the shortest route from the sixth to first locations (the n-th to first locations) to the destination A retrieved by the shortest route retrieval process on the housing map data display area consisting of the "cho" address units resulting from the division by the address unit division process (a shortest route display process). The server 10 then deletes the first to sixth concentric circles (the first to n-th concentric circles) and displays the shortest routes from the sixth (the n-th) to first locations to the destination A displayed by the shortest route display process in the housing map data display area, as visitor traffic lines C1, C2, C13, and C14 (visitor traffic lines C1, C2, C13, and C14 in the "cho" address units resulting from the address unit division process) (a visitor traffic line display process). Thus, a visitor traffic line display screen shown in FIG. 10 appears on the display 16. The server 10 also calculates the walking times of the shortest route from the sixth to first locations to the destination A (a walking time calculation process) and calculates the walking distances from the shortest route from the sixth to first locations to the destination A (a walking distance calculation process).

The server 10 also retrieves the population (including the population by sex, the population by age, and the population by age group) of a "chome" unit, "chome-ban" unit, or "chome-ban-go" unit (in the Japanese addressing system) in which each of the first to sixth locations (1) to (6) (the first to n-th locations) is located (a population retrieval process). At this time, the server 10 retrieves the populations with reference to the household number and population information by "cho-chome" of each municipality and the population information by "cho-chome" and age of each municipality. The server 10 sequentially adds up the retrieved populations from the sixth locations (6) (the n-th locations) toward the first locations (1) on the visitor traffic lines C1 to C14 (a population addition process).

The visitor traffic lines C1, C2, C13, and C14 from the sixth locations (6) to the center (destination A) appear in the housing map data display area 27c on the visitor traffic line display screen in FIG. 10. Note that the walking times and walking distances from the respective locations to the destination A, the traffic volumes (populations) [including the traffic volumes (populations) by sex, the traffic volumes (populations) by age, and the traffic volumes (populations) by age group], stores and providers, vending machines, and base stations can also be displayed in the housing map data display area 27c on the visitor traffic line display screen in FIG. 10.

When the file button (not shown) of the menu bar on the display 16 is clicked and then the button for saving a file (not shown) is clicked, the server 10 stores the housing map data displayed in the housing map data display area 27b or 27c in the hard disk in such a manner that the housing map data is associated with a file name and the creation date and time, as with the data on the visitor traffic line display screen in FIG. 5 (a housing map data storage process). The server 10 also stores various types of data in the hard disk in such a manner that the data is associated with a file name and the creation date and time (a various types of data storage process).

The visitor traffic line generation system of the present embodiment displays the visitor traffic lines C1, C2, C13, and C14 on a "cho" or "cho-chome" basis in the Japanese addressing system, as well as displays the numbers of persons traveling the visitor traffic lines C1, C2, C13, and C14 on a "cho" or "cho-chome" basis at the respective locations (6) to (1) on a "cho" or "cho-chome" basis. Thus, it is possible to grasp the traffic volumes by "cho" or "cho-chome" and to check whether the traffic volumes by "cho" or "cho-chome" are large or small.

The visitor traffic line generation system can derive the visitor traffic lines C1, C2, C13, and C14 from the predetermined locations to the destination A on a "cho" or "cho-chome" basis, as well as can display the traffic volumes on the visitor traffic lines C1, C2, C13, and C14 on a "cho" or "cho-chome" basis. Thus, it is possible to select an optimum location on a visitor traffic line having a large traffic volume and high advertising effects by using the visitor traffic lines C1, C2, C13, and C14 on a "cho" or "cho-chome" basis and the traffic volumes thereon.

That is, the visitor traffic line generation system can derive a visitor traffic line from predetermined location to a destination on a "cho" or "cho-chome" basis, as well as can display the traffic volumes on the visitor traffic line on a "cho" or "cho-chome" basis. Thus, it is possible to select an optimum location on a visitor traffic line having a large traffic volume and high advertizing effects by using the visitor traffic line on a "cho" or "cho-chome" basis and the traffic volumes thereon and to determine the location of a new store, the installation location of a vending machine, the installation location of a base station, or the like on a "cho" or "cho-chome" basis.

Displaying Stores

FIG. 11 is a diagram showing an example of a visitor traffic line/store display screen displayed on the display 16. Note that FIG. 11 does not show data present in respective display areas, or addresses or multiple names, such as building names, condominium names, station names, route names, road names, store names, and public facility names, present in a housing map data display area 27c.

In order to display stores of commodities in the same field or providers of services in the same field present in the housing map data display area 27c (the housing map data of the predetermined region) on the visitor traffic line display screen in FIG. 5, one of the store name search button 19a, store address search button 19b, and commodity/service search button 19c in the store search area 19 on the visitor traffic line display screen in FIG. 5 is clicked. Here, it is assumed that the commodity/service search button 19c is clicked and that a predetermined commodity name is inputted to the commodity name input area.

When the commodity/service search button 19c is clicked, a commodity/service selection screen (not shown) appears on the display 16. The commodity/service selection screen includes a commodity name input area, a service name input area, an OK button, a clear button, a return button, and a close button. When a commodity name is inputted to the commodity name input area and then the OK button is clicked, the server 10 displays, on the display 16, the visitor traffic line/store display screen in FIG. 11 showing a store D existing in the housing map data (in the housing map data display area 27*c*) and selling a commodity having the commodity name in the housing map data display area 27*c* (a store display process).

The visitor traffic lines C1, C2, C13, and C14 from the sixth locations (6) to the center (the destination A), as well as multiple stores present in the housing map data appear on the visitor traffic line/store display screen in FIG. 11. Along with the store D, the walking times and walking distances from the respective locations to the destination A and the traffic volumes (populations) [including the traffic volumes (populations) by sex, the traffic volumes (populations) by age, and the traffic volumes (populations) by age group] can also be displayed in the housing map data display area 27*c* on the visitor traffic line/store display screen in FIG. 11.

When the store name search button 19*a* in the store search area 19 is clicked, a store name input area, an OK button, a clear button, a return button, and a close button appear. When a store name is inputted to the store name input area and then the OK button is clicked, the server 10 displays, on the display 16, a visitor traffic line/store display screen showing a store D or service provider D existing in the housing map data (in the housing map data display area 27*c*) and having the store name along with the visitor traffic lines C1 to C14 in the housing map data display area 27*c* (a store display process).

When the store address search button 19*b* in the store search area 19 is clicked, a store address input area, an OK button, a clear button, a return button, and a close button appear. When a store name is inputted to the store address input area and then the OK button is clicked, the server 10 displays, on the display 16, a visitor traffic line/store display screen showing a store (as well as stores selling the same kind of commodity as that of that store) or a service provider (as well as providers providing the same kind of service as that of that provider) existing in the housing map data (in the housing map data display area 27*c*) and having the store address along with the visitor traffic lines C1 to C14 in the housing map data display area 27*c* (a store display process).

When the file button (not shown) of the menu bar on the display 16 is clicked and then the button for saving of a file is clicked, the server 10 stores the housing map data (including the store D or provider D) displayed in the housing map data display area 27*b* or 27*c* in the hard disk in such a manner that the data is associated with a file name and the creation date and time, as with the data on the visitor traffic line display screen in FIG. 5 (a housing map data storage process). The server 10 also stores various types of data in the hard disk in such a manner that the data is associated with a file name and the creation date and time (a various types of data storage process).

The visitor traffic line generation system of the present embodiment displays the store D selling commodities in the same field or the provider D providing services in the same field along with the visitor traffic lines C1 to C14. Thus, it is possible to determine whether the store D or provider D is present along one of the visitor traffic lines C1 to C14, as well as to determine whether the store D or provider D is present along a visitor traffic line having a large traffic volume, of the visitor traffic lines C1 to C14.

The visitor traffic line generation system allows the location of the store D or provider D to be determined on the basis of the visitor traffic lines C1 to C14 and the traffic volumes thereon. Thus, it is possible to easily determine the optimum transfer location of an existing store D or provider D on the basis of the visitor traffic lines C1 to C14 and the traffic volumes thereon and to easily determine the optimum installation location of a new store D or provider D on the basis of the visitor traffic lines C1 to C14 and the traffic volumes thereon.

The visitor traffic line generation system allows for the grasping of hot-selling commodities or services of the store D or provider D present along one of the visitor traffic lines C1 to C14, as well as allows for the grasping of a visitor segment that purchases such commodities or services. Thus, the store D or provider D can easily select commodities or services suitable for the visitor segment and can increase the number of commodities sold or the number of services provided.

Displaying Vending Machines

FIG. 12 is a diagram showing an example of a visitor traffic line/vending machine display screen displayed on the display 16. Note that FIG. 12 does not show data present in respective display areas, or addresses or multiple names, such as building names, condominium names, station names, route names, road names, store names, and public facility names, present in a housing map data display area 27*c*.

In order to display multiple vending machines existing in the housing map data display area 27*c* (the housing map data of the predetermined region) on the visitor traffic line display screen in FIG. 5 and selling commodities in the same field, one of the supplier search button 20*a*, vending machine commodity name search button 20*b*, and vending machine installation address search button 20*c* in the vending machine search area 20 on the visitor traffic line display screen in FIG. 5 is clicked. Here, it is assumed that the vending machine commodity name search button 20*b* is clicked and that a predetermined vending machine name is inputted to a vending machine name input area.

When the vending machine commodity name search button 20*b* is clicked, a vending machine commodity selection screen (not shown) appears on the display 16. The vending machine selection screen includes a vending machine commodity input area, an OK button, a clear button, a return button, and a close button. When a vending machine commodity name is inputted to the vending machine commodity name input area and then the OK button is clicked, the server 10 displays, on the display 16, the visitor traffic line/vending machine display screen in FIG. 12 showing multiple vending machines existing in the housing map data (in the housing map data display area 27*c*) and selling commodities in the same field in the housing map data display area 27*c* (a vending machine display process).

The visitor traffic lines C1, C2, C13, and C14 from the sixth locations (6) to the center (the destination A), as well as multiple vending machines E present in the housing map data appear on the visitor traffic line/vending machine display screen in FIG. 12. Along with the vending machines E, the walking times and walking distances from the respective locations to the destination A, and the traffic volumes (populations) [including the traffic volumes (populations) by sex, traffic volumes (populations) by age, and traffic volumes (populations) by age group] can also be displayed in the housing map data display area 27*c* on the visitor traffic line/vending machine display screen in FIG. 12.

When the supplier search button 20*a* in the vending machine search area 20 is clicked, a supplier name input area, an OK button, a clear button, a return button, and a close button appear. When a supplier name is inputted to the supplier name input area and then the OK button is clicked, the server 10 displays, on the display 16, a visitor traffic line/vending machine display screen showing vending machines E existing in housing map data (in a housing map data display area 27*c*) and selling commodities supplied by that supplier along with the visitor traffic lines C1 to C14 in the housing map data display area 27*c* (a vending machine display process).

When the vending machine installation address search button 20*c* in the vending machine search area 20 is clicked, a vending machine installation address input area, an OK button, a clear button, a return button, and a close button appear. When a vending machine installation address is inputted to the vending machine installation address input area and then the OK button is clicked, the server 10 displays, on the display 16, a visitor traffic line/vending machine display screen showing a vending machine E existing in housing map data (in a housing map data display area 27*c*) and corresponding to that vending machine address (as well as vending machines E selling the same type of commodities as those of that vending machine E) along with the visitor traffic lines C1 to C14 in the housing map data display area 27*c* (a vending machine display process).

When the file button (not shown) of the menu bar on the display 16 is clicked and then the button for saving a file (not shown) is clicked, the server 10 stores the housing map data (including the vending machines E) displayed in the housing map data display area 27*b* or 27*c* in the hard disk in such a manner that the data is associated with a file name and the creation date and time, as with the data on the visitor traffic line display screen in FIG. 5 (a housing map data storage process). The server 10 also stores various types of data in the hard disk in such a manner that the data is associated with a file name and the creation date and time (a various types of data storage process).

The visitor traffic line generation system of the present embodiment displays the vending machines E selling commodities in the same field along with the visitor traffic lines C1 to C14. Thus, it is possible to determine whether the vending machines E are each present along one of the visitor traffic lines C1 to C14, as well as to determine whether the vending machines E are each present along a visitor traffic line having a large traffic volume, of the visitor traffic lines C1 to C14.

Further, the visitor traffic line generation system allows the location of a vending machine E to be determined on the basis of the visitor traffic lines C1 to C14 and the traffic volumes thereon. Thus, it is possible to easily determine the optimum transfer location of an existing vending machine E on the basis of the visitor traffic lines C1 to C14 and the traffic volumes thereon and to easily determine the optimum installation location of a new vending machine E on the basis of the visitor traffic lines C1 to C14 and the traffic volumes thereon.

Further, the visitor traffic line generation system allows for the grasping of the numbers of commodities sold by vending machines E present in housing map data of a predetermined region, the hot-selling commodities of the vending machines E, and a visitor segment that purchases such commodities. Thus, it is possible to easily select commodities suitable for the visitor segment as commodities to be stocked in the vending machines E and to increase the number of commodities sold by the vending machines E.

Displaying Base Stations

FIG. 13 is a diagram showing an example of a visitor traffic line/base station display screen displayed on the display. Note that FIG. 13 does not show data present in respective display areas, or addresses or multiple names, such as building names, condominium names, station names, route names, road names, store names, and public facility names, present in a housing map data display area 27*c*.

In order to display multiple base stations present in the housing map data display area 27*c* (the housing map data of the predetermined region) on the visitor traffic line display screen in FIG. 5, one of the base station carrier name search button 21*a* and base station address search button 21*b* in the base station search area 21 on the visitor traffic line display screen in FIG. 5 is clicked. Here, it is assumed that the base station carrier name search button 21*a* is clicked and that a predetermined carrier name is inputted to a carrier name input area.

When the base station carrier name search button 21*a* is clicked, a base station carrier selection screen (not shown) appears on the display 16. The base station carrier selection screen includes a carrier name input area, an OK button, a clear button, a return button, and a close button. When a carrier name is inputted to the carrier name input area and then the OK button is clicked, the server 10 displays, on the display 16, the visitor traffic line/base station display screen in FIG. 12 showing base stations F existing in the housing map data (in the housing map data display area 27*c*) and installed by a carrier having that carrier name in the housing map data display area 27*c* (a base station display process).

The visitor traffic line/base station display screen in FIG. 13 shows the visitor traffic lines C1, C2, C13, and C14 from the sixth locations (6) to the center (the destination A), as well as multiple base stations F present in the housing map data. Along with the base stations F, the walking times and walking distances from the respective locations to the destination A, and the traffic volumes (populations) [including the traffic volumes (populations) by sex, the traffic volumes (populations) by age, and the traffic volumes (populations) by age group] can also be displayed in the housing map data display area 27*c* on the visitor traffic line/base station display screen in FIG. 13.

Note that when the base station address search button 21*b* in the base station search area 21 is clicked, a base station address input area, an OK button, a clear button, a return button, and a close button appear. When a base station address is inputted to the base station address input area and then the OK button is clicked, the server 10 displays, on the display 16, a visitor traffic line/base station display screen showing a base station F existing in the housing map data (in a housing map data display area 27*c*) and corresponding to that base station address (as well as base stations F installed by the carrier of that base station F) along with the visitor traffic lines C1 to C14 in the housing map data display area 27*c* (a base station display process).

When the file button (not shown) of the menu bar on the display 16 is clicked and then the button for saving a file (not shown) is clicked, the server 10 stores the housing map data (including the base stations F) displayed in the housing map data display area 27*b* or 27*c* in the hard disk in such a manner that the data is associated with a file name and the creation date and time, as with the data on the visitor traffic line display screen in FIG. 5 (a housing map data storage process). The server 10 also stores various types of data in the hard disk in such a manner that the data is associated with a file name and the creation date and time (a various types of data storage process).

The visitor traffic line generation system of the present embodiment allows the location of a base station F to be determined on the basis of the visitor traffic lines C1 to C14 and the traffic volumes thereon. Thus, it is possible to easily determine the optimum transfer location of an existing base station F on the basis of the visitor traffic lines C1 to C14 and the traffic volumes thereon and to easily determine the optimum installation location of a new base station F on the basis of the visitor traffic lines C1 to C14 and the traffic volumes thereon.

According to the present embodiment, it is possible to quickly generate a visitor traffic line without having to collect information related to the traffic of visitors.

Second Embodiment

Next, an information processing device of a second embodiment of the present invention will be described. The information processing device of the present embodiment differs from that of the first embodiment in that it proposes that a service is to be provided to visitor using a generated visitor traffic line. The other elements and operations are similar to those in the first embodiment and are given the same reference signs and therefore will not be described in detail.

Display Transition

Figure 14A:
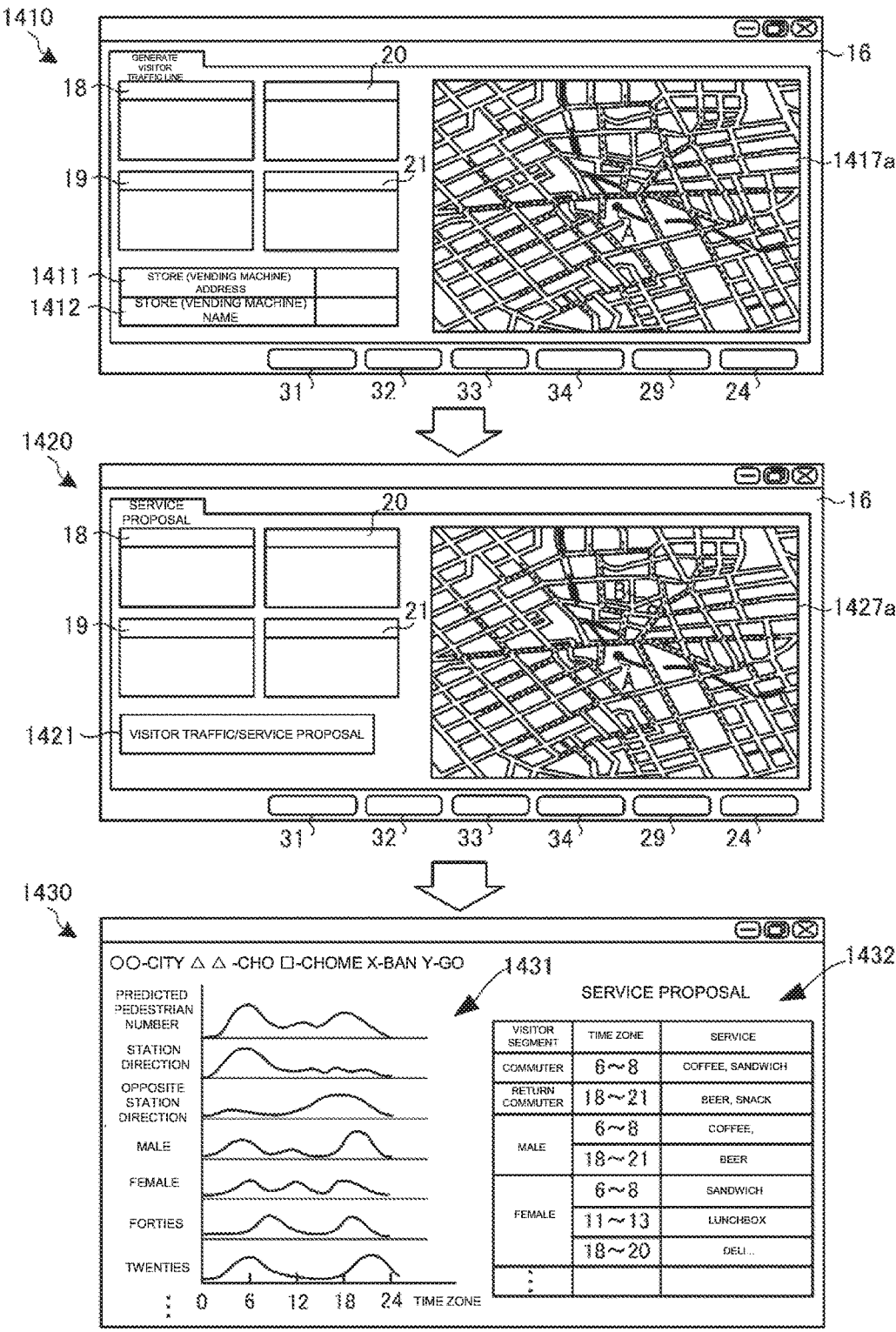
FIG. 14A is a diagram showing display transitions of a second embodiment of the present invention.

FIG. 14A is a diagram showing display transitions of the present embodiment. Elements similar to those in the first embodiment are given the same reference signs in FIG. 14A and will not be described.

A display screen 1410 in FIG. 14A shows a state in which a visitor traffic line has been generated in accordance with the first embodiment. A visitor traffic line display 1417a is a display obtained by removing the concentric circle numbers and visitor traffic line numbers from FIG. 5. When the address or name of a target store (or vending machine) is inputted to a store (vending machine) address input area 1411 or a store (vending machine) name input area 1412, the location of a store (or vending machine) B appears in a visitor traffic line display 1427a on a display screen 1420.

When a visitor traffic extraction/service proposal button 1421 to extract (including calculation) the visitor traffic and to obtain a service proposal to the user that the above store (vending machine) can make is clicked on the display screen 1420, a daily (24-hour) visitor traffic 1431 and a service proposal 1432 based on the visitor traffic 1431 appear on a display screen 1430. The visitor traffic 1431 at the location of the target store (or vending machine) is generated with reference to the visitor traffic line and statistical information, such as population information and visitor attribute information. Examples of the visitor traffic 1431 displayed on the display screen 1430 include overall pedestrian traffic, daily traffic toward the station, which is the destination of the visitor traffic line, daily traffic in a direction opposite to the direction toward the station, and daily traffic of males, females, forties, twenties, and the like. Note that the visitor traffic may be categorized by weekdays and holidays, the days of the week, or the like. The service proposal 1432 shows a proposal for time zone-specific services to be enhanced by the target store (or vending machine). Note that the items of the service proposal are not limited to those in FIG. 14A.

Figure 14B:
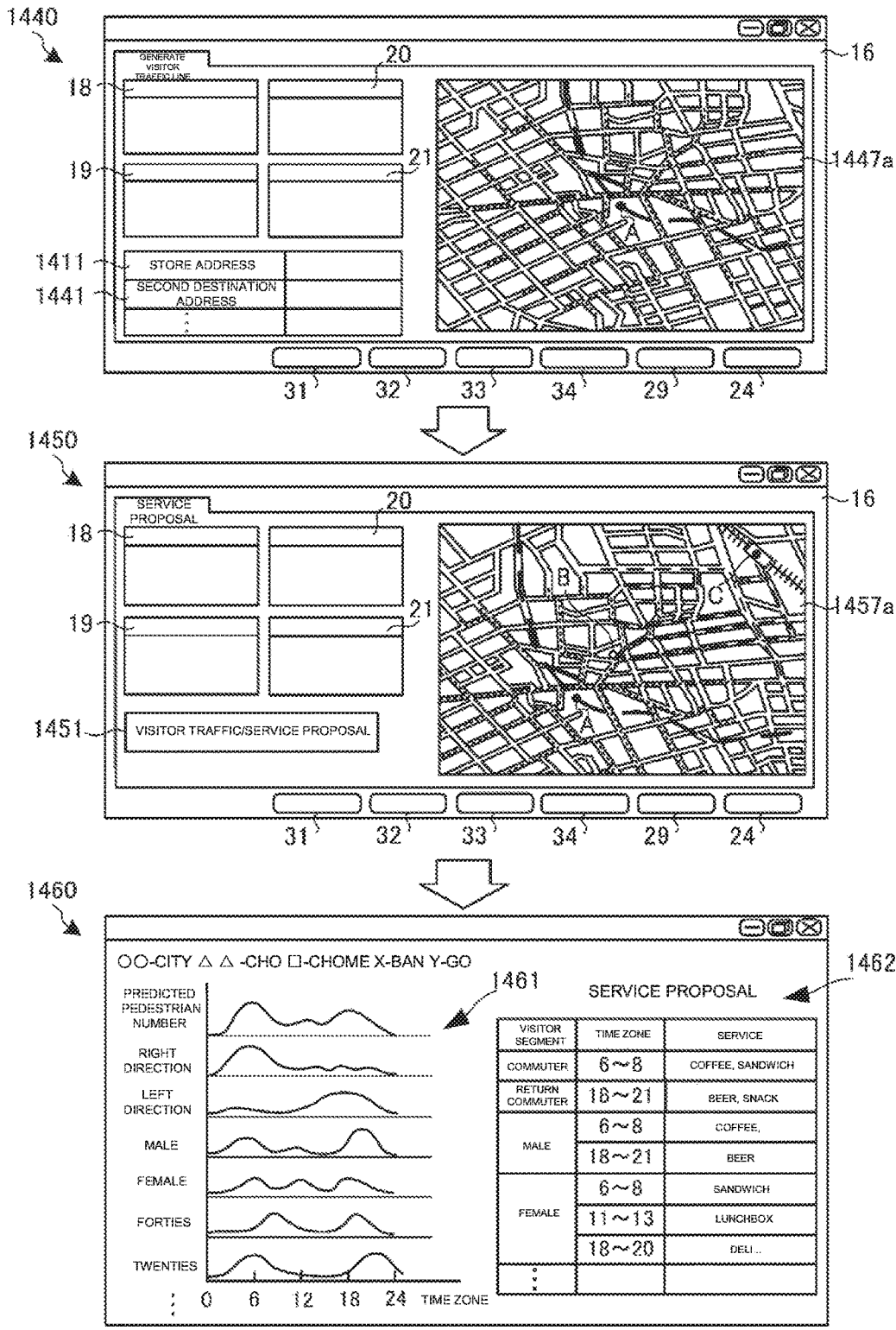
FIG. 14B is a diagram showing another set of display transitions of the second embodiment of the present invention.

FIG. 14B is a diagram showing another set of display transitions of the present embodiment. Elements similar to those in the first embodiment or those in FIG. 14A are given the same reference signs in FIG. 14B and will not be described.

A display screen 1440 in FIG. 14B shows a state in which a visitor traffic line have been generated in accordance with the first embodiment. A visitor traffic line display 1447a is a display obtained by removing the concentric circle numbers and visitor traffic line numbers from FIG. 5. When the address of a target store (or vending machine) and the address of a second destination are inputted to a store address input area 1411 and a second destination address input area 1441, respectively, the location of a store (or vending machine) B and a visitor traffic line (a thick, long broken line) toward a second destination C are generated in the procedure described in the first embodiment and displayed in a visitor traffic line display 1457a on a display screen 1450.

When a visitor traffic extraction/service proposal button 1451 for extracting (including calculation) the visitor traffic and obtaining a service proposal to the user that the above store (vending machine) can make is clicked on the display screen 1450, visitor traffic 1461 including visitor traffic lines toward two destinations, A and C, and a service proposal 1462 based on the visitor traffic appear on a display screen 1460. Details of the visitor traffic 1461 or service proposal 1462 will not be described. Also, the items of the service proposal are not limited to those in FIG. 14B.

While the visitor traffic at the two destinations is shown in FIG. 14B, the same applies to three or more destinations.

FIG. 14C is a diagram showing yet another set of display transitions of the present embodiment. Elements similar to those in the first embodiment or those in FIG. 14A or 14B are given the same reference signs in FIG. 14C and will not be described.

A display screen 1470 in FIG. 14C shows a state in which a visitor traffic line has been generated in accordance with the first embodiment. A visitor traffic line display 1477a is a display obtained by removing the concentric circle numbers and visitor traffic line numbers from FIG. 5. When the address of a competing store is inputted to a competing store address input area 1471, a competing store D appears in a visitor traffic line display 1487a on a display screen 1480.

When a trading area/service proposal button 1481 for extracting (including calculation) the visitor traffic considering the trading area of the competing store and obtaining a service proposal to the user that the above store (vending machine) can make is clicked on the display screen 1480, visitor traffic 1491 considering the trading area of the competing store and a service proposal 1492 based on the visitor traffic appear on a display screen 1490. Details of the visitor traffic 1491 or service proposal 1492 will not be described. Also, the items of the service proposal are not limited to those in FIG. 14C.

Functional Elements of Information Processing Device

Figure 15:
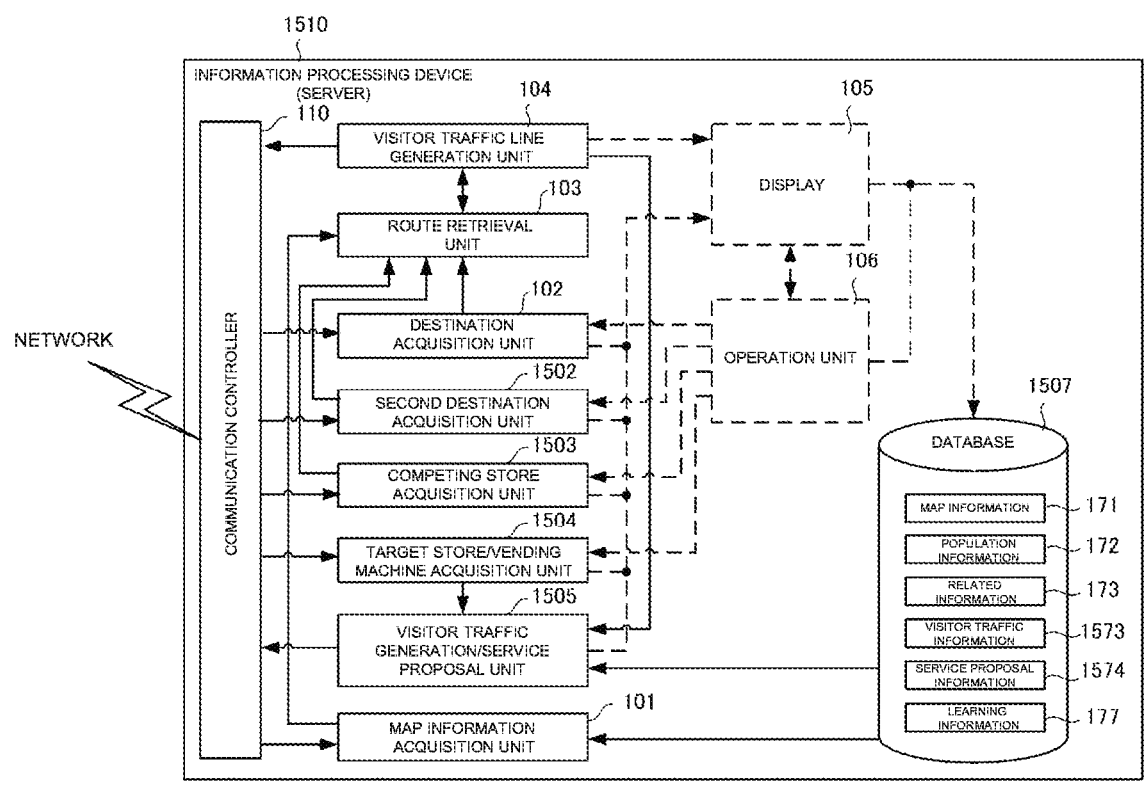
FIG. 15 is a block diagram showing the functional elements of an information processing device of the second embodiment of the present invention.

FIG. 15 is a block diagram showing the functional elements of an information processing device 1510 according to the present embodiment. Functional elements similar to those in FIG. 1C are given the same reference signs in FIG. 15 and will not be described.

The information processing device 1510 includes a second destination acquisition unit 1502, a competing store acquisition unit 1503, a target store/vending machine acquisition unit 1504, a visitor traffic generation/service proposal unit 1505, and a database 1507.

The second destination acquisition unit 1502 acquires a second destination inputted by the user using an operation unit 106 or communication terminal. The competing store acquisition unit 1503 acquires the location information or commodity information of a competing store inputted by the user using an operation unit 106 or communication terminal or a competing store stored in the database 1507. The target store/vending machine acquisition unit 1504 acquires the location information or commodity information of a target store or vending machine inputted by the user using the operation unit 106 or communication terminal. The visitor traffic generation/service proposal unit 1505 generates the visitor traffic at the location of the target store or vending machine with reference to the generated visitor traffic line, the location of the target store or vending machine, statistical data accumulated in the database 1507, information about the competing store, and the like. The visitor traffic generation/service proposal unit 1505 then generates a proposal for enhancing the service provided by the target store/vending machine, with reference to the generated visitor traffic.

The database 1507 is storing visitor traffic information 1573 and service proposal information 1574.

Hardware Configuration of Information Processing Device

Figure 16:
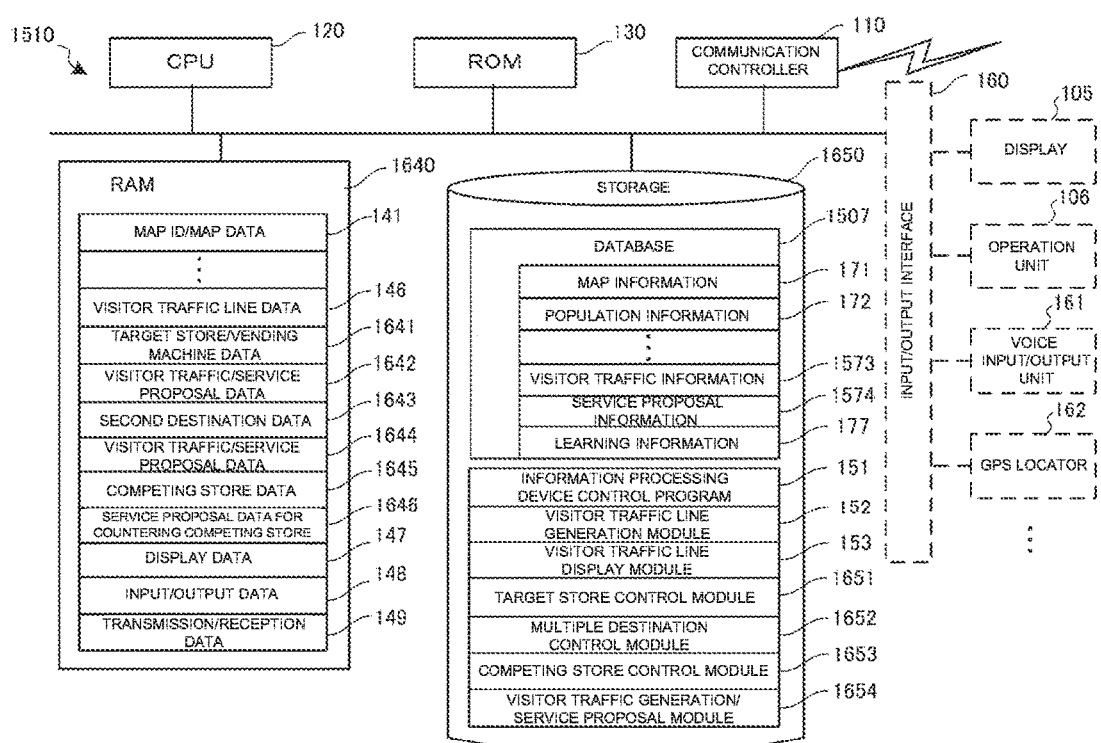
FIG. 16 is a block diagram showing the hardware configuration of the information processing device of the second embodiment of the present invention.

FIG. 16 is a block diagram showing the hardware configuration of the information processing device 1510 according to the present embodiment. Functional elements similar to those in FIG. 1D are given the same reference signs in FIG. 16 and will not be described.

Target store/vending machine data 1641 in a RAM 1640 is location information or commodity information of a target store or vending machine whose visitor traffic is to be generated or for which a service proposal is to be made. Visitor traffic/service proposal data 1642 is visitor traffic and service proposal corresponding to FIG. 14A and generated on the basis of a visitor traffic line to one destination. Second destination data 1643 is location information of a second destination to which a visitor traffic line is to be generated. Visitor traffic/service proposal data 1644 is visitor traffic and service proposal corresponding to FIG. 14B and generated on the basis of visitor traffic lines to two destinations. Competing store data 1645 is location information of a store competing with the target store or vending machine. Service proposal data 1646 for countering a competing store is visitor traffic and service proposal corresponding to FIG. 14C and generated considering the competing store.

Storage 1650 is storing the database 1507 including the visitor traffic information 1573 and the service proposal information. A target store control module 1651 stored in the storage 1650 is a module that controls the visitor traffic or service proposal at the location of a specified target store (vending machine) with reference to a visitor traffic line. A multiple destination control module 1652 is a module that controls the generation of visitor traffic lines toward multiple destinations. A competing store control module 1653 is a module that when a competing store is specified, controls visitor traffic or service proposal with reference to a visitor traffic line. A visitor traffic generation/service proposal module 1654 is a module that generates visitor traffic at a target store (vending machine) and proposes a service to be improved considering a visitor traffic line, the target store, a second destination, a competing store, or the like.

Data Used by Information Processing Device

Figure 17B:
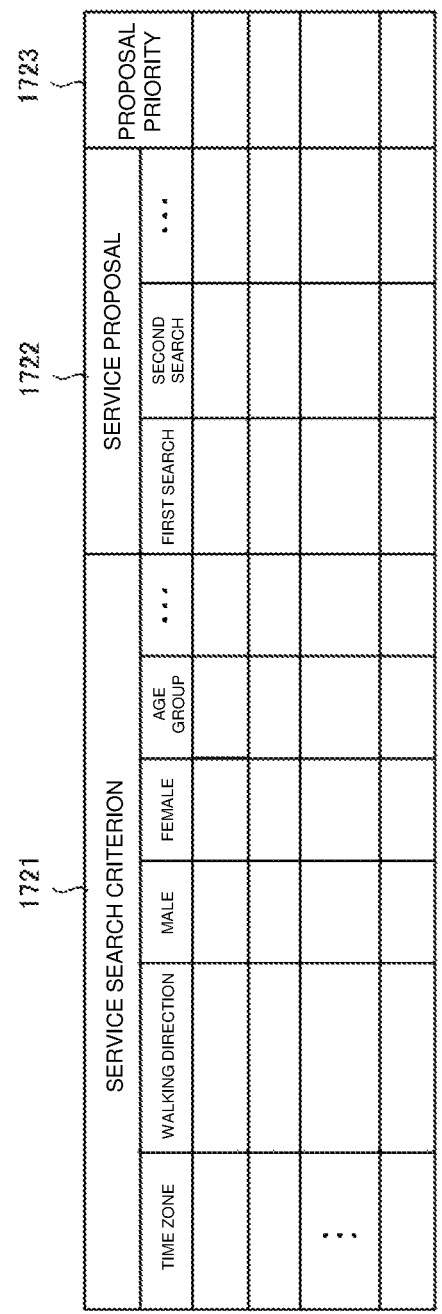
FIG. 17B is a diagram showing the configuration of data used by the information processing device of the second embodiment of the present invention.

FIGS. 17A and 17B are diagrams showing the configuration of data used by the information processing device 1510 according to the present embodiment.

FIG. 17A is used to generate visitor traffic from a visitor traffic line, population information, attribute statistics, or the like. Predicted pedestrian numbers 1712 and sales histories 1713 are stored in FIG. 17A so as to be associated with time zones 1711 of the day (on a 30-min basis in commuting time zones; on an hourly basis in the other time zones). A predicted pedestrian number 1712 includes a predicted total number, a predicted number in a direction toward station A (destination), a predicted number in the opposite direction, predicted male/female/age group numbers, and the like. A sales history 1713 includes total sales, sales by commodity, and the like. Note that the time zones, the types of predicted numbers stored, and the like are not limited to those in FIG. 17A.

FIG. 17B is used to generate a service proposal for a target store (vending machine) using a generated visitor traffic line. FIG. 17B is storing service search criteria 1721, service proposals 1722 retrieved by the service search criteria 1721, and proposal priorities 1723. A service search criterion 1721 is a criterion by which a proposal is searched for, and includes a times zone, a walking direction, and attributes such as male, female, and age. A service proposal 1722 includes a first search result, a second search result, and the like retrieved by a service search criterion 1721. A proposal priority 1723 stores the priority of a corresponding service proposal 1722 when making proposals.

Examples of a service proposal 1722 include a proposal for a new commodity and the sales time thereof, a proposal for the sales time of a conventional commodity, and a proposal for an inventory volume. More specific examples of a service proposal 1722 include a proposal of loading a vending machine with coffee bottles for commuters which can be capped, a proposal for the sale of sandwiches in the early morning, a proposal for commodity layouts corresponding to time zones at a convenience store or the like, and a proposal for time zones in which a discount or bonus is provided.

Process Steps by Information Processing Device

Figure 18:
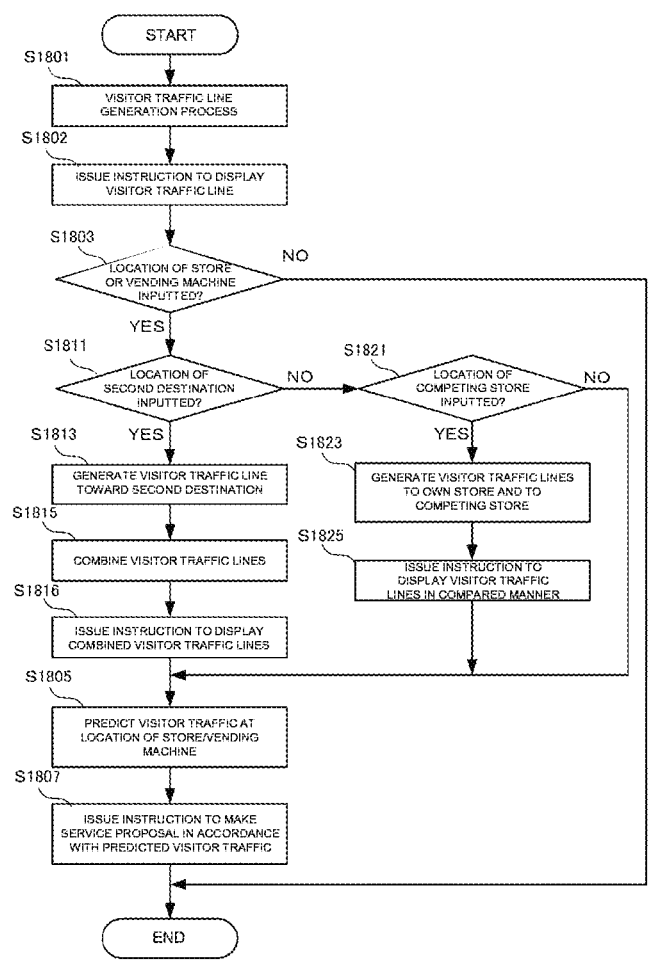
FIG. 18 is a flowchart showing process steps performed by the information processing device of the second embodiment of the present invention.

FIG. 18 is a flowchart showing process steps performed by the information processing device 1510 of the present embodiment. A CPU 120 in FIG. 16 performs the process steps in this flowchart using a RAM 1640 and thus implements the functional elements in FIG. 15.

In step S1801, the information processing device 1510 performs a visitor traffic line generation process. The visitor traffic line generation process is similar to that in the first embodiment and therefore will not be described in detail. In step S1802, the information processing device 1510 issues an instruction to display the generated visitor traffic line on a map.

In step S1803, the information processing device 1510 determines whether the location of a target store or vending machine has been inputted. If the location of a target store or vending machine has been inputted, the information processing device 1510, in step S1811, determines whether the location of a second destination toward which a visitor traffic line is to be generated has been inputted. If the location of a second destination has been inputted, the information processing device 1510, in step S1813, generates a visitor traffic line toward the second destination (the visitor traffic line is generated as shown in the first embodiment). In step S1815, the information processing device 1510 combines a visitor traffic line toward a first destination and the visitor traffic line toward the second destination. In step S1816, the information processing device 1510 issues an instruction to display the combined visitor traffic lines. Preferably, the overlap between two visitor traffic lines are distinguishably displayed using color, density, thickness, or the like.

On the other hand, if a second destination has not been inputted in step S1811, the information processing device 1510, in step S1821, determines whether the location of a competing store has been inputted. If the location of a competing store has been inputted, the information processing device 1510, in step S1823, generates a visitor traffic line to its own store and a visitor traffic line to the competing store. In step S1825, the information processing device 1510 issues an instruction to display the visitor traffic line to its own store and the visitor traffic line to the competing store in such a manner that the groups of visitor traffic lines are compared to each other.

In step S1805, the information processing device 1510 predicts visitor traffic at the location of the target store (vending machine) with reference to the generated visitor traffic line. In step S1807, the information processing device 1510 issues an instruction to make a service proposal for the target store (vending machine) in accordance with the predicted visitor traffic. If the location of a target store (vending machine) has not been inputted in step S1803, the information processing device 1510 ends the process.

According to the present embodiment, the transition of the visitor traffic is predicted with reference to the generated visitor traffic line, and a service proposal is made. Thus, the service provided by the target store or vending machine can be improved.

Third Embodiment

Next, an information processing device of a third embodiment of the present invention will be described. The information processing device of the present embodiment differs from those of the first and second embodiments in that it proposes a location at which a service is to be provided, using a generated visitor traffic line. The other elements and operations are similar to those in the first and second embodiments and are given the same reference signs and therefore will not be described in detail.

Display Transition

Figure 19A:
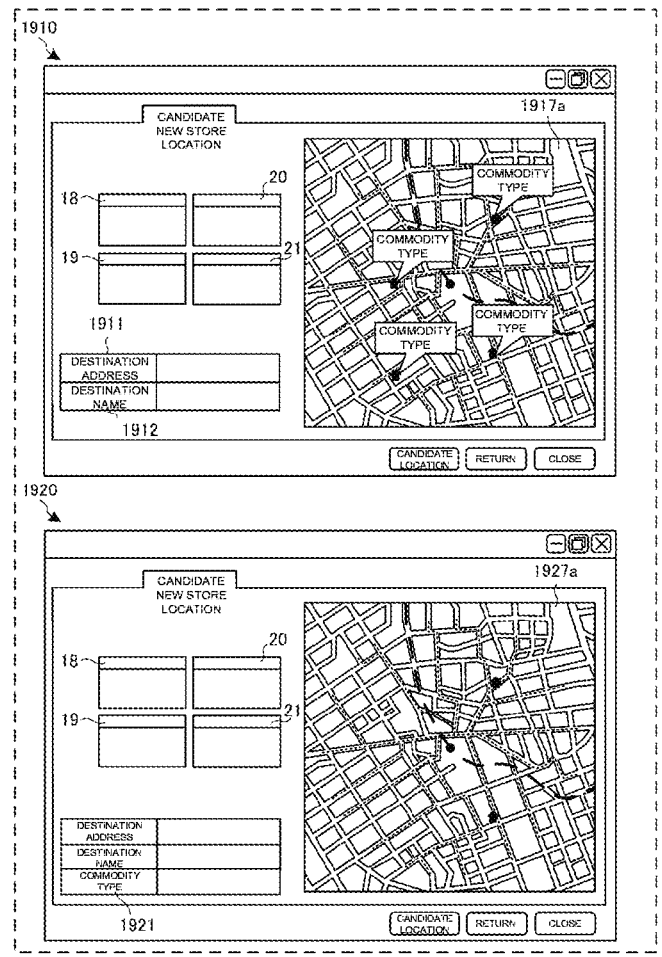
FIG. 19A is a diagram showing a display transition of a third embodiment of the present invention.

FIG. 19A is a diagram showing a display transition of the present embodiment. Elements similar to those in the first embodiment are given the same reference signs in FIG. 19A and will not be described.

On a display screen 1910 in FIG. 19A, a visitor traffic line toward a destination address 1911 or a destination name 1912 is generated in accordance with the first embodiment. The display screen 1910 shows a candidate store location display 1917a with reference to the visitor traffic line. The candidate store location display 1917a shows a candidate store location obtained on the basis of the visitor traffic line and indicating commodity types.

On a display screen 1920, a visitor traffic line to a destination address 1911 or a destination name 1912 is generated in accordance with the first embodiment. The display screen 1920 shows a candidate store location display 1927a that refers to the visitor traffic line and corresponds to an inputted commodity type 1921. The candidate store location display 1927a shows a candidate location of a store that sells the specified commodity type, and the specified commodity type is obtained on the basis of the visitor traffic line.

Figure 19B:
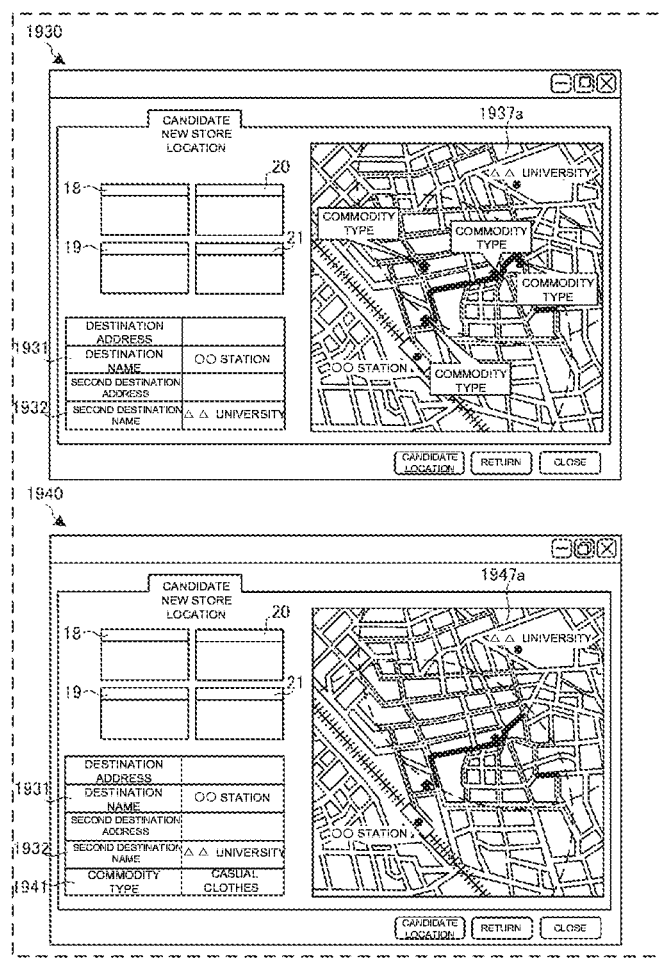
FIG. 19B is a diagram showing another display transition of the third embodiment of the present invention.

FIG. 19B is a diagram showing a display transition of the present embodiment. Elements similar to those in the first embodiment are given the same reference signs in FIG. 19B and will not be described.

When two destinations are specified ("○○ station" is inputted to a destination name input area 1931; "ΔΔ university" is inputted to a second destination name input area 1932) on a display screen 1930 in FIG. 19B in accordance with the second embodiment, visitor traffic lines toward these destinations are generated. The display screen 1930 shows a candidate store location display 1937a with reference to the combined visitor traffic lines. In the candidate store location display 1937a, a thick line is a road where the visitor traffic lines to the two destinations overlap each other, and a candidate location of a store that sells a specified commodity type is shown. The specified commodity type is obtained on the basis of these visitor traffic lines.

When two destinations are specified ("○○ station" is inputted to a destination name input area 1931; "ΔΔ university" is inputted to a second destination name input area 1932) on a display screen 1940 in accordance with the second embodiment, visitor traffic lines toward these destinations are generated. The display screen 1940 shows a candidate store location display 1947a that refers to the combined visitor traffic lines and corresponds to casual clothes inputted to a commodity type input area 1941. In the candidate store location display 1947a, a thick line is a road where the visitor traffic lines to the two destinations overlap each other, and a candidate location of a store that sells the specified commodity type is shown. The specified commodity type is obtained on the basis of these visitor traffic lines.

The number of destinations is not limited to two and may be three or more. Commodity type need not be used as a search criterion, and store size, visitor segment, commodity price zone, or the like may be used.

Functional Elements of Information Processing Device

Figure 20:
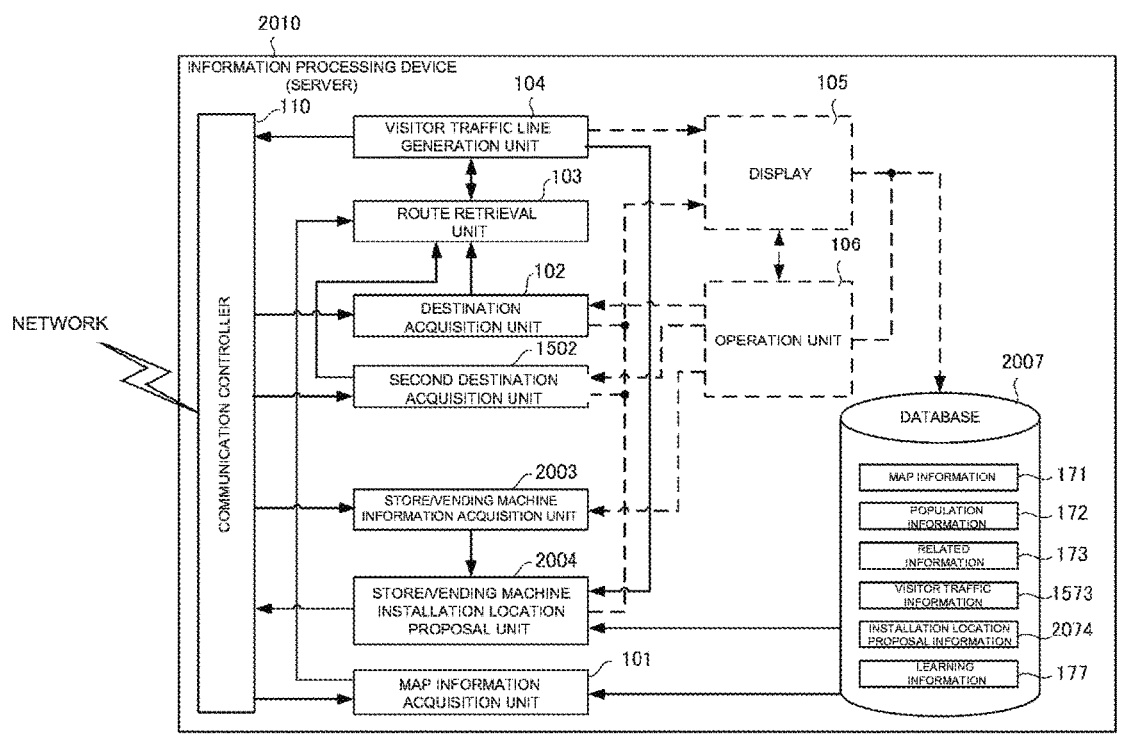
FIG. 20 is a block diagram showing the functional elements of an information processing device of the third embodiment of the present invention.

FIG. 20 is a block diagram showing the functional elements of an information processing device 2010 according to the present embodiment. Functional elements similar to those in FIG. 1C or 15 are given the same reference signs in FIG. 20 and will not be described.

The information processing device 2010 includes a store/vending machine information acquisition unit 2003, a store/vending machine installation location proposal unit 2004, and a database 2007. The store/vending machine information acquisition unit 2003 acquires information about a store or vending machine inputted using an operation unit 106 or communication terminal to request a proposal for the installation location of the store or vending machine. Note that if the information processing device 2010 itself proposes a store type, commodity type, or the like, it does not use the store/vending machine information acquisition unit 2003. The store/vending machine installation location proposal unit 2004 proposes a candidate installation location of the store or vending machine with reference to a generated visitor traffic line and store/vending machine information, or information stored in the database 2007. The database 2007 is storing installation location proposal information 2074.

Hardware Configuration of Information Processing Device

Figure 21:
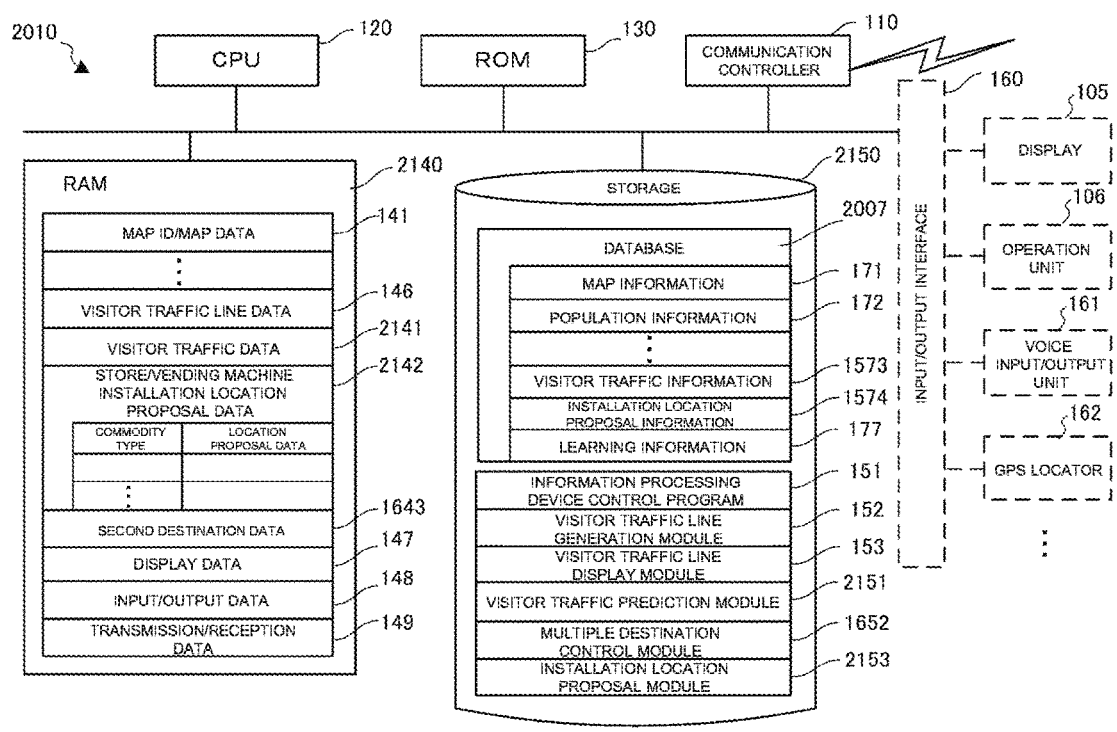
FIG. 21 is a block diagram showing the hardware configuration of the information processing device of the third embodiment of the present invention.

FIG. 21 is a block diagram showing the hardware configuration of the information processing device 2010 according to the present embodiment. Elements similar to those in FIG. 1D or 16 are given the same reference signs in FIG. 21 and will not be described.

Visitor traffic data 2141 in a RAM 2140 is visitor traffic data generated from statistical information or the like accumulated in visitor traffic line data 146 or database 2007. Store/vending machine installation location proposal data 2142 is data for proposing an installation location of a store or vending machine to the user. The store/vending machine installation location proposal data 2142 is stored so as to be associated with a commodity type and installation location proposal data.

A visitor traffic prediction module 2151 in storage 2150 is a module that predicts visitor traffic at respective road locations with reference to a visitor traffic line and statistical information. An installation location proposal module 2153 is a module that reports a candidate location suitable for installing a store or vending machine to the user with reference to the visitor traffic predicted by the visitor traffic prediction module 2151.

Data Used by Information Processing Device

FIGS. 22A and 22B are diagrams showing the configuration of data used by the information processing device 2010 according to the present embodiment.

FIG. 22A shows information used to determine whether a proposal for an installation location should be made. In FIG. 22A, addresses 2212, location conditions 2213 related to installation proposals, pedestrian prediction 2214, predicted sales 2215, and the like are stored so as to be associated with corresponding location IDs 2211 on a map. Examples of the location conditions 2213 include without limitation: the location is a crossroads; the location is a three-way intersection; and the location is between crossroads.

FIG. 22B is used when determining whether the installation location of a store or vending machine should be proposed, on the basis of the respective location conditions. In FIG. 22A, addresses 2222, installation proposal information 2223, and store installation evaluations 2224 are stored so as to be associated with corresponding location IDs 2221 on a map. Examples of the installation proposal information 2223 include predicted sales and evaluation value of a commodity type and predicted sales and evaluation value of another commodity type. For example, if a low evaluation value is set as installation proposal information 2223, "poor" is set as a store installation evaluation 2224; if a high evaluation value is set as installation proposal information 2223, "good" is set with respect to a certain commodity as a store installation evaluation 2224. A determination on whether to propose the installation of a store is made on the basis of these evaluations.

Process Steps by Information Processing Device

Figure 23:
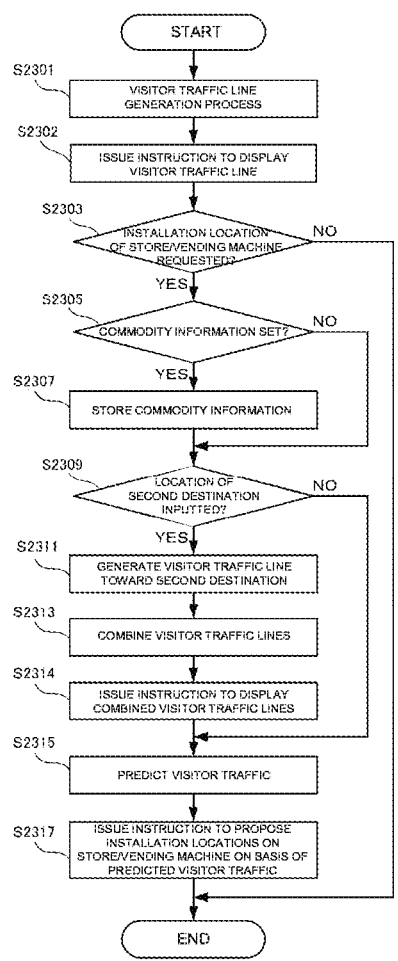
FIG. 23 is a flowchart showing process steps performed by the information processing device of the third embodiment of the present invention.

FIG. 23 is a flowchart showing process steps performed by the information processing device 2010 of the present embodiment. A CPU 120 in FIG. 21 performs the process steps in this flowchart using the RAM 2140 and thus implements the functional elements in FIG. 20.

In step S2301, the information processing device 2010 performs a visitor traffic line generation process. The visitor traffic line generation process is similar to that in the first embodiment and therefore will not be described in detail. In step S2302, the information processing device 2010 issues an instruction to display the generated visitor traffic line on a map.

In step S2303, the information processing device 2010 determines whether the installation location of a store or vending machine has been requested. If the installation location of a store or vending machine has been requested, the information processing device 2010, in step S2305, determines whether commodity information of the store or vending machine has been set. If the commodity information has been set, the information processing device 2010, in step S2307, stores the commodity information.

In step S2309, the information processing device 2010 determines whether the location of a second destination has been inputted. If the location of a second destination has been inputted, the information processing device 2010, in step S2311, generates a visitor traffic line to the second destination. In step S2313, the information processing device 2010 combines the visitor traffic lines to the two destinations. In step S2314, the information processing device 2010 issues an instruction to display the combined visitor traffic lines. Preferably, the overlap between two visitor traffic lines is distinguishably displayed using color, density, thickness, or the like.

In step S2315, the information processing device 2010 predicts visitor traffic with reference to the visitor traffic line and statistical information. In step S2317, the information processing device 2010 issues an instruction to propose a candidate installation locations of a store or vending machine on the basis of the predicted visitor traffic. If the location of a target store (vending machine) has not been inputted in step S1803, the information processing device 2010 ends the process.

According to the present embodiment, the transition of the visitor traffic is predicted with reference to a generated visitor traffic line, and installation location of a store or vending machine is proposed. Thus, the store or vending machine can be installed in an appropriate location.

Since the present visitor traffic line generation system uses a human habit of traveling the shortest route when walking from a predetermined location toward a destination, it can derive an accurate visitor traffic line from the predetermined location to the destination. Thus, it is possible to accurately determine the installation location of a store, a vending machine, a base station, or the like using the visitor traffic line.

Fourth Embodiment

Next, an information processing device of a fourth embodiment of the present invention will be described. The information processing device of the present embodiment differs from those of the first to third embodiments in that it performs learning to improve a generated visitor traffic line. The information processing device of the present embodiment also displays, on a map, a visitor traffic line generated on the basis of information about roads in the map and a visitor traffic line generated on the basis of actual shop-around behaviors of visitors. The other elements and operations are similar to those in the first to third embodiments and are given the same reference signs and therefore will not be described in detail.

Display Transition

Figure 24:
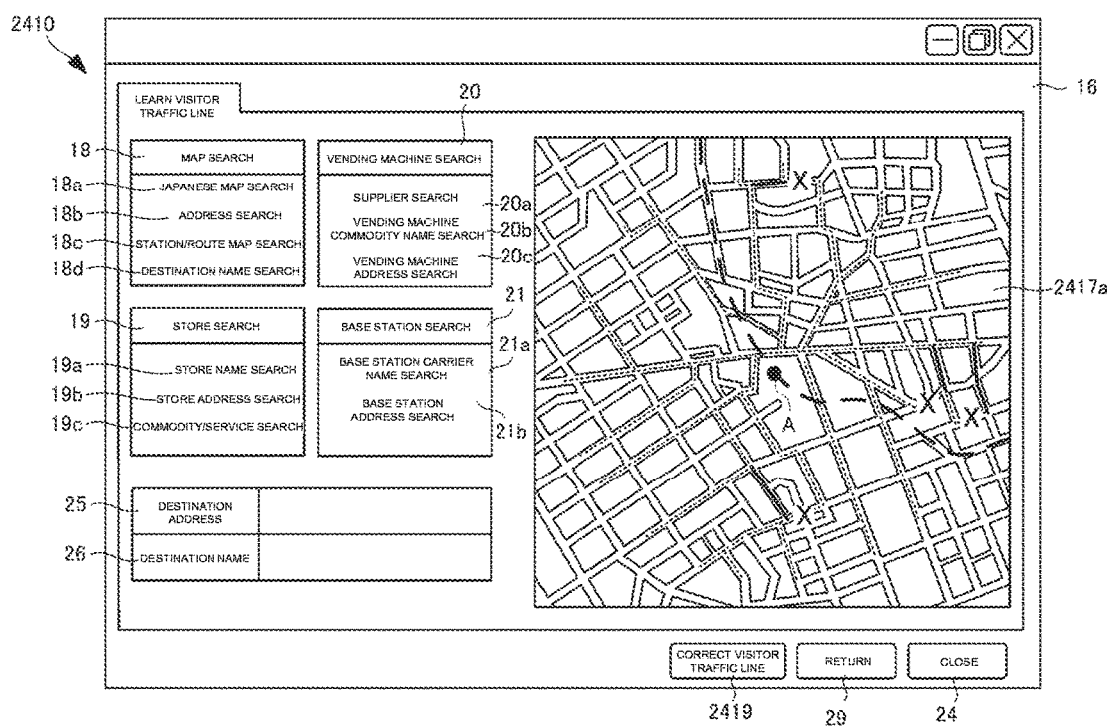
FIG. 24 is a diagram showing a display of a fourth embodiment of the present invention.

FIG. 24 is a diagram showing a display of the present embodiment. Elements similar to those in FIG. 5 are given the same reference signs in FIG. 24 and will not be described.

When a visitor traffic line correction button 2419 is clicked on a display screen 2410 in FIG. 24, a visitor traffic line generated in the present embodiment and an accumulated actual visitor traffic line obtained by calculating the GPS locations of mobile terminals carried by pedestrians are compared to each other. If there is a difference between the generated visitor traffic line and the accumulated actual visitor traffic line, the difference is corrected.

On a visitor traffic line correction screen 2417a in FIG. 24, "x" portions are portions where visitor traffic lines have been deleted, and adjacent thick lines are portions where visitor traffic lines have been added.

Functional Elements of Information Processing Device

Figure 25:
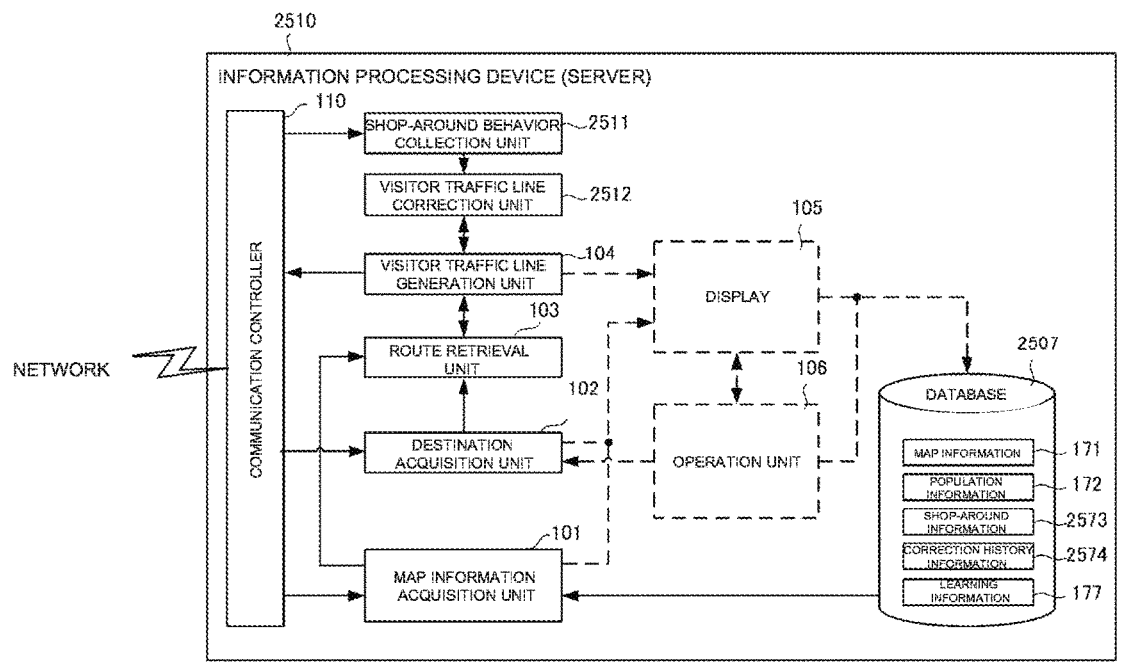
FIG. 25 is a block diagram showing the functional elements of an information processing device of the fourth embodiment of the present invention.

FIG. 25 is a block diagram showing the functional elements of an information processing device 2510 according to the present embodiment. Functional elements similar to those in FIG. 1C are given the same reference signs in FIG. 25 and will not be described. Note that the information processing device shown in FIG. 25 may be combined with that shown in FIG. 15 or 20 and thus a synergy effect can be produced.

The information processing device 2510 includes a shop-around behavior collection unit 2511, a visitor traffic line correction unit 2512, and a database 2507. The shop-around behavior collection unit 2511 collects location information from mobile terminals carried by pedestrians as shop-around behaviors of the pedestrians and generates an actual visitor traffic line. The visitor traffic line correction unit 2512 compares the visitor traffic line generated by the visitor traffic line generation unit 104 from a map and the visitor traffic line based on the location information collected from the mobile terminals and corrects the generated visitor traffic line. Note that the visitor traffic line may be corrected using other methods. The database 2507 is storing pedestrian shop-around information 2573 and visitor traffic line correction history information 2574. Note that the information processing device 2510 may include a display instruction unit for issuing an instruction to display, on a map, a visitor traffic line generated on the basis of information about roads in the map and a visitor traffic line generated on the basis of actual shop-around behaviors of visitors.

Data Used by Information Processing Device

FIG. 26 is a diagram showing the configuration of data used by the information processing device 2510 according to the present embodiment. FIG. 26 is used to correct a visitor traffic line generated by the visitor traffic line generation unit 104 on the basis of shop-around behavior information collected from the mobile terminals of pedestrians.

FIG. 26 is storing yet-to-be-corrected visitor traffic line data 2601, correction dates and times 2602, shop-around behavior collection data 2603, visitor traffic line data 2604 based on shop-around behaviors, the differences 2605 between the visitor traffic line data 2601 and 2604, and corrected visitor traffic line data 2606.

Process Steps by Information Processing Device

Figure 27:
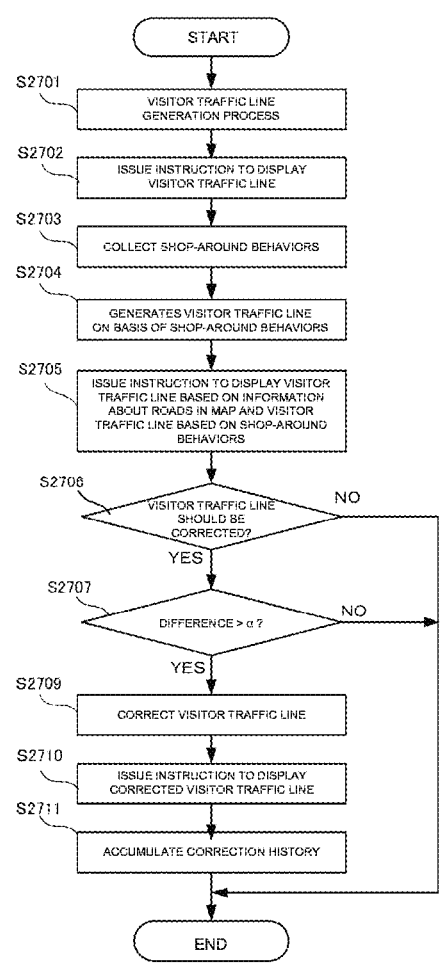
FIG. 27 is a flowchart showing process steps performed by the information processing device of the fourth embodiment of the present invention.

FIG. 27 is a flowchart showing process steps performed by the information processing device 2510 of the present embodiment.

In step S2701, the information processing device 2510 performs a visitor traffic line generation process. The visitor traffic line generation process is similar to that in the first embodiment and therefore will not be described in detail. In step S2702, the information processing device 2510 issues an instruction to display the generated visitor traffic line on a map.

In step S2703, the information processing device 2510 collects shop-around behaviors on the basis of location information received from the mobile terminals of pedestrians. In step S2704, the information processing device 2510 generates a visitor traffic line on the basis of the shop-around behaviors of the pedestrians. In step S2705, the information processing device 2510 issues an instruction to display, on the map, the visitor traffic line generated on the basis of the information about the roads in the map and the visitor traffic line generated on the basis of the shop-around behaviors. Preferably, the visitor traffic lines are distinguishably displayed using color, density, thickness, line type, or the like. The use of display of the visitor traffic line based on the information about the roads in the map and the visitor traffic line based on the shop-around behaviors and effects thereof will be described in other embodiments. In step S2706, the information processing device 2510 determines whether the visitor traffic line should be corrected. If the visitor traffic line needs not be corrected, the information processing device 2510 ends the process.

If the visitor traffic line should be corrected, the information processing device 2510, in step S2707, finds a location where the difference between the visitor traffic lines exceeds a threshold a. If there is a location where the difference between the visitor traffic lines exceeds the threshold a, the information processing device 2510, in step S2709, corrects the visitor traffic line. In step S2710, the information processing device 2510 issues an instruction to display the corrected visitor traffic line on the map. In step S2711, the information processing device 2510 accumulates the visitor traffic line correction history.

According to the present embodiment, a visitor traffic line easily generated from a map is corrected on the basis of actual shop-around behaviors of pedestrians. Thus, a more accurate visitor traffic line can be obtained. Further, by learning the correction histories, the visitor traffic line generation algorithm can be corrected into an algorithm that more accurately generates a visitor traffic line.

Fifth Embodiment

Next, an information processing device of a fifth embodiment of the present invention will be described. The information processing device of the present embodiment differs from those of the first to fourth embodiments in that it detects a competing facility corresponding to a visitor segment by stratifying a visitor traffic line in accordance with a business category (a visitor segment). The other elements and operations are similar to those in the first to fourth embodiments and are given the same reference signs and therefore will not be described in detail. While the terms "target facility" and "competing facility" are used in the present embodiment, these terms may be replaced with a specific target store or competing store.

Display Transition

Figure 28:
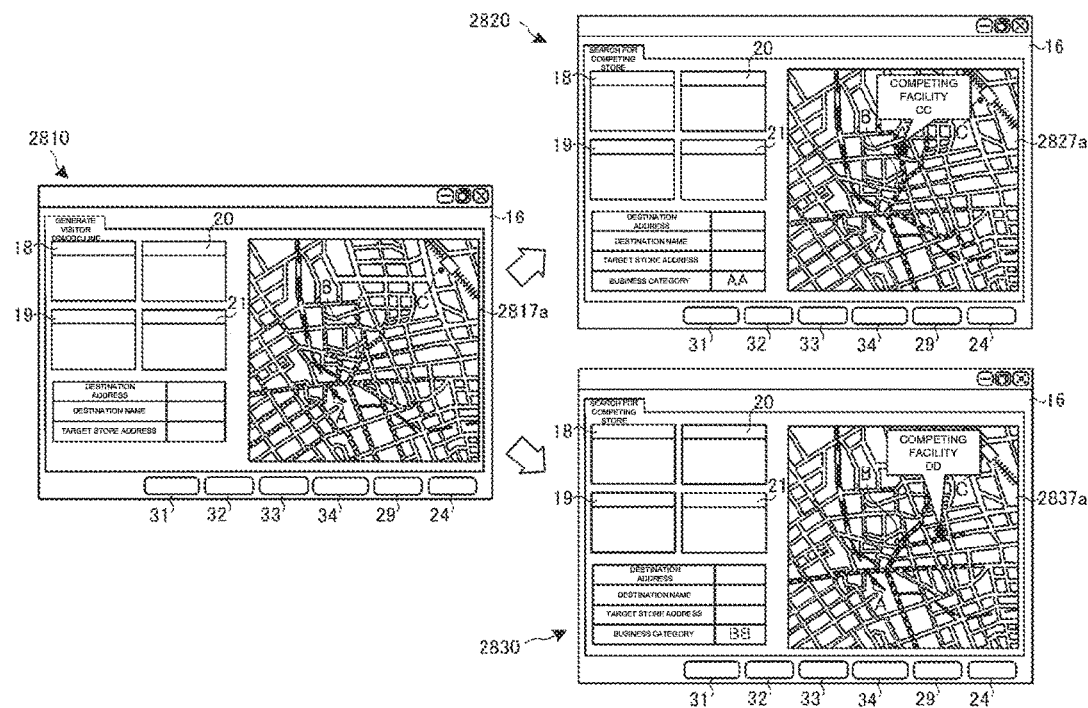
FIG. 28 is a diagram showing display transitions of a fifth embodiment of the present invention.

FIG. 28 is a diagram showing display transitions of the present embodiment. Elements similar to those in the first embodiment are given the same reference signs in FIG. 28 and will not be described.

A display screen 2810 in FIG. 28 shows a display 2817a around the address of a target facility B on a screen on which a visitor traffic line have been generated according to the first embodiment.

A display screen 2820 shows a display 2827a obtained by specifying a business category AA and then performing a competing facility retrieval process. On the display 2827a, a competing facility CC is found upstream of the target facility B on the basis of a visitor traffic line (a thick line) of a visitor segment limited to the business category AA. The competing facility CC is reported to the target facility B. On the other hand, a display screen 2830 shows a display 2837a obtained by specifying a business category BB and then performing a competing facility retrieval process. On the display 2837a, a competing facility DD is found upstream of the target facility B on the basis of a visitor traffic line (a thick line) of a visitor segment limited to the business category BB. The competing facility DD is reported to the target facility B.

Functional Elements of Information Processing Device

Figure 29:
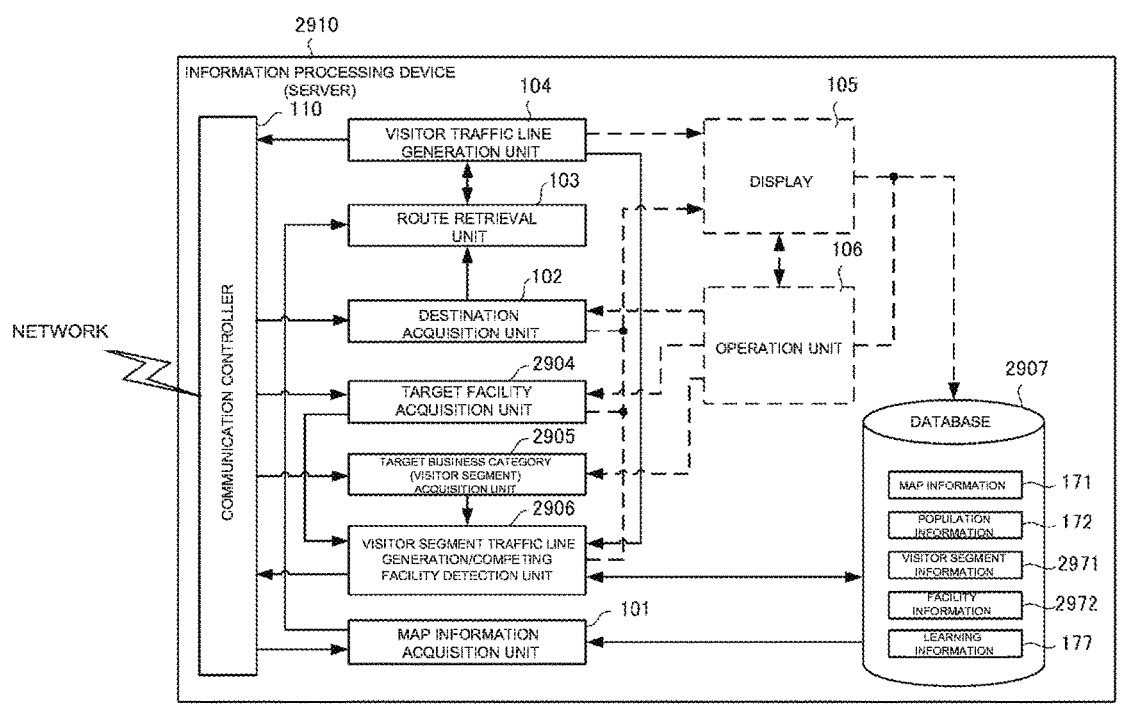
FIG. 29 is a block diagram showing the functional elements of an information processing device of the fifth embodiment of the present invention.

FIG. 29 is a block diagram showing the functional elements of an information processing device 2910 according to the present embodiment. Functional elements similar to those in FIG. 1C or 15 are given the same reference signs in FIG. 29 and will not be described. Note that the information processing device shown in FIG. 29 may be combined with that shown in FIG. 20 or 25 and thus synergy effects can be produced.

The information processing device 2910 includes a target facility acquisition unit 2904, a target business category (visitor segment) acquisition unit 2905, a visitor segment traffic line generation/competing facility detection unit 2906, and a database 2907. The target facility acquisition unit 2904 acquires the location of a target facility on a map. The target business category (visitor segment) acquisition unit 2905 acquires the target business category of a competing facility inputted by the user using an operation unit 106 or communication terminal and acquires a visitor segment corresponding to the business category. With regard to the visitor segment, sex or age may be directly inputted. Or, as shown in FIG. 28, the visitor segment may be divided by business category, or other information may be used. The visitor segment traffic line generation/competing facility detection unit 2906 generates a visitor traffic line corresponding to the visitor segment acquired by the target visitor segment acquisition unit 2905 and detects a competing facility targeting the same visitor segment on the basis of the visitor traffic line. The database 2907 is storing visitor segment information 2971 and facility information 2972 including competing facilities.

Hardware Configuration of Information Processing Device

Figure 30:
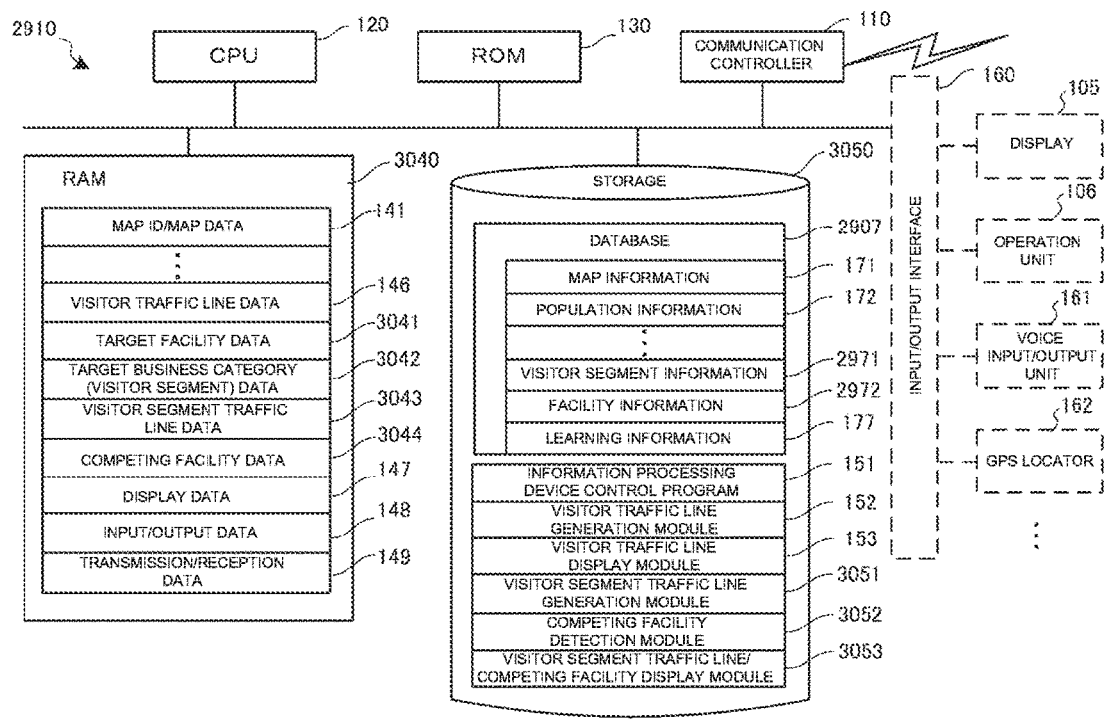
FIG. 30 is a block diagram showing the hardware configuration of the information processing device of the fifth embodiment of the present invention.

FIG. 30 is a block diagram showing the hardware configuration of the information processing device 2910 according to the present embodiment. Elements similar to those in FIG. 1D are given the same reference signs in FIG. 30 and will not be described.

Target facility data 3041 in a RAM 3040 is target facility data for detecting a competing facility on the basis of a visitor segment traffic line. Target business category (visitor segment) data 3042 is data indicating a competing business category or visitor segment. Visitor segment traffic line data 3043 is data about a visitor traffic line generated with respect to a visitor segment indicated by the target business category (visitor segment) data 3042. Competing facility data 3044 is data about a facility competing with a target facility detected on the basis of the visitor segment traffic line data 3043.

The database 2907 in storage 3050 is storing visitor segment information 2971 and facility information 2972. A visitor segment traffic line generation module 3051 in the storage 3050 is a module that generates a visitor segment traffic line, which is a visitor traffic line of a specified visitor segment. A competing facility detection module 3052 is a module that detects a competing facility on the basis of visitor segment traffic line. A visitor segment traffic line/competing facility display module 3053 is a module that issues an instruction to display a detected competing facility on a generated visitor segment traffic line in a superimposed manner so that the competing facility is reported to the user.

Data Used by Information Processing Device

FIG. 31 is a diagram showing the configuration of data used by the information processing device 2910 according to the present embodiment. FIG. 31 is used to generate visitor segment traffic lines and to detect a competing store.

FIG. 31 is storing visitor traffic lines 3101 generated in accordance with the steps in the first embodiment, business categories (visitor segments) 3102, which are information for identifying visitor segments, and different visitor segment traffic lines 3103 generated from the visitor traffic lines 3101 in accordance with the business categories 3102. FIG. 31 is also storing specified target facilities 3104, detected competing facilities 3105 corresponding to the target facilities 3104, and commodity types 3106 with respect to which the target facilities 3104 are assumed to compete with the competing facilities 3105. Examples of the business category (visitor segments) 3102 include information about business categories attracting particular visitor segments, such as a supermarket, a station, and a temple or shrine, and information about visitor segments, such as sex and age group. If visitor segments can be identified by commodity type, information about commodity types may be used as the business categories (visitor segments) 3102.

Process Steps by Information Processing Device

Figure 32:
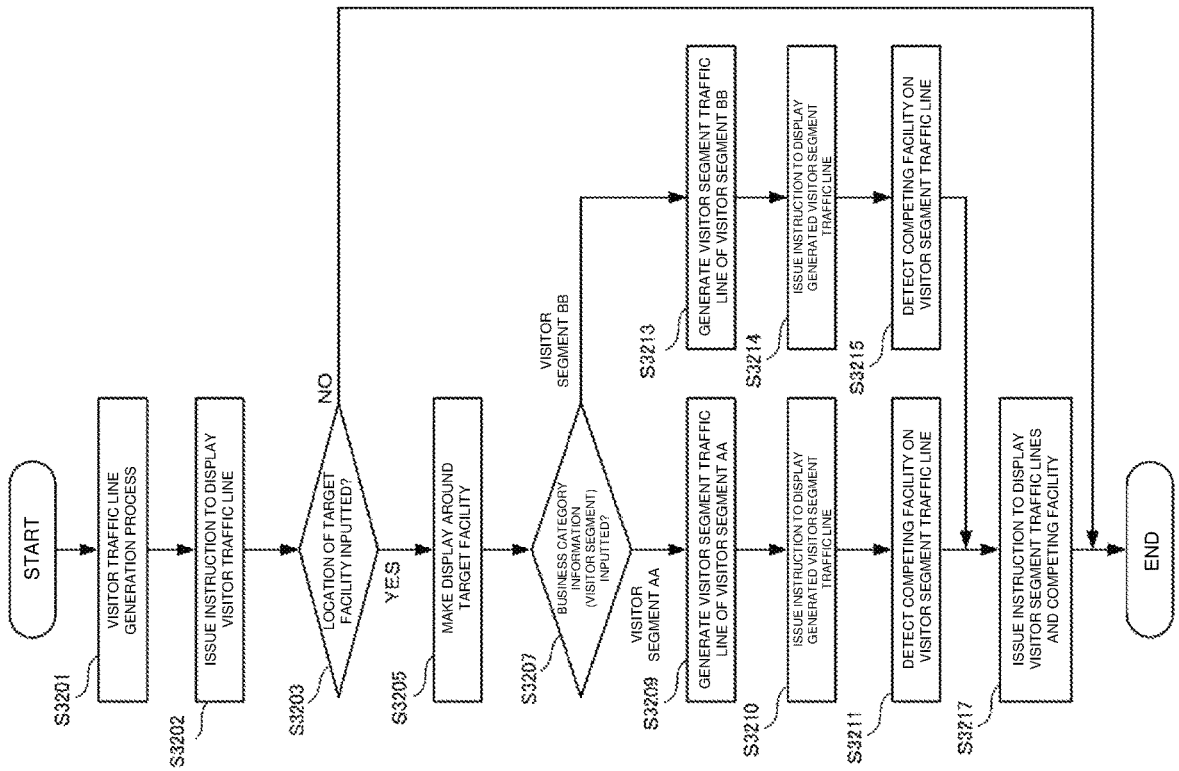
FIG. 32 is a flowchart showing process steps performed by the information processing device of the fifth embodiment of the present invention.

FIG. 32 is a flowchart showing process steps performed by the information processing device 2910 of the present embodiment. A CPU 120 in FIG. 30 performs the process steps in this flowchart using a RAM 3040 and thus implements the functional elements in FIG. 29.

In step S3201, the information processing device 2910 performs a visitor traffic line generation process. The visitor traffic line generation process is similar to that in the first embodiment and therefore will not be described in detail. In step S3202, the information processing device 2910 issues an instruction to display the generated visitor traffic line on a map.

In step S3203, the information processing device 2910 determines whether location information of a target facility has been inputted. If location information of a target facility has been inputted, the information processing device 2910, in step S3205, makes a display around the target facility.

In step S3207, the information processing device 2910 determines a visitor segment on the basis of input of a business category (including visitor segment information and commodity information). If the visitor segment is a visitor segment AA, the information processing device 2910, in step S3209, generates a visitor segment traffic line which is a visitor traffic line of the visitor segment AA. In step S3210, the information processing device 2910 displays the generated a visitor segment traffic line of the visitor segment AA on the map. In step S3211, the information processing device 2910 detects a competing facility from the visitor segment traffic line of the visitor segment AA. On the other hand, if the visitor segment is a visitor segment BB, the information processing device 2910, in step S3213, generates a visitor segment traffic line which is a visitor traffic line of the visitor segment BB. In step S3214, the information processing device 2910 displays the generated visitor segment traffic line of the visitor segment BB on the map. In step S3215, the information processing device 2910 detects a competing facility from the visitor segment traffic line of the visitor segment BB. In step S3217, the information processing device 2910 displays the generated visitor segment traffic line and the detected competing facility. If location information of a target facility has not been inputted in step S3203, the information processing device 2910 ends the process.

According to the present embodiment, a competing facility (store) is detected from a visitor traffic line corresponding to a visitor segment, and the competing facility is reported. Thus, the user can accurately grasp the actual trading area of his or her facility (store) and can appropriately select the installation location of the facility, commodities, or the like. Further, according to the present embodiment, visitor segment traffic lines are drawn on the basis of a visitor segment. Thus, for example, by generating a visitor traffic line having young people as a visitor segment even in a region where many elderly people live, it is possible to propose a location for installing a store for young people. Conversely, by generating a visitor traffic line having middle-aged people as a visitor segment even in a town where young people live, it is possible to propose a location for installing a store for middle-aged people.

Other Embodiments

While the above embodiments propose the installation of a store, vending machine, or base station on the basis of a visitor traffic line, the embodiments can also be applied to, for example, the installation of a souvenir shop, parking lot, sightseeing information center, or the like at a location at which visitor traffic lines for multiple sightseeing facilities overlap each other in an sightseeing region. The embodiments can also be applied to city planning, such as the installation of security cameras at appropriate locations on the basis of a visitor traffic line, the installation of disaster shelters at appropriate locations, and the installation of a bicycle parking lot considering the locations of a residential area and a station.

The embodiments can also be applied to the selection of a location which is effective at advertizing a store (a location at which a sign or the like is posted or a location at which fliers are distributed), on the basis of a visitor traffic line.

The embodiments can also be applied to the classification of the sales quantity, the sales, the sales share in the same category, and the like of a particular commodity into a group of stores on a visitor segment traffic line and the other group of stores and the determination of the correlation between a visitor segment and the commodity in actual purchase behaviors by performing a statistical process, such as t-test, on the two groups.

Also, according to the embodiments, actual visitor traffic lines derived from, for example, detected GPS locations of mobile terminals and visitor traffic lines generated in the embodiments are outputted together. Thus, an appropriate destination can be set. As a result, an appropriate hypothesis can be given to a phenomenon. Also, according to the embodiments, it is possible to know whether the traffic volumes on a visitor traffic line in respective time zones are large or small and to grasp, in a time series manner, the aspect in which a visitor traffic line is generated. Also, according to the embodiments, if there has occurred a behavior deviating from a visitor traffic line, it is possible to know whether the behavior is an evacuation behavior, a shop-around behavior, or any other type of behavior, as well as to calculate and grasp the evacuation rate, shop-around rate, or the like by a common criterion.

Further, the behavior patterns of persons traveling a visitor traffic line generated based on the embodiments and the behavior patterns of other persons can be combined on the basis of complexity theory. For this reason, the embodiments can be useful for the study in the human behavior field intended for the elucidation of a process in which a particular commodity spreads by combining purchase behavior patterns or the elucidation of a process in which competing stores are sorted out, the consideration of an area marketing technique corresponding to such elucidation, the prevention of accidents during congestion, and others.

While, in the embodiments, the behavior patterns of humans are indicated as a visitor traffic line, for example, the behavior patterns of bicycles, vehicles, or the like may be derived and generated as a visitor traffic line.

While the present invention has been described with reference to the embodiments, the present invention is not limited thereto. Various changes understandable by those skilled in the art can be made to the configuration or details of the present invention without departing from the scope of the invention. Further, any system or device obtained by combining different features of the embodiments in some manner falls within the scope of the present invention.

The present invention may be applied to a system consisting of multiple devices, or may be applied to a single device. The present invention can also be applied to a case in which an information processing program for implementing the functions of the embodiments is provided to a system or device directly or remotely. Accordingly, a program installed into a computer to cause the computer to implement the functions of the present invention, a medium storing that program, and a World Wide Web (WWW) server from which that program is downloaded also fall within the scope of the present invention. In particular, at least a non-transitory computer-readable medium storing a program for causing a computer to perform the process steps included in the embodiments falls within the scope of the present invention.

The invention claimed is:

1. An information processing system comprising:
a processor configured to control the system to implement:
a visitor traffic line generator configured to retrieve a shortest route from a location on a road to a destination on a basis of road information included in map information and to generate a visitor traffic line indicating a line of visitor's traffic by setting the shortest route as the visitor traffic line;
a predicted traffic volume calculator configured to calculate predicted traffic volumes of visitors on the visitor traffic line on a basis of numbers of visitors traveling the visitor traffic line;
a visitor traffic generation unit configured to generate a visitor traffic based on the visitor traffic line, visitor attribute information computed from the visitor traffic line, and the predicted traffic volumes of visitors; and
a proposal unit configured to display and propose, on a graphical user interface, a commodity and/or service according to the visitor attribute information and the commodity and/or the service to be recommended, based on the visitor traffic, at a specified location on the visitor traffic line.

2. The information processing system of claim 1, wherein the visitor traffic generation unit is configured to generate the visitor traffic based on the visitor attribute information included in the destination.

3. The information processing system of claim 1, wherein the visitor traffic generation unit is configured to generate the visitor traffic based on the visitor attribute information computed from a point of departure.

4. The information processing system of claim 1, further comprising:
a behavior collection unit configured to collect behaviors of a visitor using a location detection unit possessed by the visitor, wherein the visitor traffic generation unit is configured to generate the visitor traffic based on the visitor attribute information computed from the behavior collection unit.

5. The information processing system of claim 1, further comprising:
a database, wherein the database stores at least one of predicted pedestrian numbers and sales histories, wherein the predicted pedestrian numbers and the sales histories are being associated with predetermined time zones, and wherein the visitor traffic generation unit generates the visitor traffic based on at least one of the predicted pedestrian numbers and the sales histories.

6. The information processing system of claim 1, wherein the proposal unit proposes the commodity and/or service based on search criteria, and wherein the search criteria include at least one of time zone, walking direction, sex, and age.

7. The information processing system of claim 1, wherein the proposal unit configured to display and propose, on a graphical user interface, the commodity and/or the service according to the date and/or time.

8. The information processing system of claim 1, further comprising:
a display instruction unit configured to issue an instruction to display, on a map, the visitor traffic line generated by the visitor traffic line generator.

9. The information processing system of claim 1, further comprising:
a behavior collection unit configured to collect behaviors of a visitor using a location detection unit possessed by the visitor; and
a visitor traffic line correction unit configured to correct the visitor traffic line by comparing the visitor traffic line and information about the behaviors.

10. The information processing system of claim 1, further comprising:
a visitor segment acquisition unit configured to acquire a visitor segment on a basis of which a visitor traffic line is to be generated;
a visitor segment traffic line generator configured to generate a visitor segment traffic line, the visitor segment traffic line being a visitor traffic line based on the visitor segment; and
a competing facility detection unit configured to detect a competing facility with respect to the visitor segment on a basis of the visitor segment traffic line.

11. An information processing system comprising:
a processor configured to control the system to implement:
a visitor traffic line generator configured to retrieve a shortest route from a location on a road to a destination on a basis of road information included in map information and to generate a visitor traffic line indicating a line of visitor's traffic by setting the shortest route as the visitor traffic line;
a predicted traffic volume calculator configured to calculate predicted traffic volumes of visitors on the visitor traffic line on a basis of numbers of visitors traveling the visitor traffic line;
a visitor traffic generation unit configured to generate a visitor traffic based on the visitor traffic line, visitor attribute information computed from the visitor traffic line, and the predicted traffic volumes of visitors; and
a location proposal unit configured to display and propose, on a graphical user interface, a location on the visitor traffic line on a basis of the visitor traffic, the location being a location at which a predetermined commodity and/or service according to the visitor attribute information is to be provided.

12. The information processing system of claim 11, wherein the visitor traffic generation unit is configured to generate the visitor traffic based on the visitor attribute information included in the destination.

13. The information processing system of claim 11, wherein the visitor traffic generation unit is configured to generate the visitor traffic based on the visitor attribute information computed from a point of departure.

14. The information processing system of claim 11, further comprising:
a behavior collection unit configured to collect behaviors of a visitor using a location detection unit possessed by the visitor, wherein the visitor traffic generation unit is configured to generate the visitor traffic based on the visitor attribute information computed from the behavior collection unit.

15. The information processing system of claim 11, wherein the visitor traffic line generator comprises:
a map information acquisition unit configured to acquire map information;
a destination acquisition unit configured to acquire a destination; and
a route retrieval unit configured to retrieve the shortest route from the location of each road to the destination on a basis of road information included in the map information, the location being a location on at least one circle around the destination,
wherein the visitor traffic line generator generates the visitor traffic line from the shortest route.

16. The information processing system of claim 11, further comprising:
a behavior collection unit configured to collect behaviors of a visitor using a location detection unit possessed by the visitor; and
a visitor traffic line correction unit configured to correct the visitor traffic line by comparing the visitor traffic line and information about the behaviors.

17. The information processing system of claim 11, further comprising:
a visitor segment acquisition unit configured to acquire a visitor segment on a basis of which a visitor traffic line is to be generated;
a visitor segment traffic line generator configured to generate a visitor segment traffic line, the visitor segment traffic line being a visitor traffic line based on the visitor segment; and
a competing facility detection unit configured to detect a competing facility with respect to the visitor segment on a basis of the visitor segment traffic line.

18. An information processing system comprising:
a processor configured to control the system to implement:
a map information acquisition unit configured to acquire map information;
a destination acquisition unit configured to acquire a destination;
a route retrieval unit configured to retrieve a shortest route from a location on a road to the destination on a basis of road information included in the map information, the location being a location on at least one circle around the destination; and
a visitor traffic line generator configured to generate a visitor traffic line from indicating a line of visitor's traffic by setting the shortest route as the visitor traffic line;
a proposal unit configured to display and propose, on a graphical user interface, a commodity and/or service according to a visitor attribute information and the commodity and/or the service to be recommended, based on the visitor traffic line, at a specified location on the visitor traffic line.

19. The information processing system of claim 18, further comprising:
a display instruction unit configured to issue an instruction to display, on a map, the visitor traffic line generated by the visitor traffic line generator.

20. The information processing system of claim 18, further comprising:
a behavior collection unit configured to collect behaviors of a visitor using a location detection unit possessed by the visitor; and
a visitor traffic line correction unit configured to correct the visitor traffic line by comparing the visitor traffic line and information about the behaviors.

* * * * *